United States Patent [19]
Kakimoto et al.

[11] Patent Number: 5,604,719
[45] Date of Patent: Feb. 18, 1997

[54] MAGNETOOPTICAL INFORMATION RECORDING/REPRODUCING METHOD AND APPARATUS EMPLOYING A FLOATING SLIDER SUPPORTING A MAGNETIC HEAD

[75] Inventors: Hiroaki Kakimoto, Yokohama; Nobuaki Date; Yoshikazu Miyajima, both of Kawasaki; Masahiko Chaya, Yokohama, all of Japan

[73] Assignee: Canon Kabushiki Kaisha, Tokyo, Japan

[21] Appl. No.: 364,425

[22] Filed: Dec. 27, 1994

Related U.S. Application Data

[63] Continuation of Ser. No. 914,564, Jul. 17, 1992, abandoned.

[30] Foreign Application Priority Data

| Jul. 25, 1991 | [JP] | Japan | 3-207176 |
| Jul. 25, 1991 | [JP] | Japan | 3-207177 |
| Jul. 25, 1991 | [JP] | Japan | 3-207178 |
| Nov. 5, 1991 | [JP] | Japan | 3-315270 |
| Nov. 7, 1991 | [JP] | Japan | 3-318681 |
| Dec. 9, 1991 | [JP] | Japan | 3-349485 |
| Jan. 8, 1992 | [JP] | Japan | 4-018445 |
| Jan. 8, 1992 | [JP] | Japan | 4-018449 |
| Jan. 21, 1992 | [JP] | Japan | 4-029074 |

[51] Int. Cl.⁶ ............................................. G11B 11/00
[52] U.S. Cl. ............................................. 364/13; 360/114
[58] Field of Search .......................... 369/13, 184, 217, 369/14; 360/114, 59, 105, 107, 109, 46; 365/122

[56] References Cited

U.S. PATENT DOCUMENTS

| 4,554,653 | 11/1985 | Malissin et al. | 369/45 |
| 4,613,962 | 9/1986 | Inoue et al. | 369/44 |
| 4,798,447 | 1/1989 | Jansen et al. | 350/255 |
| 5,070,494 | 12/1991 | Emoto et al. | 369/13 |
| 5,077,713 | 12/1991 | Takizawa et al. | 369/13 |
| 5,124,965 | 6/1992 | Mizuno et al. | 369/44.22 |
| 5,193,080 | 3/1993 | Mohri et al. | 369/13 |
| 5,202,863 | 4/1993 | Miyatake et al. | 369/13 |

FOREIGN PATENT DOCUMENTS

| 0350225 | 10/1990 | European Pat. Off. . | |
| 57110069 | 8/1990 | Japan . | |
| 319160 | 1/1991 | Japan | 369/13 |
| 536199 | 2/1993 | Japan | 369/13 |
| 5128616 | 5/1993 | Japan | 369/13 |
| 5128629 | 5/1993 | Japan | 369/13 |
| 2192750 | 1/1988 | United Kingdom . | |

OTHER PUBLICATIONS

Patent Abstracts of Japan, Kokai No. 2–249158, vol. 14, No. 581, Dec. 1990.
Patent Abstracts of Japan, Kokai No. 2–96, 955, vol. 14, No. 303, Jun. 1990.
IBM Technical Disclosure Bulletin, "Configuration for Optical Disk Overwrite and Compatibility," vol. 33, No. 10B,, Mar. 1991, p. 55.

*Primary Examiner*—Tan Dinh
*Attorney, Agent, or Firm*—Fitzpatrick, Cella, Harper & Scinto

[57] ABSTRACT

A magnetooptical information recording/reproducing apparatus is provided with a floating slider for supporting a magnetic head for applying a magnetic field modulated according to information to a magnetooptical information recording medium. The floating slider is adapted to be retracted from the recording medium according to the kind of the medium by a retraction device, so that the floating slider is free from damages on the slider or in the medium loaded in the apparatus.

21 Claims, 57 Drawing Sheets

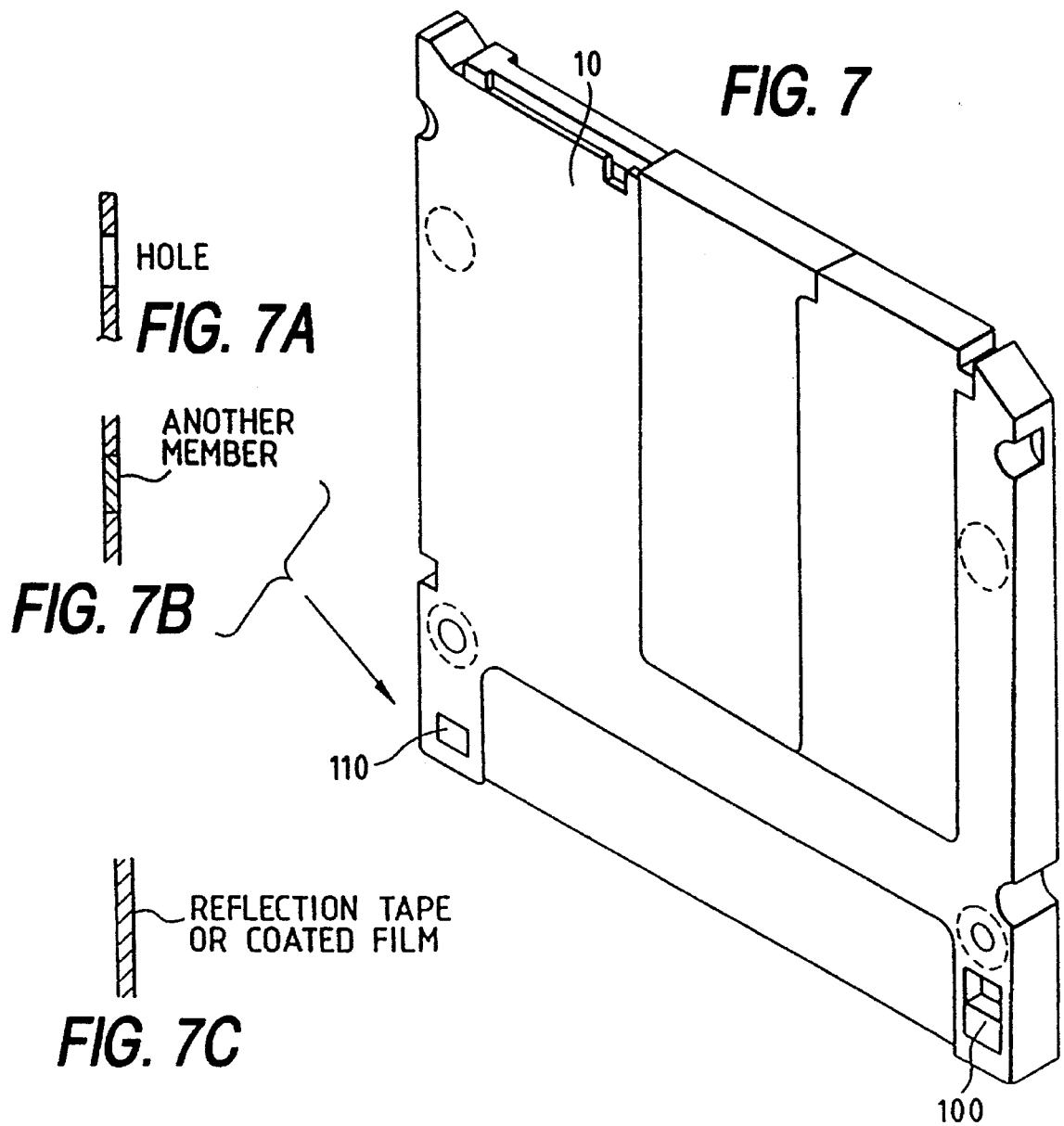

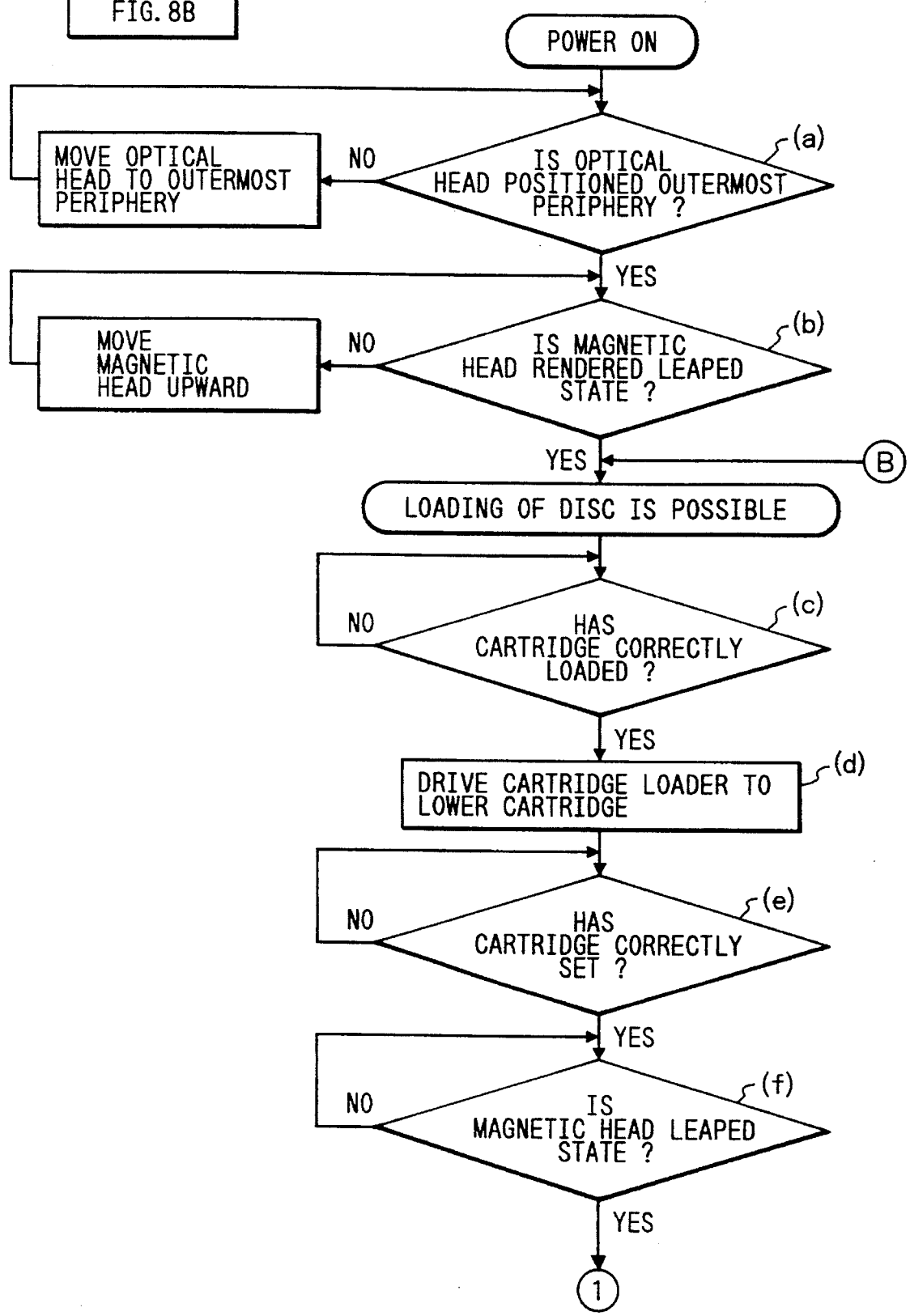

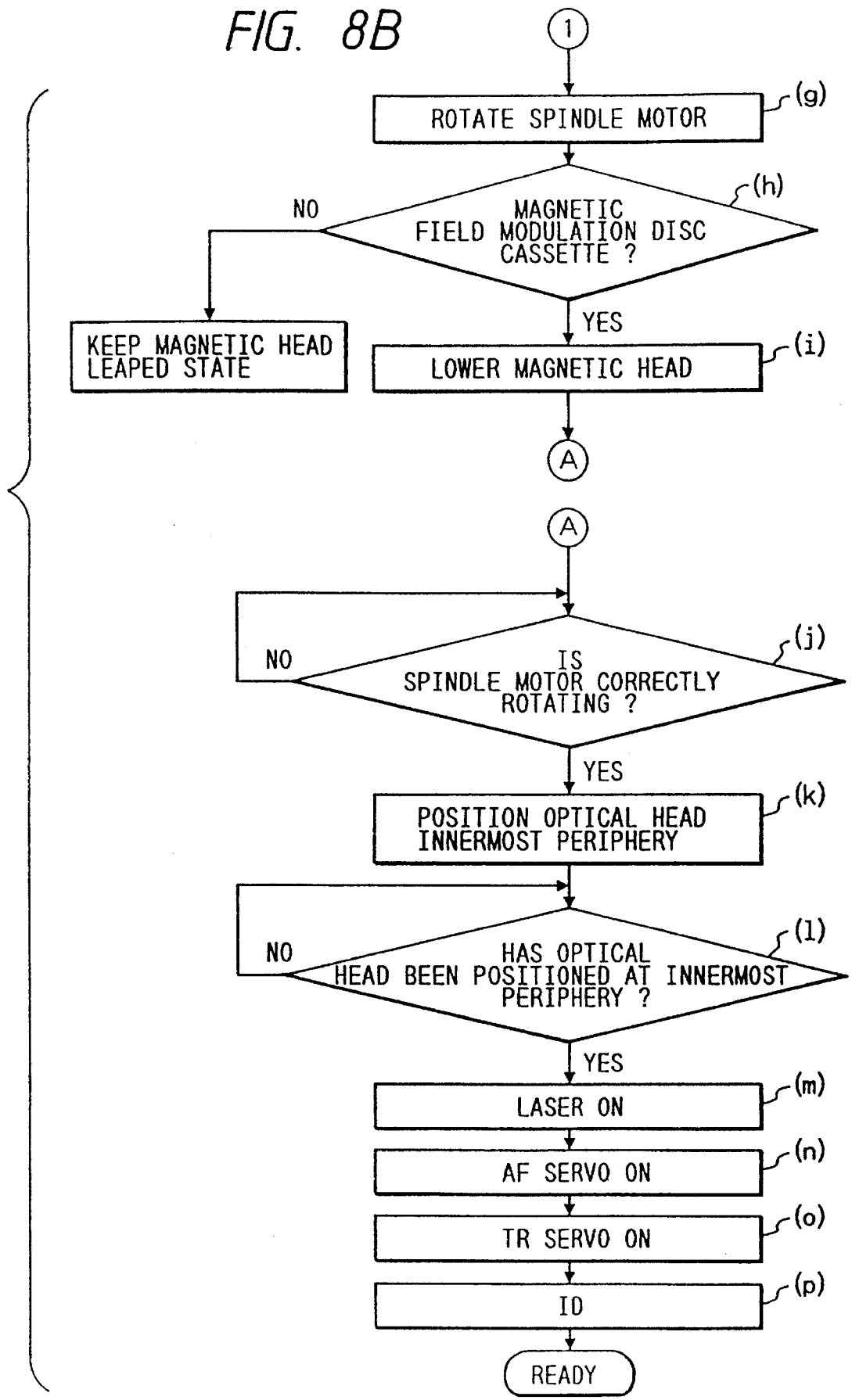

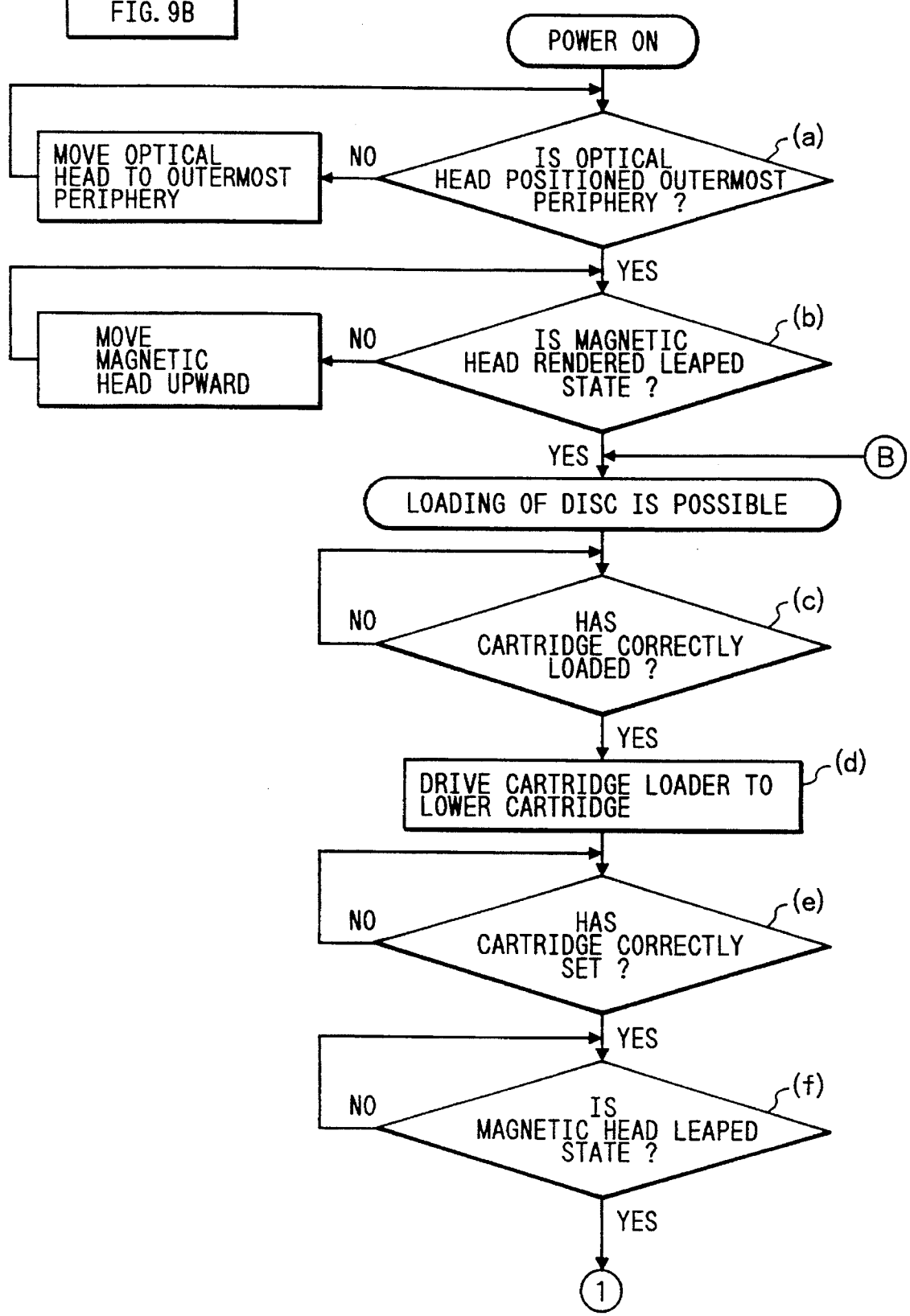

HEAD LOADING STATE

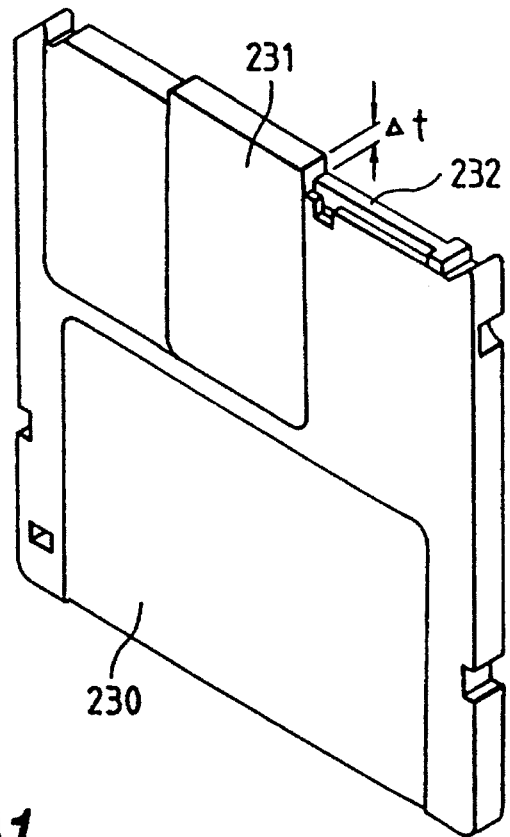
FIG. 30
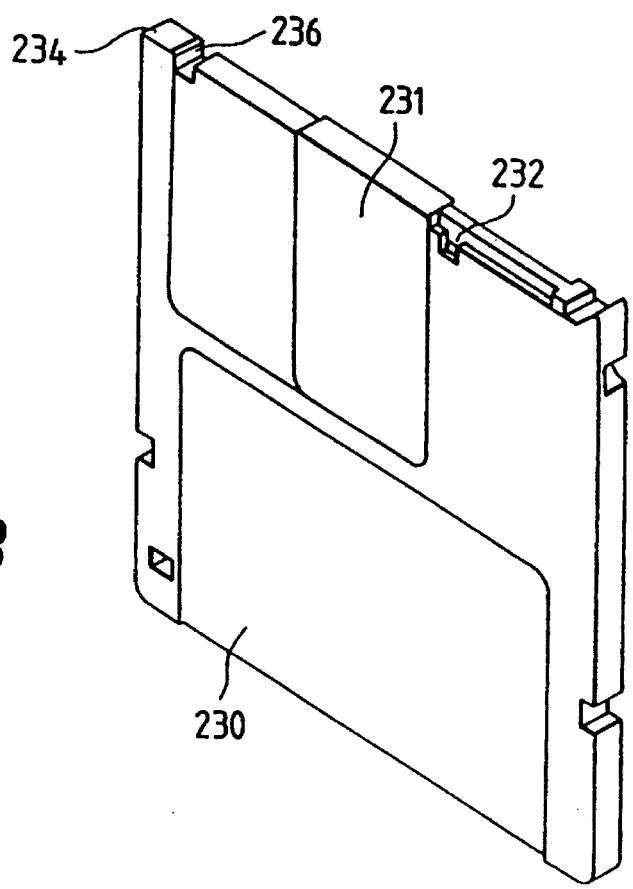
FIG. 31A₁
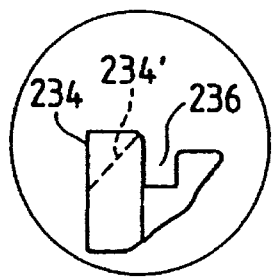
FIG. 31A₂
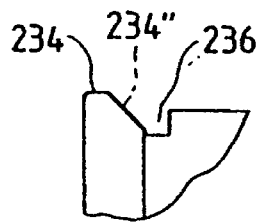
FIG. 31B

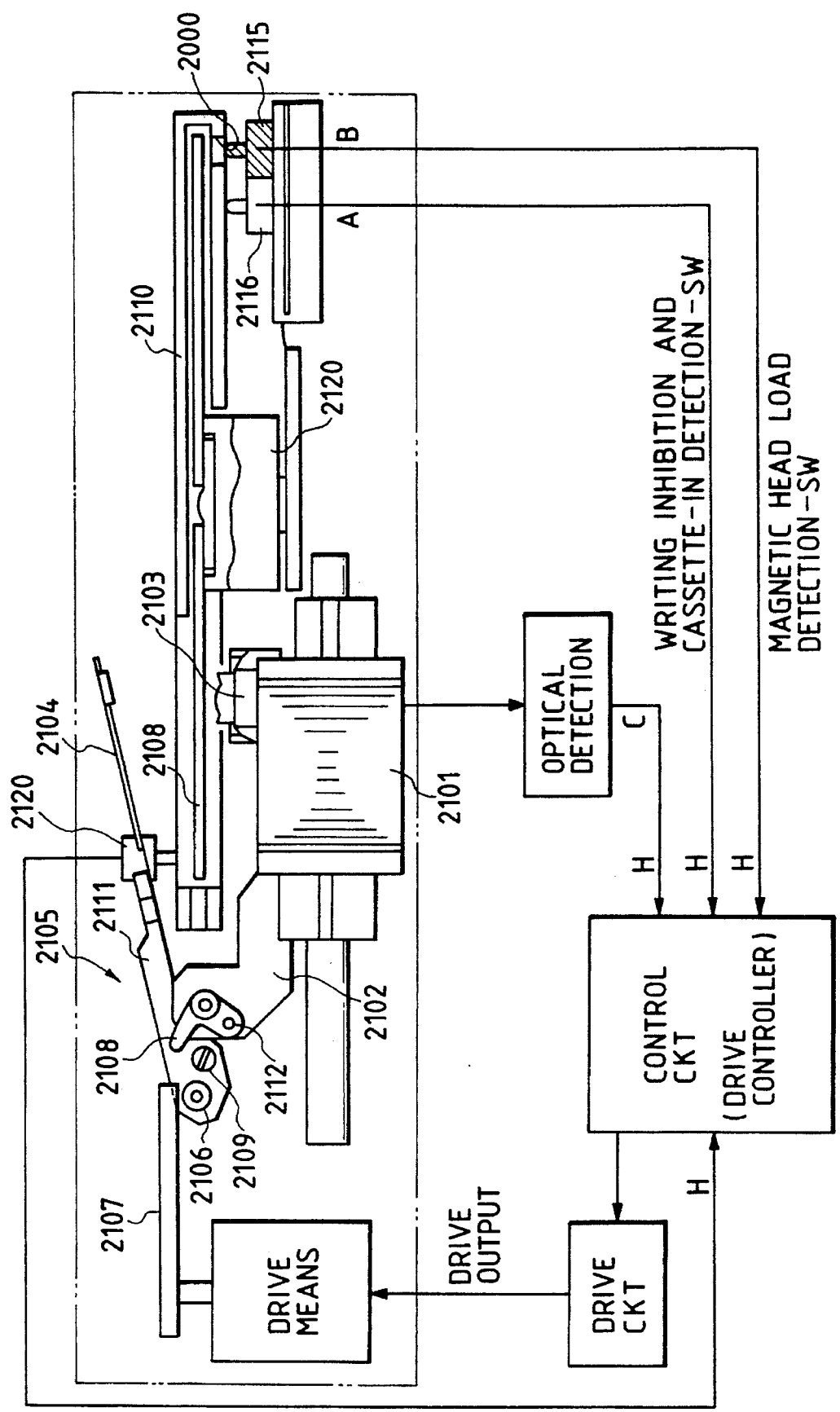

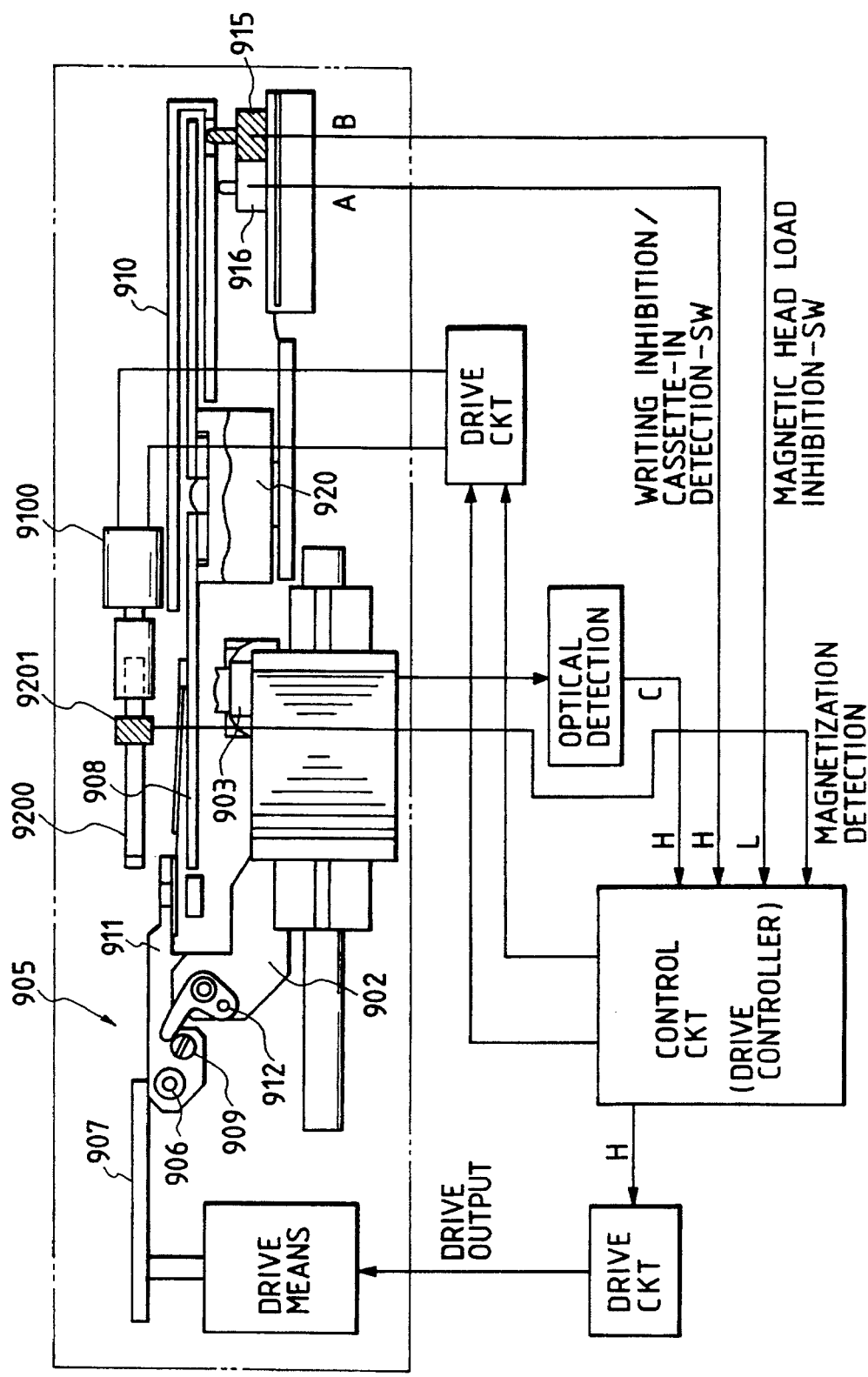

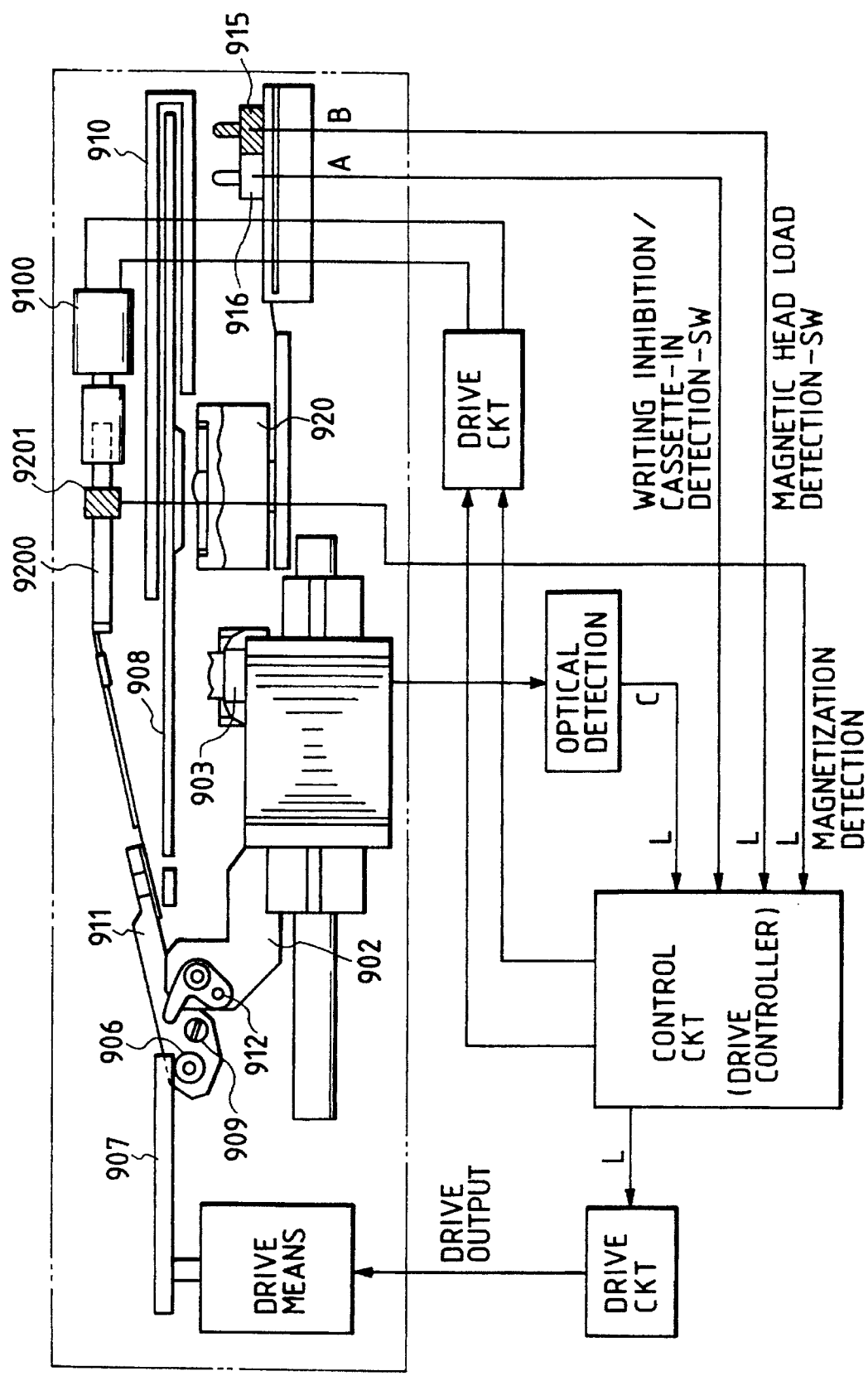

MAGNETOOPTICAL INFORMATION RECORDING/REPRODUCING METHOD AND APPARATUS EMPLOYING A FLOATING SLIDER SUPPORTING A MAGNETIC HEAD

This application is a continuation of application Ser. No. 07/914,465 filed Jul. 17, 1992, now abandoned.

BACKGROUND OF THE INVENTION

1. Field of the Invention

The present invention relates to a magnetooptical information recording and/or reproducing method capable of performing overwriting by magnetic field modulation and utilizing a floating slider supporting a magnetic head, and an apparatus therefor.

2. Related Background Art

In a magnetooptical information recording/reproducing apparatus, or in a magnetooptical disk apparatus, a magnetooptical disk constituting the information recording medium is irradiated with a laser beam spot for heating the irradiated area under the application of a magnetic field, and the recording or erasure of information is conducted by the scanning movement of said light spot.

Among such recording methods, there is known a light modulation recording method in which the laser beam is on-off modulated according to the recording information while the intensity and polarity of the applied magnetic field are maintained constant (for example, using a ISO standard magnetooptical disk). This method enables so-called pit position recording, in which the reproduction signal is obtained from the center position of the recorded pit.

Now reference is made to FIG. 1 for explaining the light modulation recording method. There are illustrated a magnetooptical disk 1001; an information recording film 1002 and a protective film 1003 thereof; an objective lens 1004 of an optical head, for condensing the laser beam from an unrepresented light source onto the recording film 1002 of the disk; a light 1005 emerging from said objective lens 1004 and forming a light spot on the recording film 1002; and a bias magnet 1006 for applying a magnetic field of a predetermined intensity to the magnetooptical disk.

During information recording, at first a magnetic field of predetermined polarity and intensity is applied by the bias magnet 1006 to the magnetooptical disk 1001, and the laser beam 1005 of a recording power simultaneously irradiates the recording film 1002, thereby erasing the information recorded therein. Then the information is recorded by inducing inversion of magnetization in the recording film 1002, by applying a magnetic field of opposite polarity and a predetermined intensity to the magnetooptical disk and modulating the laser beam with the recording information.

In recent years, however, there is desired so-called pit edge recording, in which the reproduction signal is obtained from both ends of a recorded pit, for the purpose of increasing the recording capacity. For such pit edge recording there is generally employed a magnetic field modulation recording method, in which the direction (polarity) of the magnetic field is suitably inverted in a short time by means of a small magnetic head, while the laser beam irradiation is conducted with a constant intensity.

Now reference is made to FIG. 2 for explaining the magnetic field modulation recording method. There are illustrated a magnetooptical disk 1011; an information recording film 1012 and a protective film 1013 thereof; a floating slider 1015 supporting an unrepresented small magnetic head; a support member 1016 supporting said floating slider; an object lens 1004 of an optical head, for condensing the laser beam from an unrepresented light source onto the recording film 1012, and a light 1005 emerging from the objective lens 1004 and forming a light spot on the recording film 1012.

During information recording, a laser beam of a constant intensity of a recording power is concentrated on the recording film 1012 of the magnetooptical disk. At the same time the recording film 1012 is given a magnetic field, modulated by the recording information, generated by the magnetic head in the floating slider 1015. This method enables overwriting, in which the recording is achieved simultaneously with the erasure of the information already recorded in the recording film 1012. It also increases the recording capacity in comparison with the above-explained light modulation recording method, and improves the transfer rate.

The above-mentioned floating slider floats from the disk, utilizing the dynamic pressure of air, generated by the rotation of the disk.

Since the floating slider 1015 floats by a distance of 5 to 10 μm from the protective film 1013 of the magnetooptical disk, said protective film is required to have an elevated smoothness (surface precision), a low friction coefficient and a high abrasion resistance. In the magnetooptical disk for the aforementioned light modulation recording method, the protective film 1003 does not have such strict requirements and is generally inferior, in the smoothness, friction coefficient and abrasion resistance, to the protective film 1013 of the magnetooptical disk for the magnetic field modulation recording method. For this reason, if information recording and/or reproduction is conducted with the former magnetooptical disk in combination with a floating slider, said slider does not slide satisfactorily with respect to the protective film and both the magnetooptical disk and the floating slider may be damaged.

Consequently, the magnetooptical disk for light modulation recording and that for magnetic field modulation have respectively been recorded or reproduced in exclusive apparatus. However, such a lack of compatibility between the recording media of two recording methods is undesirable. Also, the floating slider and the magnetooptical disk have often been damaged by mistaken loading of the disk for light modulation recording in the apparatus for magnetic field modulation recording method.

SUMMARY OF THE INVENTION

In consideration of the foregoing, the present invention is to provide:

(1) a magnetooptical information recording/reproducing apparatus provided with a floating slider which is free from damage in said slider or in the recording medium loaded in the apparatus even if said medium does not match the floating slider system, such as a magnetooptical disk for light modulation recording or a ROM disk; and (2) a magnetooptical information recording/reproducing apparatus of a magnetic field modulation recording method, which can also effect information recording and/or reproduction with the magnetooptical disk for a light modulation recording method or an information reproduction with the ROM disk.

The above-mentioned objects can be attained, according to the present invention, by a magnetooptical information recording/reproducing apparatus for effecting at least one of information recording and reproduction utilizing a magnetooptical recording medium, comprising:

a magnetic head for applying a magnetic field, modulated according to information, to said medium;

a floating slider supporting said magnetic head;

retraction means for retracting said floating slider from said medium according to the kind thereof; and an optical head for irradiating an area of said medium where said magnetic field is applied, with a light beam.

Also, said objects can be attained by a magnetooptical information recording/reproducing apparatus for effecting at least one of information recording and reproduction utilizing a magnetooptical recording medium, comprising:

a magnetic head for applying a magnetic field, modulated according to information, to said medium;

a bias magnet for applying a constant bias magnetic field to said medium; and means for irradiating an area of said medium, where said magnetic field is applied, with a light beam.

Also, said objects can be attained by a magnetooptical information recording/reproducing method for effecting at least one of information recording and reproduction utilizing a magnetooptical recording medium, comprising steps of:

applying a modulated magnetic field to said medium by a magnetic head supported by a floating slider;

retracting said floating slider from said medium according to the kind thereof; and irradiating a part of said medium where said magnetic field is applied, with a light beam.

Also, said objects can be attained by a magnetooptical information recording/reproducing method for effecting at least one of information recording and reproduction utilizing a magnetooptical recording medium, comprising steps of:

applying a modulated magnetic field to said medium by a magnetic head supported by a floating slider;

retracting said floating slider from said medium according to the recording or reproducing method; and irradiating a part of said medium where said magnetic field is applied, with a light beam.

Also, said objects can be attained by a magnetooptical information recording/reproducing method for effecting at least one of information recording and reproduction utilizing a magnetooptical recording medium, comprising steps of:

applying a modulated magnetic field to said medium by a magnetic head supported by a floating slider;

applying a constant DC bias magnetic field by a bias magnet; and irradiating a part of said medium, where said magnetic fields are applied, with a light beam.

These apparatus and methods will be described further in the following detailed explanation.

BRIEF DESCRIPTION OF THE DRAWINGS

FIG. 7, including FIGS. 7A through 7C are views showing an example of the disk cartridge to be employed in the first embodiment;

FIGS. 8 and 9 which comprises FIGS. 8A, 8B, 9A and 9B are flow charts showing the control sequence of the apparatus shown in FIG. 3;

FIGS. 28, 29, 30, $31A_1$, $31A_2$ and 31B are perspective views showing examples of a disk cartridge in a 5th embodiment of the present invention;

FIGS. 42A, 42B and 42C are views showing functions of the apparatus shown in FIG. 41;

FIG. 68 is a view showing a state in which a recording medium for magnetic field modulation is loaded in the apparatus shown in FIG. 66;

FIG. 70 is a view showing a state of 9 recording medium loading into the apparatus shown in FIG. 66;

DETAILED DESCRIPTION OF THE PREFERRED EMBODIMENTS

[1st embodiment]

Figure 1:
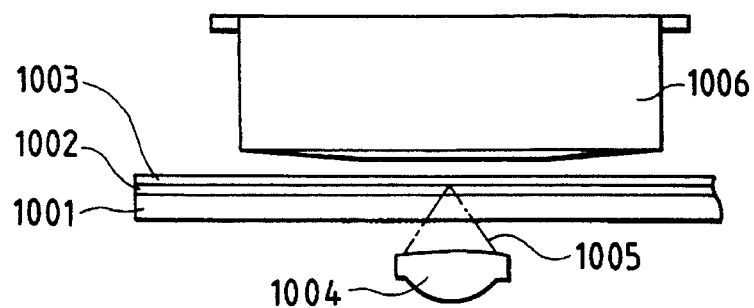
FIG. 1 is a schematic view of a conventional light modulation system.
Figure 2:
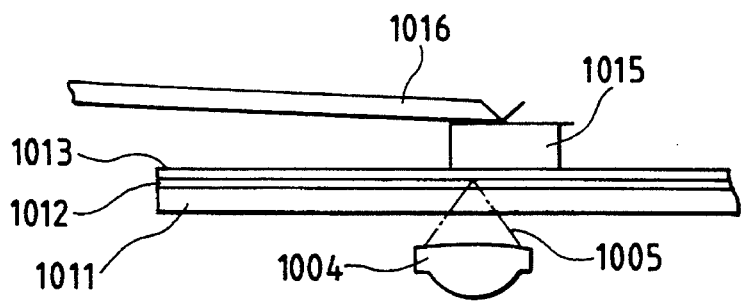
FIG. 2 is a schematic view of a conventional magnetic field modulation system.
Figure 3:
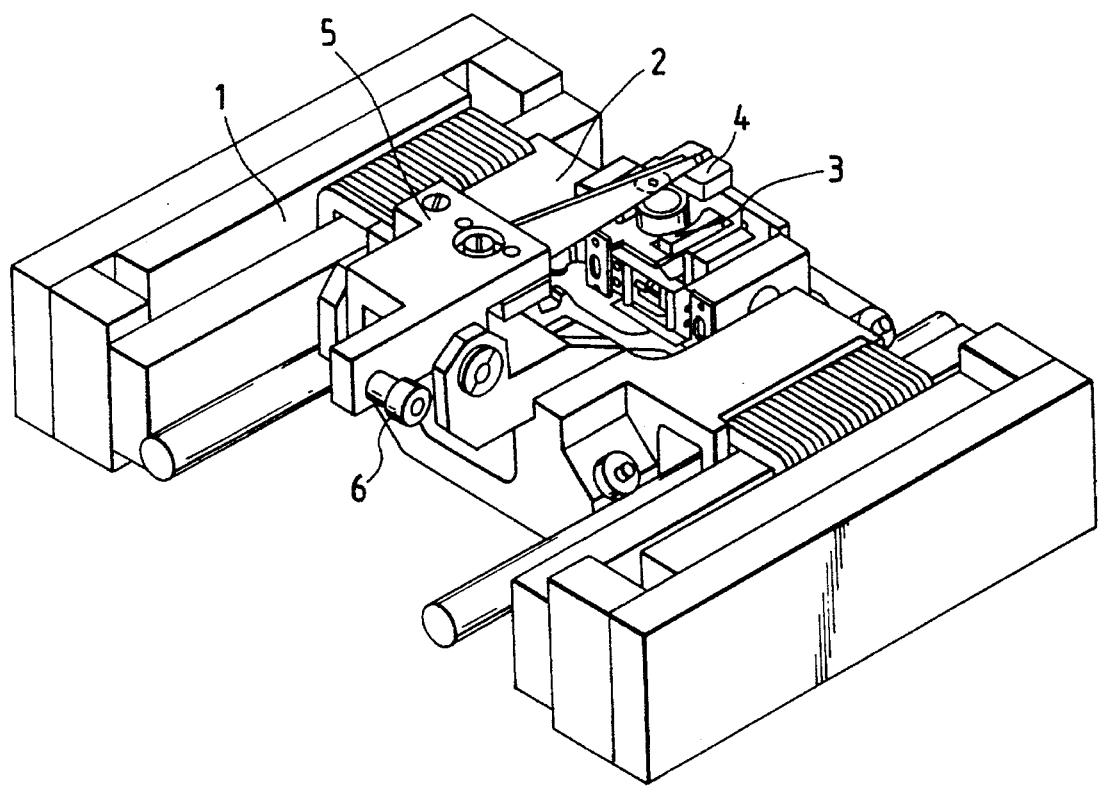
FIG. 3 is a perspective view of a first embodiment of the present invention.

In the following a 1st embodiment of the present invention will be explained with reference to FIGS. 3 to 7. FIG. 3 illustrates a drive unit of a magnetooptical disk apparatus of the present invention, wherein a seek motor 1 simultaneously effects seek operations of an optical head (optical pickup) 3 mounted on a carriage 2 and a magnetic head 4 with a floating slider. Said magnetic head 4 can be lifted by a head lifting mechanism 5. More detailedly, said magnetic head 4 is connected and supported, for example across a plate spring, by a rotary member 11 which is rotatably supported by a shaft 12 on said carriage 2. Said head lifting mechanism 5 is provided, in said rotary member 11, with a rotary contact member 6, which is in contact with a pressing member 7 provided in a head retracting mechanism (see FIG. 4) fixed on the main body. Said pressing member 7, in its vertical movement, presses said rotary contact member 6, thereby rotating the rotary member 11 and retracting said magnetic head from the magnetooptical disk 8.

Figure 4:
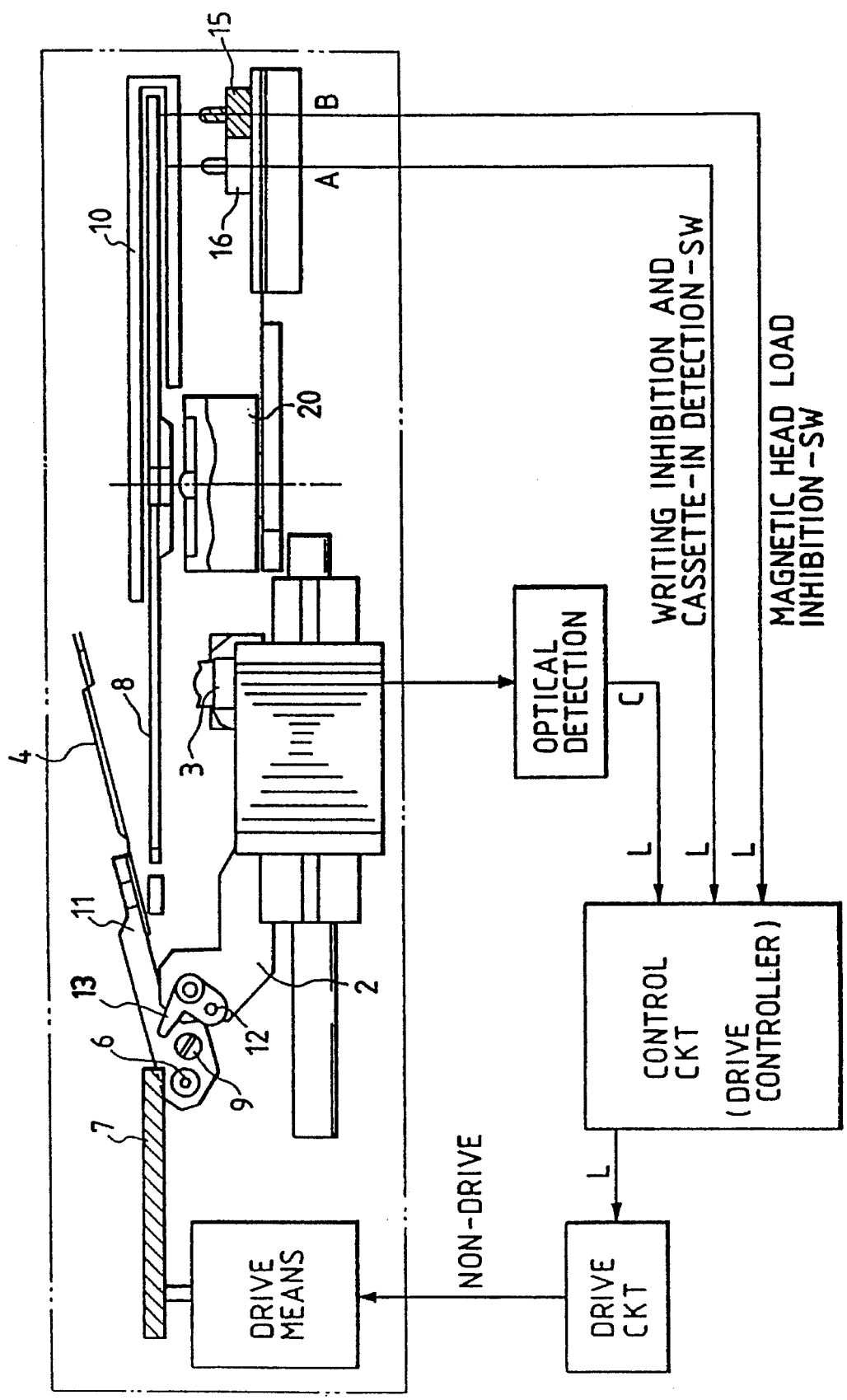
FIG. 4 is a view showing a loading operation of the recording medium into the apparatus shown in FIG. 3.
Figure 5:
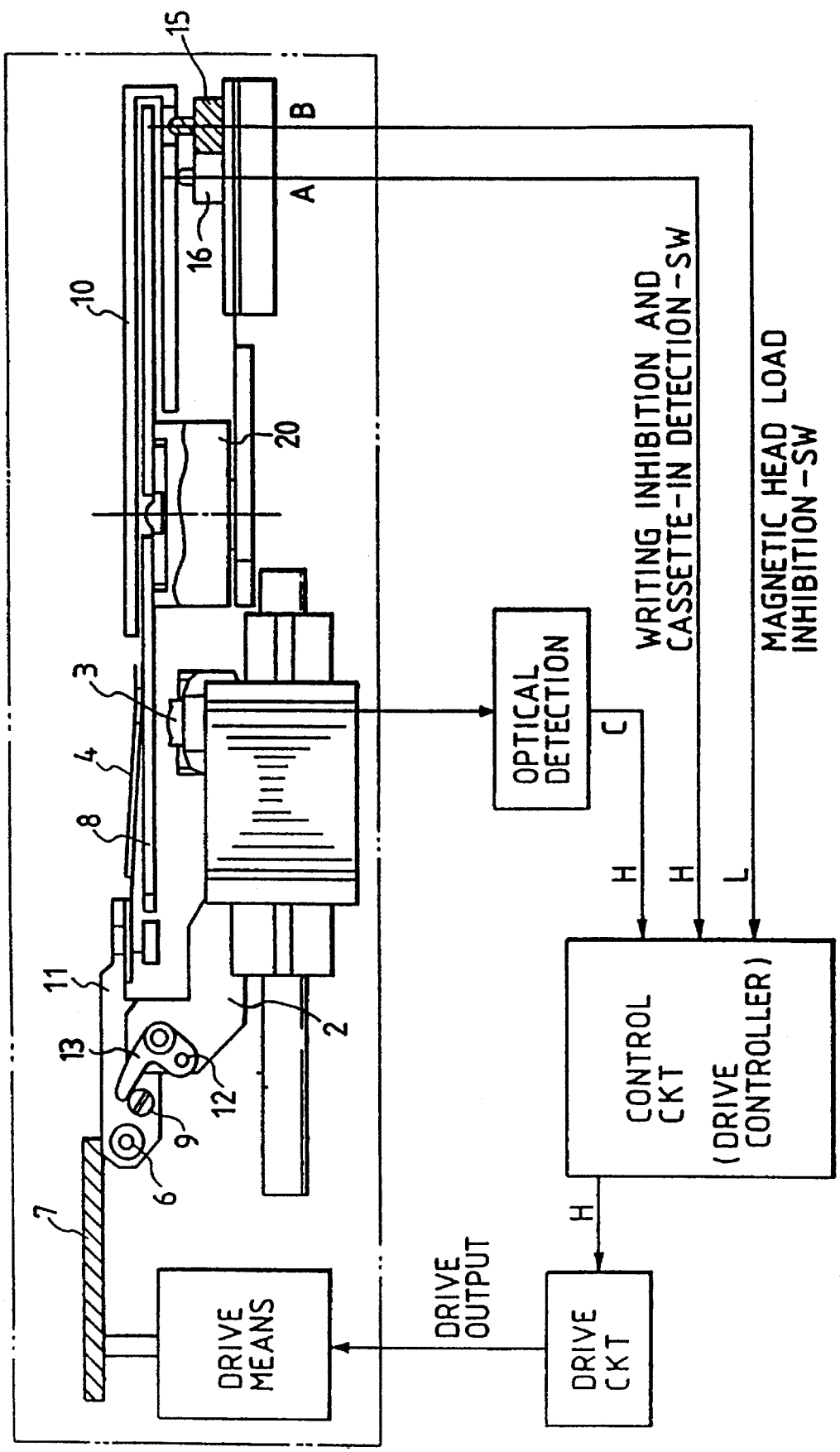
FIG. 5 is a view showing a state in which a recording medium for magnetic field modulation is loaded in the apparatus shown in FIG. 3.

The operating states of said magnetic head retracting mechanism are illustrated in FIGS. 4 and 5. On the frame of the magnetooptical disk apparatus, there are provided a disk kind sensor 15 and a write protection detector 16 which also serves as a sensor for detecting the loading of a disk cassette 10 enclosing said magnetooptical disk. Said disk 8 is rotated by a spindle motor 20, and the recording and reproduction are conducted by a laser beam emitted from an optical head 3.

Figure 10A:
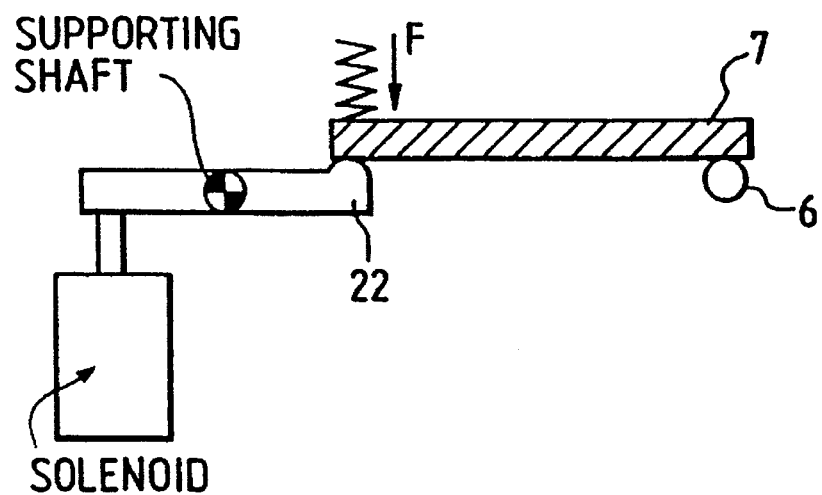
FIGS. 10A and 10B are views showing the function of pressure means in the apparatus shown in FIG. 3.
Figure 10B:
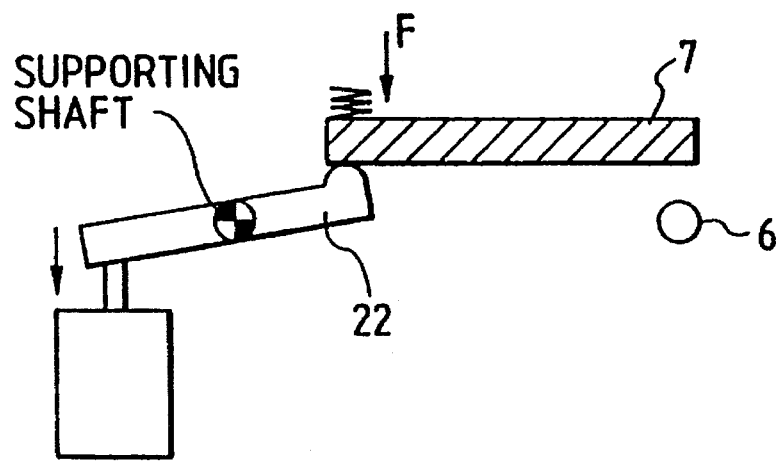
Figure 11:
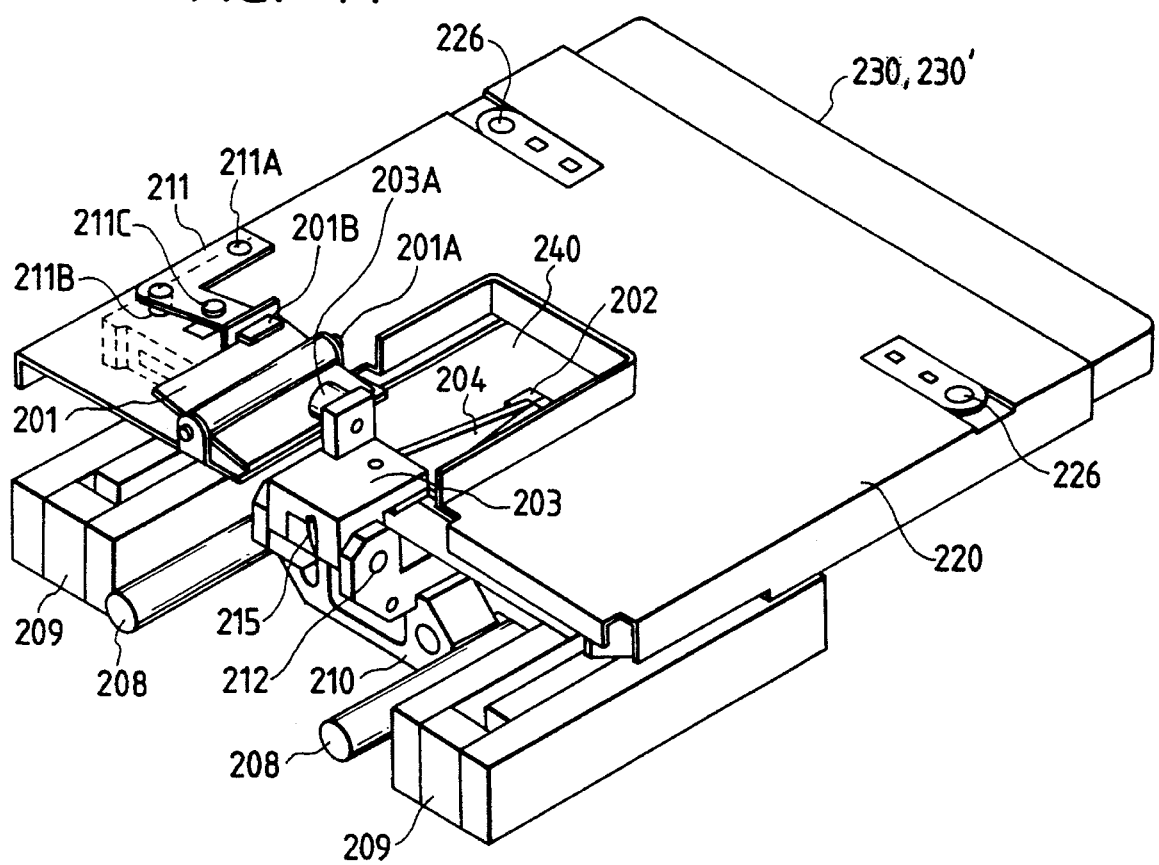
FIG. 11 is a perspective view of a second embodiment of the present invention.
Figure 12:
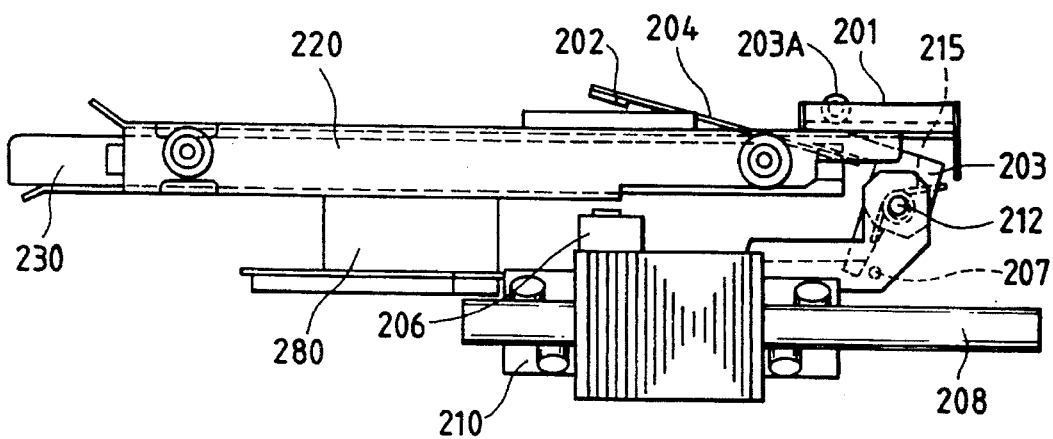
FIG. 12 is a cross-sectional view of the apparatus shown in FIG. 11.

As shown in FIG. 10, the magnetic head 4 can also be maintained in an unloaded state, by means of a solenoid 21, a reversing mechanism 22, and a spring mechanism 23 for biasing the aforementioned pressing member 7 downwards.

When said disk cassette is not loaded as shown in FIG. 4, the above-mentioned sensors 15, 16 do not release output signals (signal level being at the L-level). In this state the magnetic head drive means 24 is not energized, whereby said pressing member 7 is maintained in the lowered position to press and support the rotary contact portion 6 of the above-mentioned magnetic head lifting mechanism.

Figure 9B:
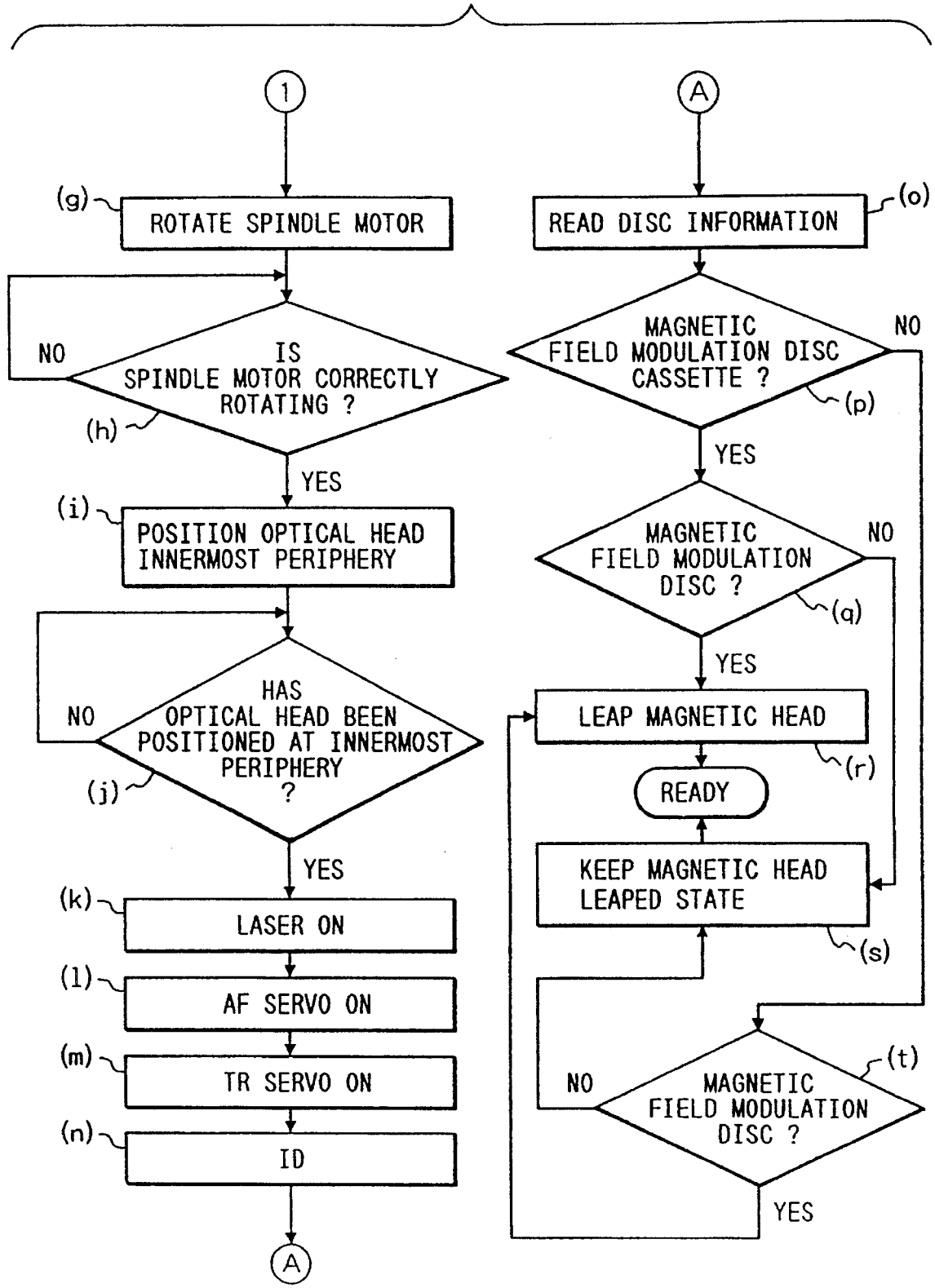

FIG. 5 shows a state in which a disk capable of magnetic field modulation overwriting is loaded in the magnetooptical disk apparatus, and, in this state, the magnetic head 4 is brought into contact with the disk face. The control sequence in this case will be explained in the following, with reference to flow charts shown in FIGS. 8 and 9.

At first the loading of the disk cassette is detected by the sensor 16 (step e). Then the disk kind sensor 15 detects a disk kind detection part 110 (cf. FIG. 9) provided on said disk cassette 10 (step h). In the present case, the sensor 15 releases an L-level detection signal, whereby a controller 25 identifies said disk as that for magnetic field modulation and sends a corresponding control signal to said drive circuit 24. In response the pressing member 7 is elevated so as to be separated from said rotary contact portion 6. The rotary member 11, being biased by a spring (not shown) in the loading direction of the magnetic head about the shaft 12, is rotated about said shaft 12 until an engaging member 9 provided on said rotary member 11 for defining the loaded position of the magnetic head comes into contact with an engaging portion 13 provided on the carriage 2, thereby completing the loading of the magnetic head onto the disk surface.

Figure 6:
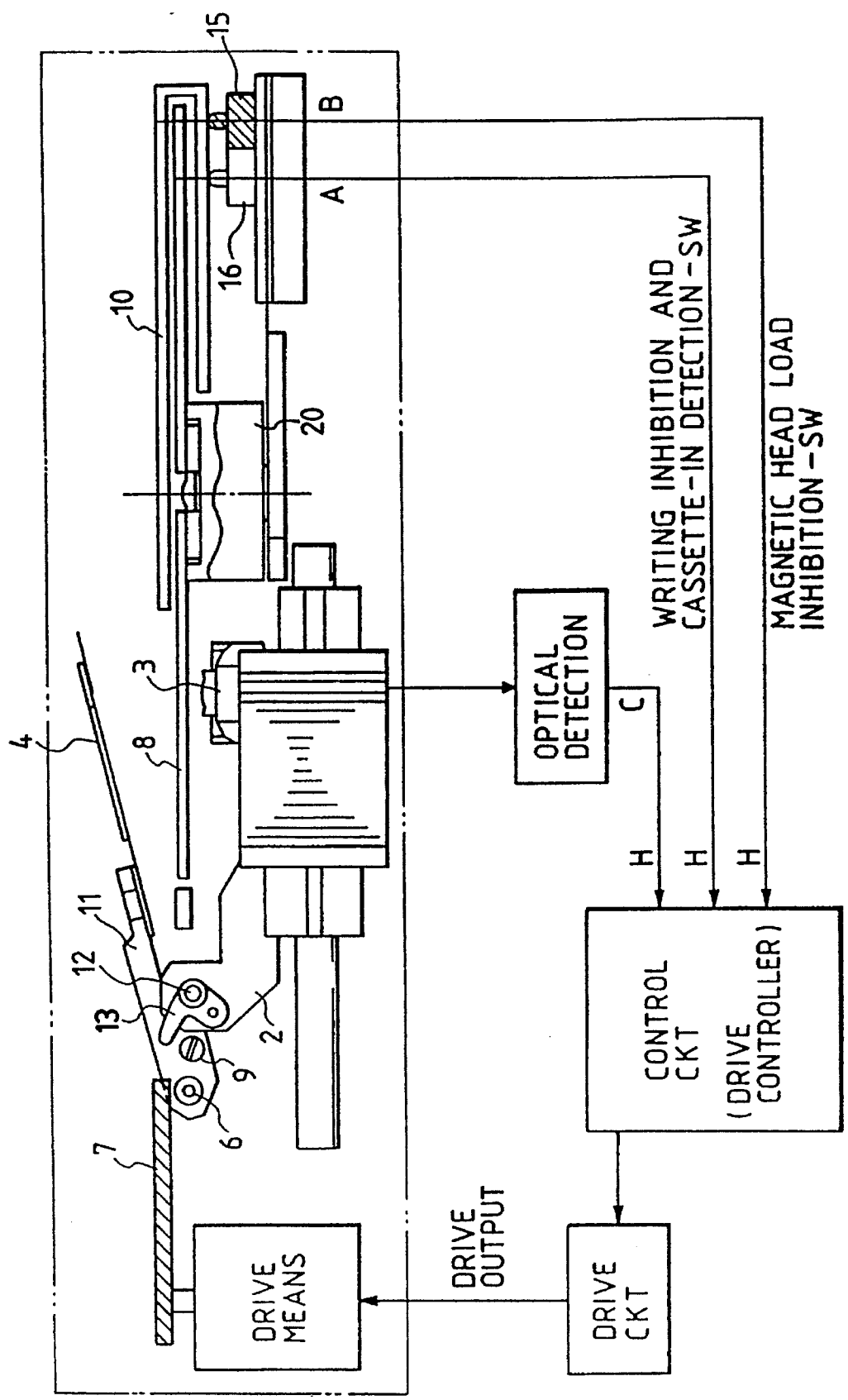
FIG. 6 is a view showing a state in which a recording medium for light modulation is loaded in the apparatus shown in FIG. 3.

On the other hand, FIG. 6 shows a state in which a magnetooptical disk 8 incapable of magnetic field modulation overwriting or a ROM disk is loaded in said apparatus. In this case the disk kind sensor 15 does not release the detection signal (output remaining at the H-level), so that the magnetic head is not loaded. However, since the pressing member 7 is present in the extension of a seeking direction of the carriage 2 and since the rotary contact portion 6 is maintained in contact with the pressing member 7, the seeking operation is rendered possible while the magnetic head is in the unloaded state.

In the above-mentioned embodiment, the kind of disk is identified only by the identification on the disk cassette, but it is also possible to include the following configuration. According to the algorithm shown in FIG. 9, it is also possible to maintain the magnetic head 4 in the unloaded state until a ready state shown in FIG. 8, to detect the disk kind on the disk cassette (step p), and to compare the obtained information with the information recorded on the disk in the controller 25 (steps q, t) thereby preventing erroneous detection by the detection part provided on the disk cassette or mistake with another cassette. In such a case the information detecting unit of the optical head also serves as the disk kind sensor.

In the above-explained configuration, the disk kind sensor 15 is comprised of a microswitch, while the detection part 110 utilizes a notch separate from the write protect notch in the detecting part 100, but there may also be employed the following configurations as shown in FIGS. 7A to 7C. FIG. 7A shows a combination of a notch and an optical proximity sensor for detecting the presence or absence of returning light. FIG. 7B shows a combination of a ferromagnetic member and a magnetic sensor (Hall element or magnetic resistance element). FIG. 7C shows a combination of a light reflecting tape or coating and an optical sensor for detecting the amount of reflected light. [2nd to 8th embodiments]

In the foregoing 1st embodiment, the retraction of the magnetic head is electrically controlled by a solenoid. In the 2nd to 8th embodiments, mechanical control is employed for said retraction, and there is provided an advantage of compactization of the apparatus, since the electrical circuits can be simplified in comparison with the 1st embodiment.

[2nd embodiment]

A 2nd embodiment of the magnetooptical disk apparatus of the present invention will be explained in the following, with reference to FIGS. 11 to 15. An optical head 206 and a magnetic head 202 mounted on a carriage 210 simultaneously effect a seeking operation along guide rails 208, by means of a linear motor 209 as in the conventional configuration. Said magnetic head 202 is mounted on a floating slider which is supported, across a load beam 209 consisting of a plate spring, by a head support member 203. Said support member 203 is rendered rotatable about a shaft 212 provided on a carriage 210, and is constantly biased by a torsion spring 210 toward the carriage 210, thereby being capable of moving the magnetic head 202 in the loading or unloading direction with respect to the disk surface. For maintaining a predetermined gap between the disk surface and the magnetic head, said carriage 210 is provided with a stopper 207 for limiting the rotation of said support member 203. In the loading portion of the magnetooptical disk apparatus there is provided a disk cassette holder 220, which is adapted to descend with the loaded disk cassette 230 thereby mounting the magnetooptical disk 240 onto a spindle motor 280.

Said disk cassette holder 220 is provided with a mechanical contact sensor for detecting the kind of the magnetooptical disk 240, by a characteristically shaped portion, for example, a surface irregularity (to be explained later), provided on the loaded disk cassette 230. Said sensor is comprised of an engaging member capable of engaging with said surface irregularity. In this embodiment, it is comprised of an L-shaped plate spring 211, of which an end is fixed to said disk cassette holder 220 for example by a fixing pin 221A, the central bent portion is provided with a pin-shaped engaging member 211B, and the other end is extended toward a magnetic head retracting mechanism (to be explained later), with an intermediate portion being rotatably supported by a fulcrum member 211C mounted on said disk cassette holder 220.

Said head retracting mechanism in this embodiment is principally comprised of a plate-shaped oscillating member 201 which is oscillably supported by a shaft 201A on the disk cassette holder 220 and is provided, at an end, with a slit-shaped engaging portion 201B for accepting the other end of said plate spring 211. The other end of said oscillating member functions as an engaging part for pushing up said support member 203, which is provided with an engaging member 203A comprised of a roller for contacting said engaging part.

In the above-explained configuration, when the disk cassette holder 220 descends to the loading portion of the apparatus (cf. FIG. 11), the magnetic head 202 and the load beam 204 are maintained in a state inserted into a head window of the disk cassette 230. The loaded state of said magnetic head with respect to the magnetooptical disk varies depending on whether said disk is of ISO standards corresponding to the light modulation system or corresponds to the magnetic field modulation system, as identified by said sensor. In the present embodiment, the kind of the magnetooptical disk can be identified by the characteristic part, or the shape of irregularity, of the disk cassette housing said disk.

Figure 16:
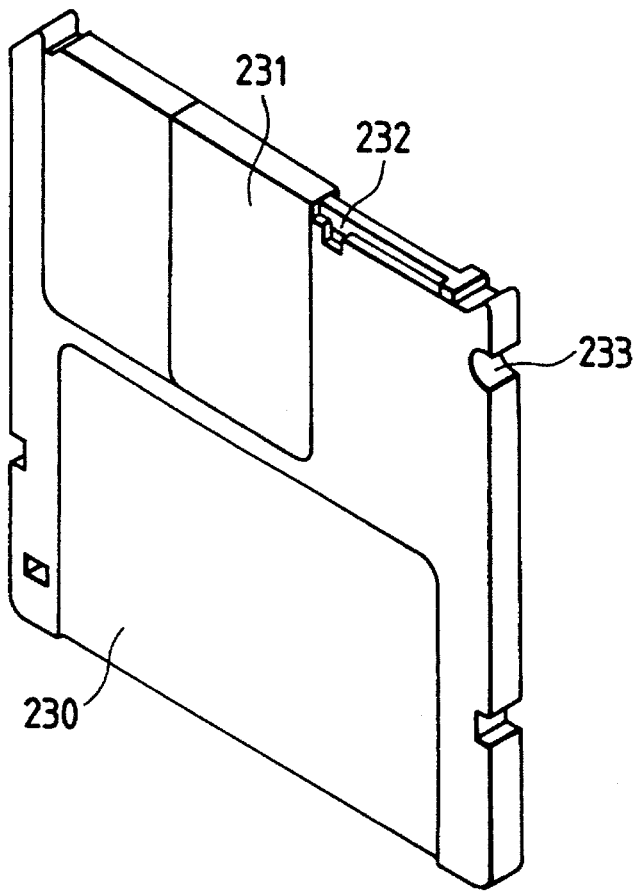
FIG. 16 is a perspective view of a disk cartridge for magnetic field modulation, to be employed in the second embodiment.

FIG. 16 illustrates a disk cassette 230 for the magnetooptical disk of the magnetic field modulation. At a side of a slide 232 for a shutter 231, there is provided a detection part 233 in the form of a penetrating groove. (This is modified into a penetrating form from a non-penetrating groove 233' originally designed for automatic loading.) On the other hand, in a disk cassette 230' for a magnetooptical disk for light modulation shown in FIG. 17, a wall 234 is provided so as to close the groove 233' (which is the original form of the groove 233' for automatic loading).

Figure 13A:
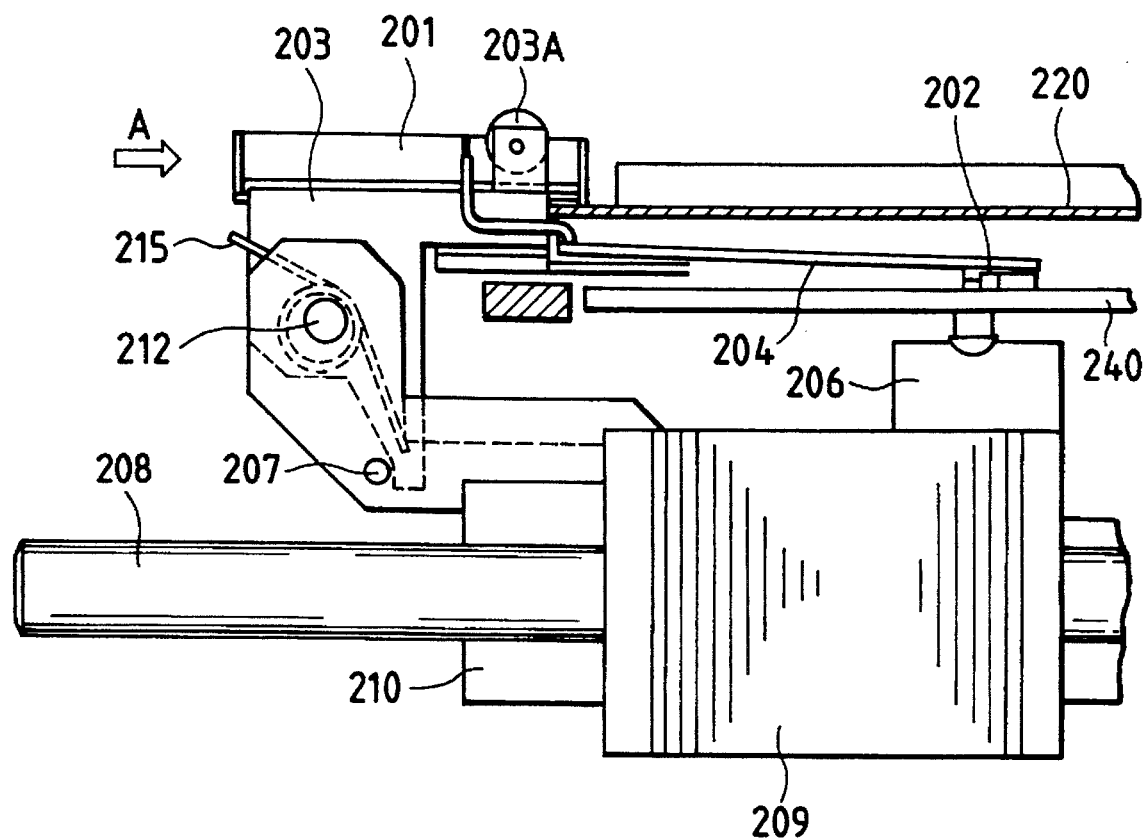
FIGS. 13A and 13B are cross-sectional views showing a state in which a recording medium for magnetic field modulation is loaded in the apparatus shown in FIG. 11.
Figure 13B:
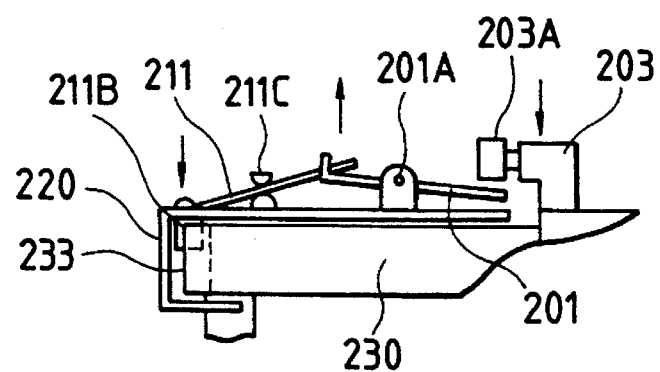

FIGS. 13A and 13B illustrate a state in which a disk cassette 230, housing the magnetooptical disk for magnetic field modulation, is loaded in the disk cassette holder 220. In this case, the engaging member 211B, biased by the plate spring 211 toward the disk cassette 230 descends into and engages with the penetration groove of the detection part 233 of the cassette 230. Consequently said plate spring 211 rotates about the fulcrum member 211C and rotates the oscillating member 201 through the engaging part 211B. Therefore, in the course of descent of the disk cassette 230 and mounting of the disk onto the spindle motor 280, the engaging part is lowered in a direction away from the engaging member 203A, and the engaging member 201B is rotated by the torsion spring 215 about the shaft 201A until it impinges on the stopper 207, whereby the magnetic head and the floating slider supporting said head are maintained at a predetermined distance (slightly larger than the amplitude of oscillation of the disk surface) from the disk surface. Thus, there is enabled magnetooptical information recording on the disk, by the magnetic field modulation method.

Said magnetic head 202 is supported, together with the optical head 206, by the carriage 210 and is rendered simultaneously movable in the seeking and tracking directions, and the width of said oscillating member is selected large, corresponding to the maximum tracking stroke, in order that said engaging member 203A is maintained in contact with the engaging part of the oscillating member 201.

When said disk cassette holder 220 is elevated to release the disk from the spindle motor 280, the engaging member 203A impinges on said oscillating member 201 and is pushed up by the elevation of said cassette holder 220 to rotate the magnetic head support member 203, whereby the magnetic head 202 is retracted upwards from the head window of said disk cassette 230.

Figure 14A:
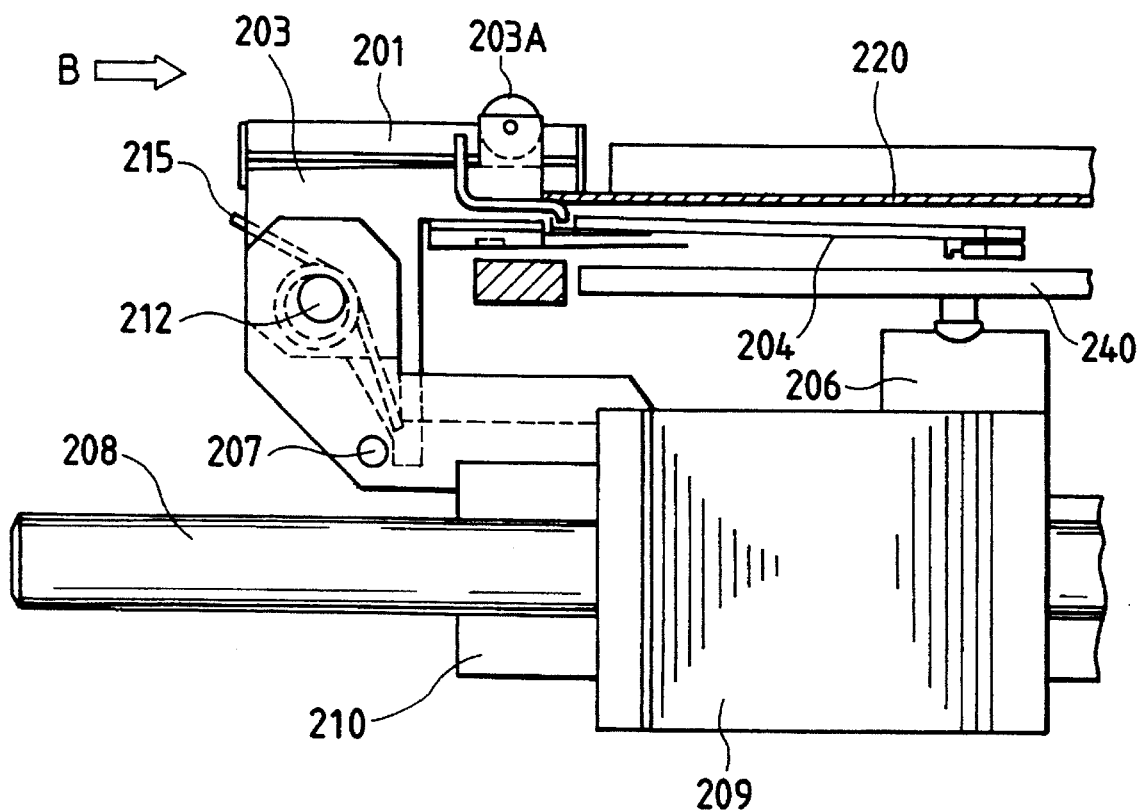
FIGS. 14A and 14B are cross-sectional views showing a state in which a recording medium for light modulation is loaded in the apparatus shown in FIG. 11.
Figure 14B:
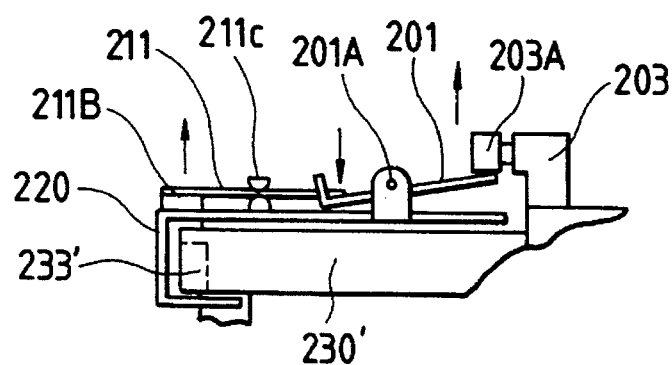

Also, when a disk cassette 230' housing a magnetooptical disk for light modulation is loaded in said disk cassette holder 220 as shown in FIGS. 14A and 14B, said engaging member 211B is pushed upwards by the upper face of said disk cassette, as the detection part of said disk cassette 230' is not a penetrating groove (blocked by a wall). Consequently the plate spring 211 rotates about the fulcrum member 211C to rotate, by the extended portion, the oscillating member 201. As a result the engaging member 203A is pushed up by the end of said oscillating member, whereby the magnetic head 202 and the floating slider supporting said head can be retracted upwards.

Figure 15A:
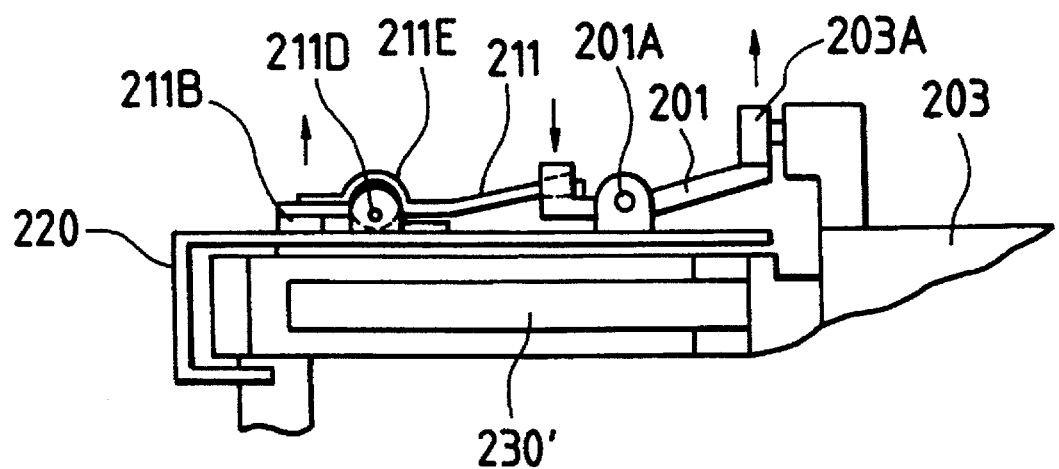
FIGS. 15A and 15B are views showing a variation of the apparatus shown in FIG. 11.
Figure 15B:
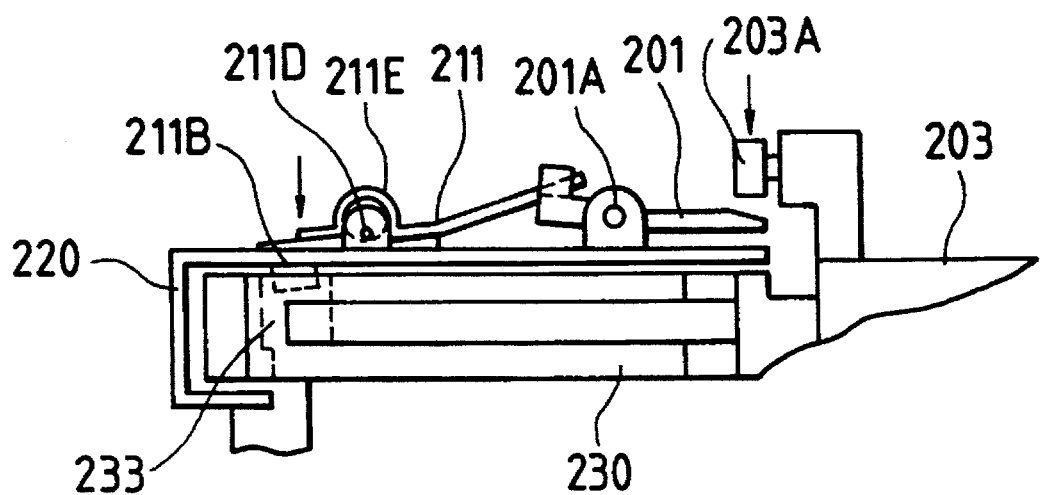

The sensor and the magnetic head retracting mechanism may otherwise by constructed as shown in FIGS. 15A and 15B. In this configuration, the plate spring 211 serving as the sensor is simply supported by a shaft 211D, and supports, at an end thereof, the engaging member 211B across an arc-shaped elastic part 211E. Other parts are constructed the same as explained above. In the present configuration, the engaging member 211B is elastically biased toward the upper face of the cassette by said elastic part 211E. In case a cassette 230' of a magnetooptical disk for light modulation is loaded in the disk cassette holder 220, the engaging member 203A is pushed up by the engaging part of the oscillating member 201 as shown in FIG. 16 to retract the magnetic head upwards from the disk face. On the other hand, in case a cassette 230 of a magnetooptical disk for magnetic field modulation is loaded, the engaging part of the oscillating member 201 is lowered to bring the magnetic head close to the disk face.

Figure 17:
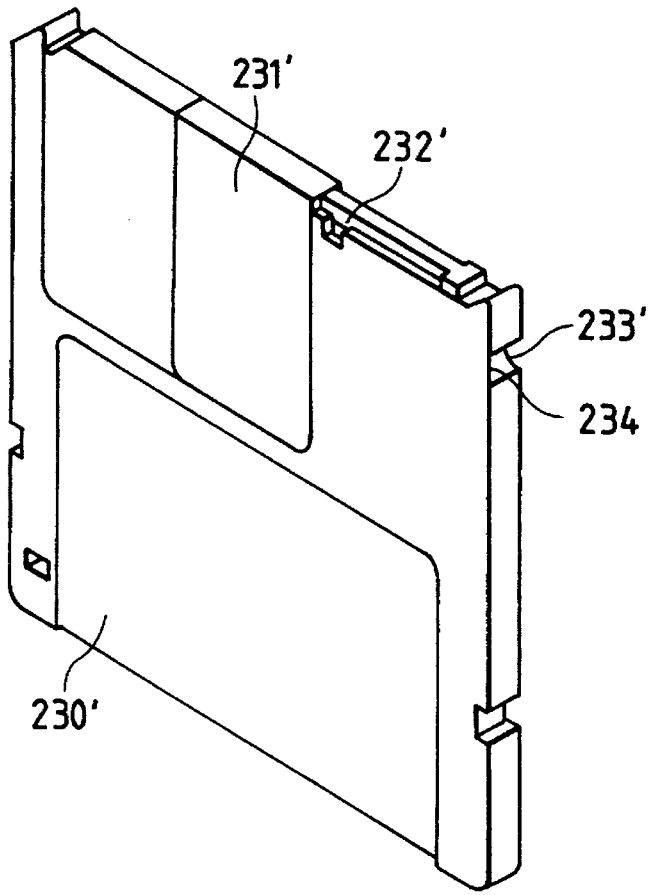
FIG. 17 is a perspective view of a disk cartridge for light modulation, to be employed in the second embodiment.

The characteristic part, or the shape of a surface irregularity, of the disk cassette in the above-explained embodiment is not limited to those shown in FIGS. 16 and 17 but can be modified in various manner. Said detection part 233 is provided in a position excluding the areas of the label and shutter of the disk cassette. Said irregularity is preferably comprised of a simple groove or hole.

[3rd embodiment]

In the following there will be explained a 4th embodiment of the present invention, with reference to FIGS. 18 to 23, wherein the same components as those in the 2nd embodiment are represented by the same numbers.

Figure 18:
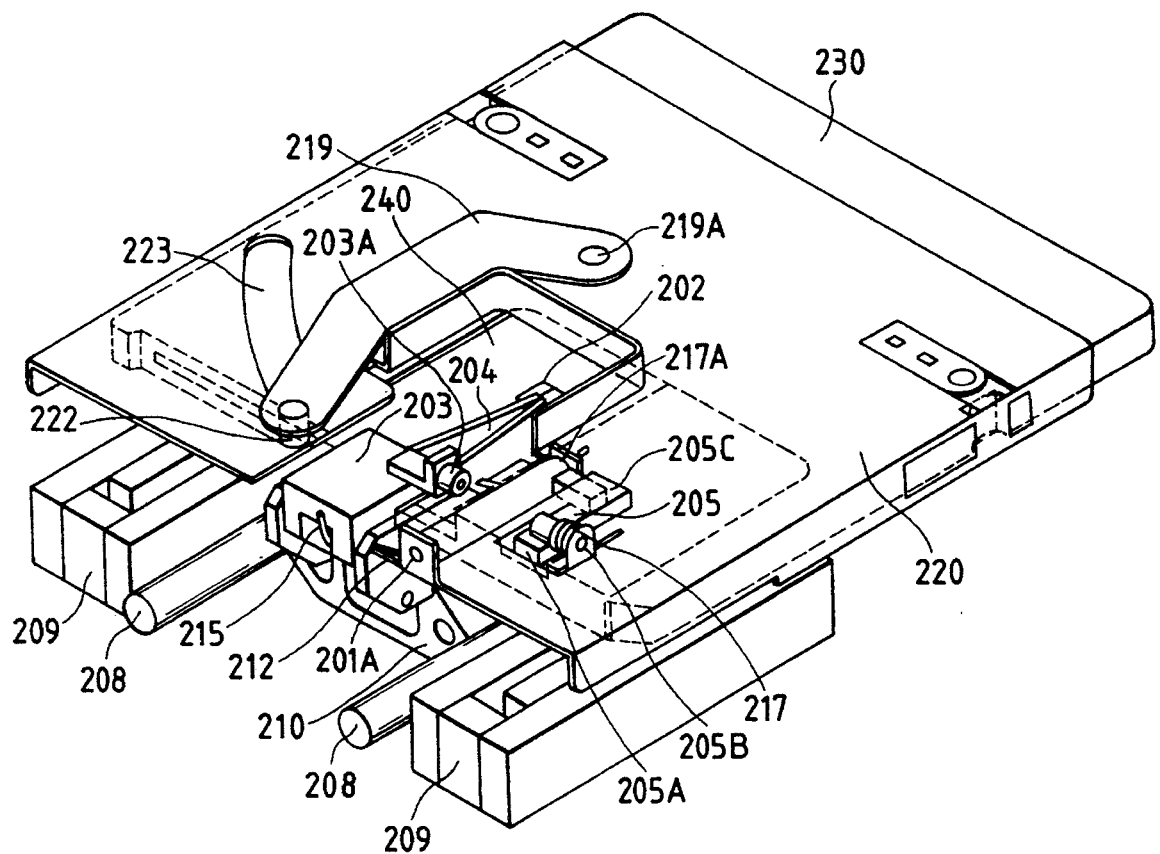
FIG. 18 is a perspective view of a third embodiment of the present invention.
Figure 19:
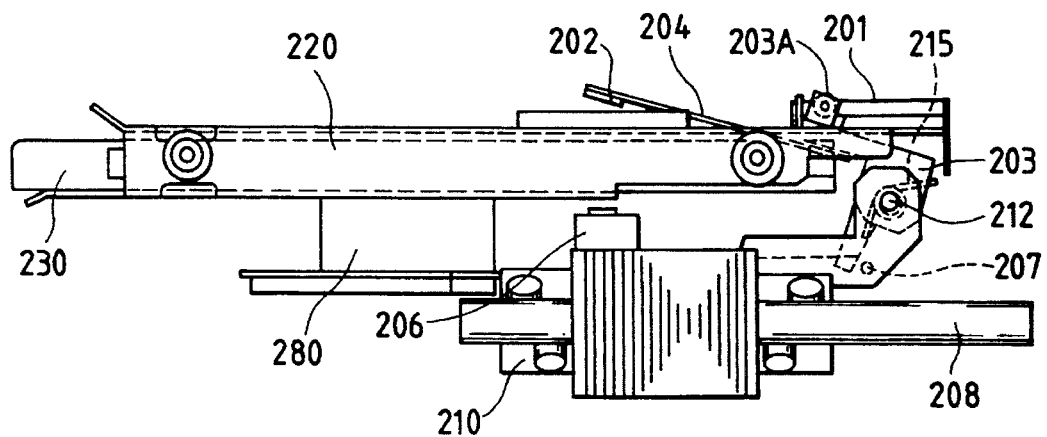
FIG. 19 is a cross-sectional view of the apparatus shown in FIG. 18.
Figure 20A:
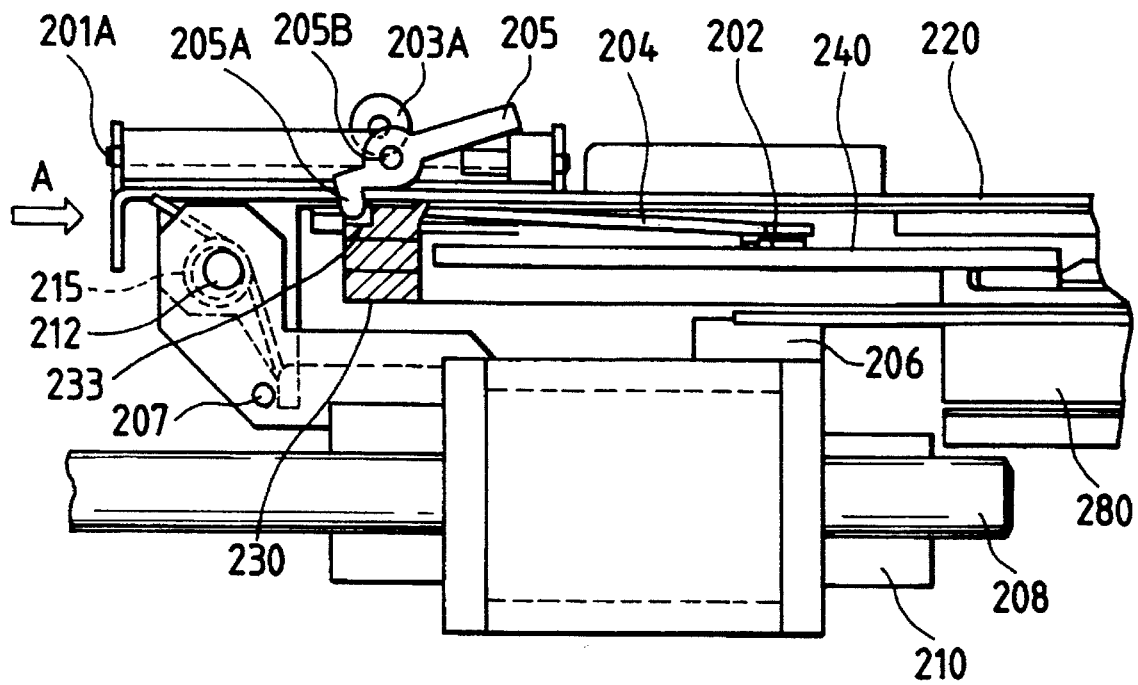
FIGS. 20A and 20B are cross-sectional views showing a state in which a recording medium for magnetic field modulation is loaded in the apparatus shown in FIG. 18.
Figure 20B:
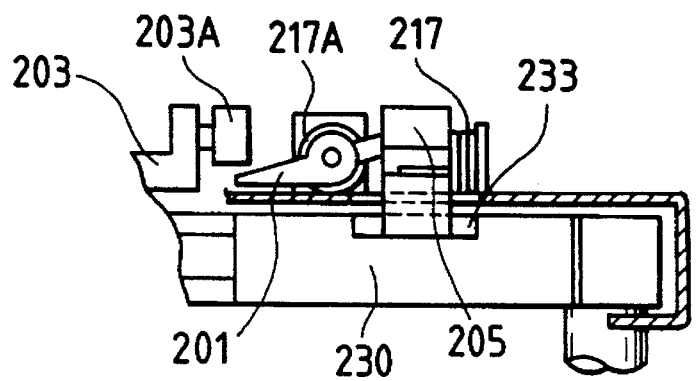
Figure 21A:
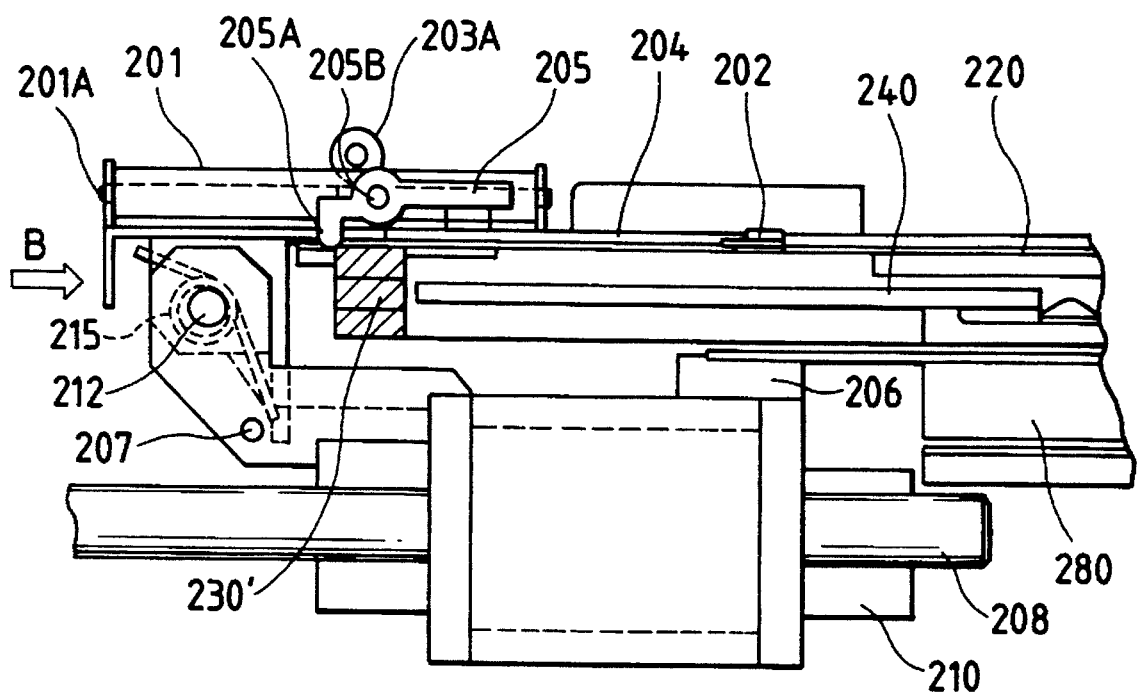
FIGS. 21A and 21B are cross-sectional views showing a state in which a recording medium for light modulation is loaded in the apparatus shown in FIG. 18.
Figure 21B:
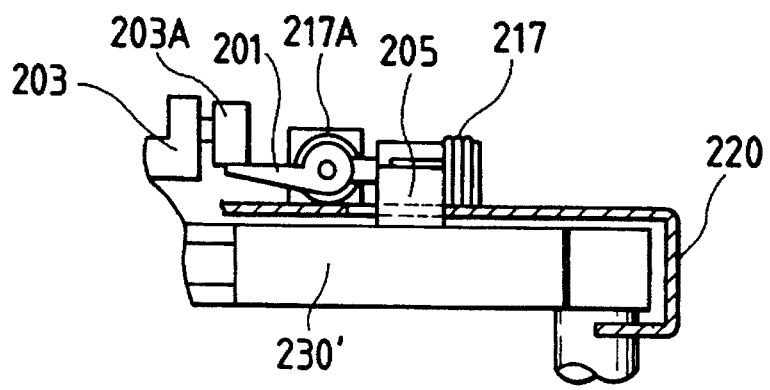

FIG. 18 shows a loading completed state in which the disk cassette holder 220 is loaded with a disk cassette 230 for magnetic field modulation and is lowered. On said disk cassette holder 220, a lever 219 for opening and closing the shutter is rotatably mounted by a shaft 219A and is provided with an actuating member 222 at an end. In the course of insertion of said disk cassette 230 into the disk cassette holder 220, said actuating member 222 is pushed by the front edge of the disk cassette 230 and pushes a slide 232 laterally, while being guided by a slit 223, thereby opening a shutter 231. In the present configuration, a mechanical contact sensor 205 for identifying the kind of the magnetooptical disk is provided, at an end, with an engaging member 205A, in vertically facing relationship with an end of the oscillating member 201, and is rotatably supported by a shaft 205B on said disk cassette holder 220, and said engaging member 205A is biased downwards by a torsion spring 217. Said engaging member 205A faces the disk cassette 230 at a position where the shutter 231 is moved after opening. In the present embodiment, the oscillating member 201 is biased by the torsion spring 217A in a direction to separate the engaging part from the engaging member 203A.

Figure 22:
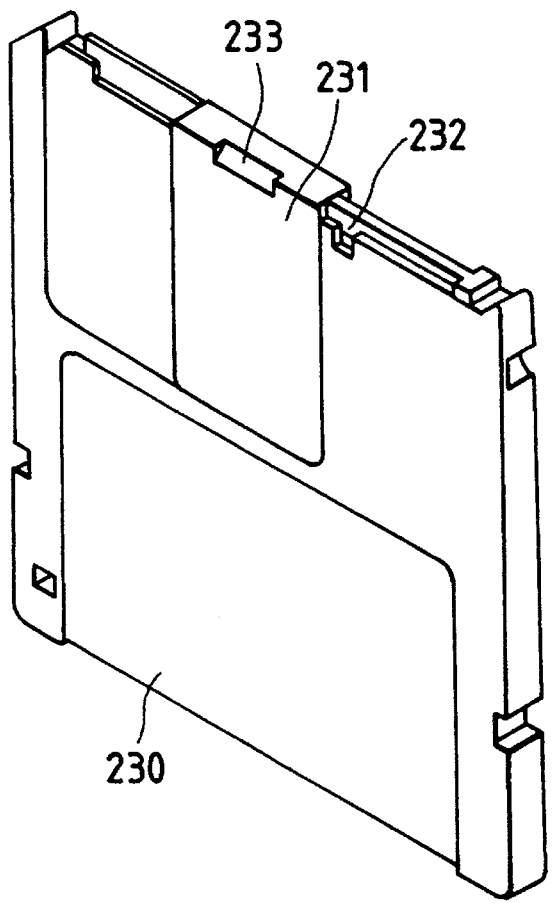
FIG. 22 is a perspective view of a disk cartridge for magnetic field modulation, to be employed in the third embodiment.
Figure 23:
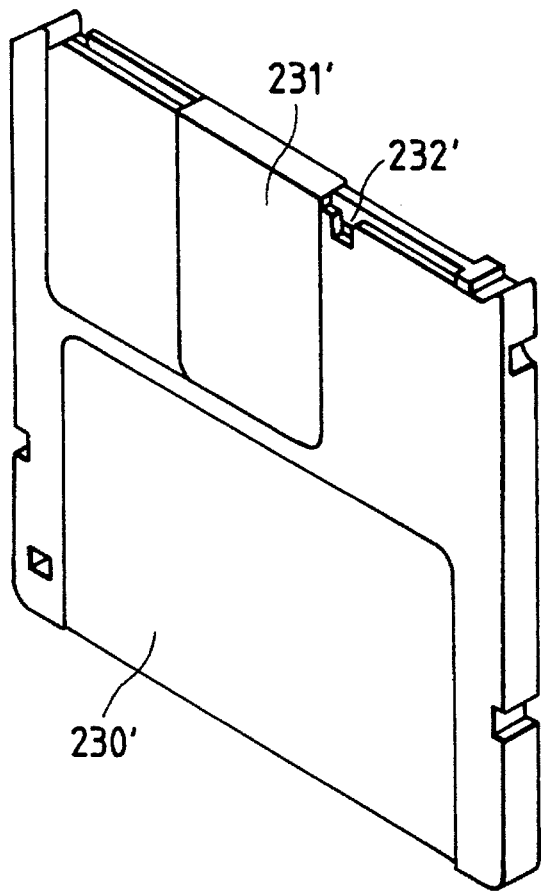
FIG. 23 is a perspective view of a disk cartridge for light modulation, to be employed in the third embodiment.

The characteristic part of the disk cassette 230 for magnetic field modulation, to be employed in the present magnetooptical disk apparatus, is comprised of a groove 233 formed in the front edge of the shutter 231, as shown in FIG. 22. As shown in FIG. 23, the cassette 230' for light modulation is not provided with said groove in the shutter 231'.

When a disk cassette 230 for magnetic field modulation is loaded in the disk cassette holder 220, the engaging member 205A descends in and engages with said groove 233 at the opening of the shutter 231, whereby the sensor 205 is disengaged from the oscillating member 201. Consequently, when the disk is set on the spindle motor 280 by the descent of the disk cassette holder 220, the engaging member 203A is not pushed up by said engaging part, so that the magnetic head 202 and the load beam 204 are inserted into the head window of said disk cassette 230 and the magnetic head 202 is maintained in facing relationship with the disk face with a predetermined gap therebetween.

When the disk is released from the spindle motor 280 by the ascent of the disk cassette holder 220, the engaging member 203A impinges on the oscillating member 201 and is pushed up by the ascent of said disk cassette holder to rotate the magnetic head support member 203, whereby the magnetic head 202 is retracted upwards from the head window of the disk cassette 230.

On the other hand, when a disk cassette 230' for light modulation is loaded in the disk cassette holder 220, the engaging member 205A is supported by the shutter 231 even after opening thereof because of the absence of a groove therein, whereby the sensor 205 remains engaged with the oscillating member 201. Consequently, after the disk setting on the spindle motor 280 by the descent of the disk cassette holder 220, the engaging part thereof still pushes up the engaging member 203A, whereby the magnetic head 202 and the load beam 204 are retracted outside the head window of the disk cassette 230'.

[4th embodiment]

Now reference is made to FIGS. 24 to 27 for explaining a 4th embodiment, employing a mechanical structure in which the sensor 205 and the oscillating member 201 are integrated. The engaging member 205A of the sensor 205 is so formed as to protrude under the oscillating member 201, and is positioned opposed to the disk cassette 230 or 230', through an aperture 220A formed in the cassette holder 220. The force for biasing said engaging member 205A toward the disk cassette is also provided by the torsion spring 217A which biases the oscillating member 201.

Figure 26:
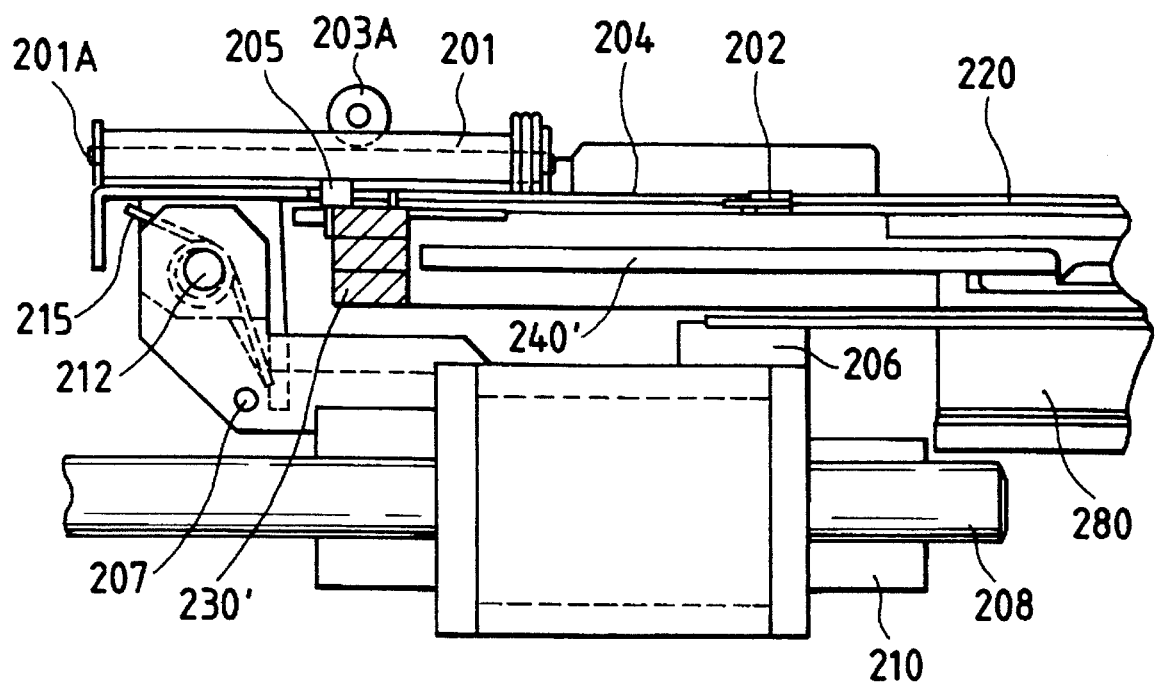
FIG. 26 is a view of the apparatus of the fourth embodiment loaded with a recording medium for light modulation.
Figure 27:
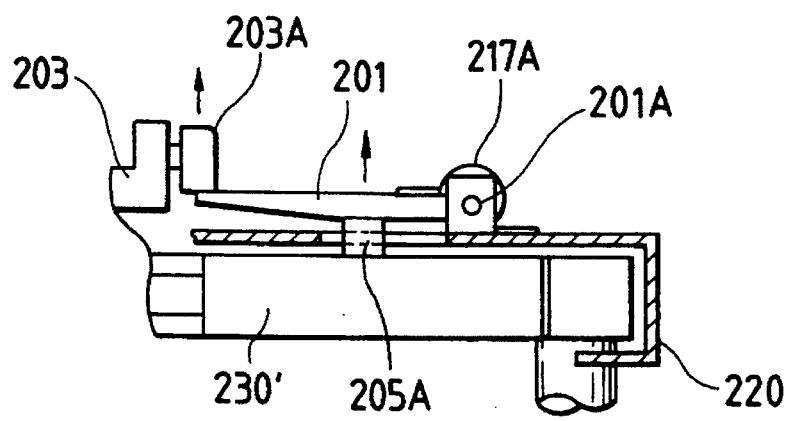
FIG. 27 is a partial magnified view of a feature part of the apparatus shown in FIG. 26.

When case a disk cassette 230' for light modulation is loaded in the cassette holder 220, the engaging member 205A is pushed up by the upper face of the shutter 231 as shown in FIGS. 26 and 27, whereby the engaging part of the oscillating member 201 pushes upwards the engaging member 203A (as indicated by an arrow in FIG. 27). Consequently, after the loading of said disk cassette 230', the magnetic head 202 for magnetic field modulation and the load beam 204 supporting said magnetic head are maintained in the retracted state (see FIG. 26).

Figure 24:
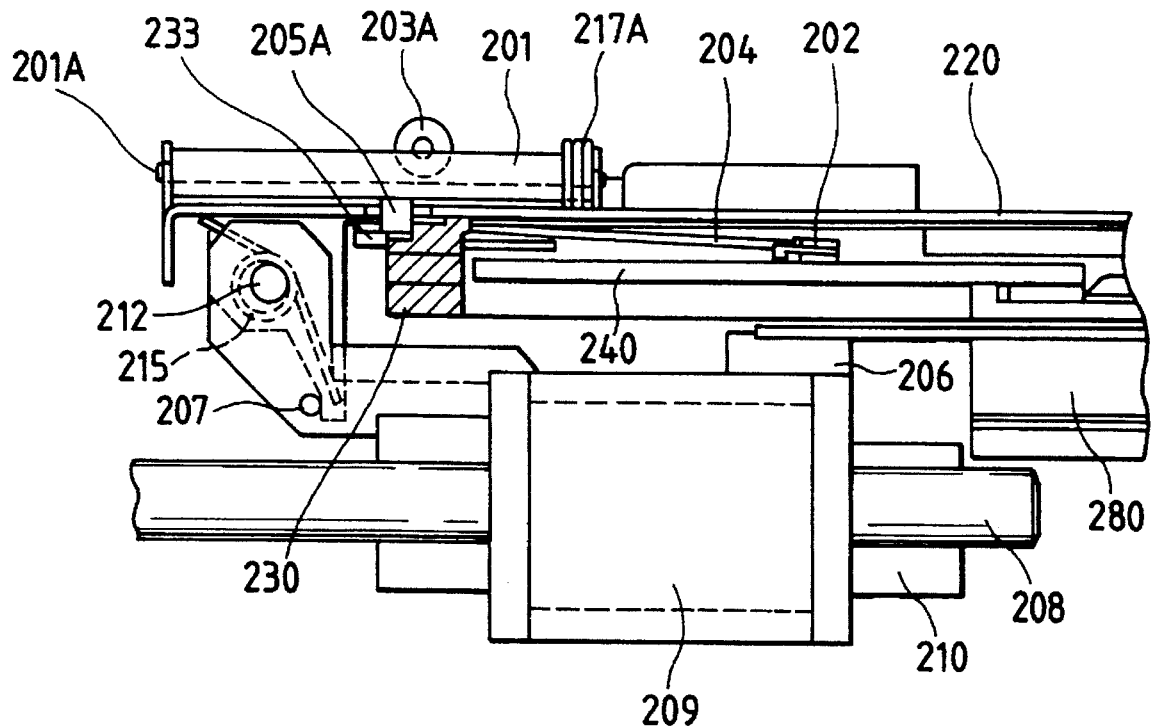
FIG. 24 is a view of an apparatus, constituting a fourth embodiment of the present invention, loaded with a recording medium for magnetic field modulation.
Figure 25:
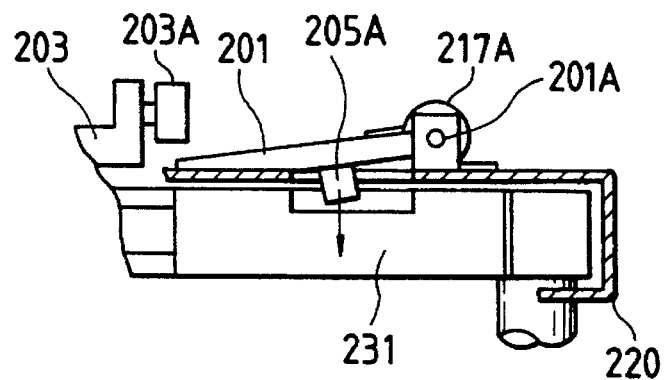
FIG. 25 is a partial magnified view of a feature part of the apparatus shown in FIG. 24.

Also, when a disk cassette 230 for magnetic field modulation is loaded in the cassette holder 220, the engaging member 205A is inserted into the groove 233 formed in the shutter 231 as shown in FIGS. 24 and 25, whereby the engaging part of the oscillating member 201 is separated from the engaging member 203A (FIG. 25). Consequently, after the loading of the disk cassette 230, the magnetic head support member 203 rotates until it impinges on the stopper 207, whereby the magnetic head 202 and the load beam 204 are brought close to the surface of the magnetooptical disk 240 (see FIG. 24).

[5th embodiment]

The configuration of such a magnetooptical disk apparatus and of the characteristic part of the corresponding magnetooptical disk cassette can be modified in various manners. In the following there are shown examples of a modification of the disk cassette.

Figure 28:
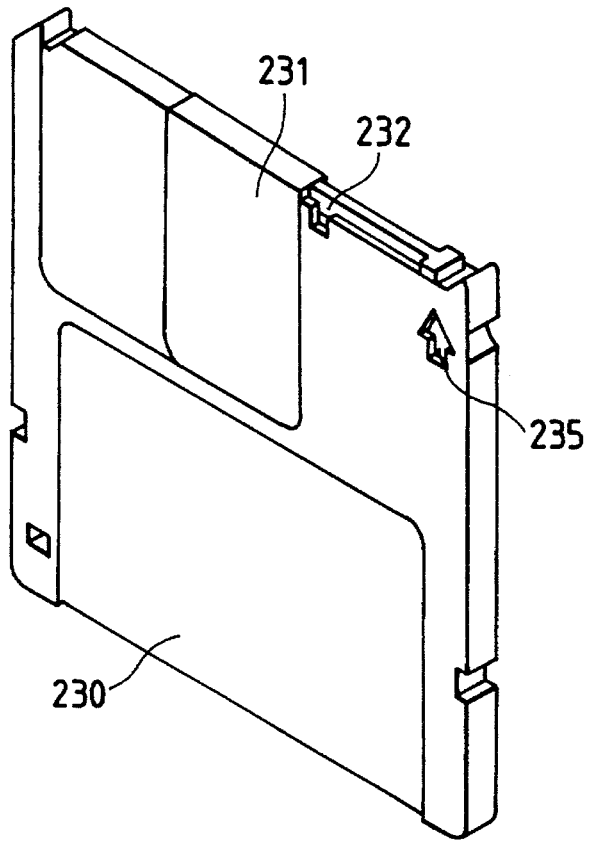

FIG. 28 illustrates a configuration having an arrow-shaped groove, on a shell side of insertion, into the head window, of the floating slider supporting the magnetic head for generating the bias magnetic field in the magnetic field modulation system. Said groove is used for identifying the kind of the magnetooptical disk, and, if said groove is absent, the magnetic head is retracted by a mechanical link, while, if said groove is present, an engaging member of a sensor as explained above is made to engage therein, thus enabling access of the magnetic head to the disk surface.

Figure 29:
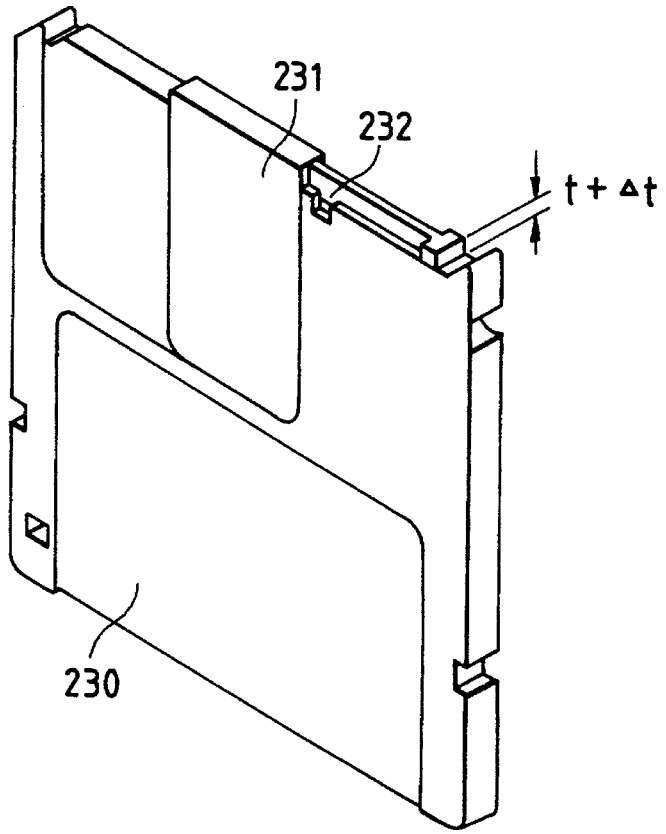
Figure 32:
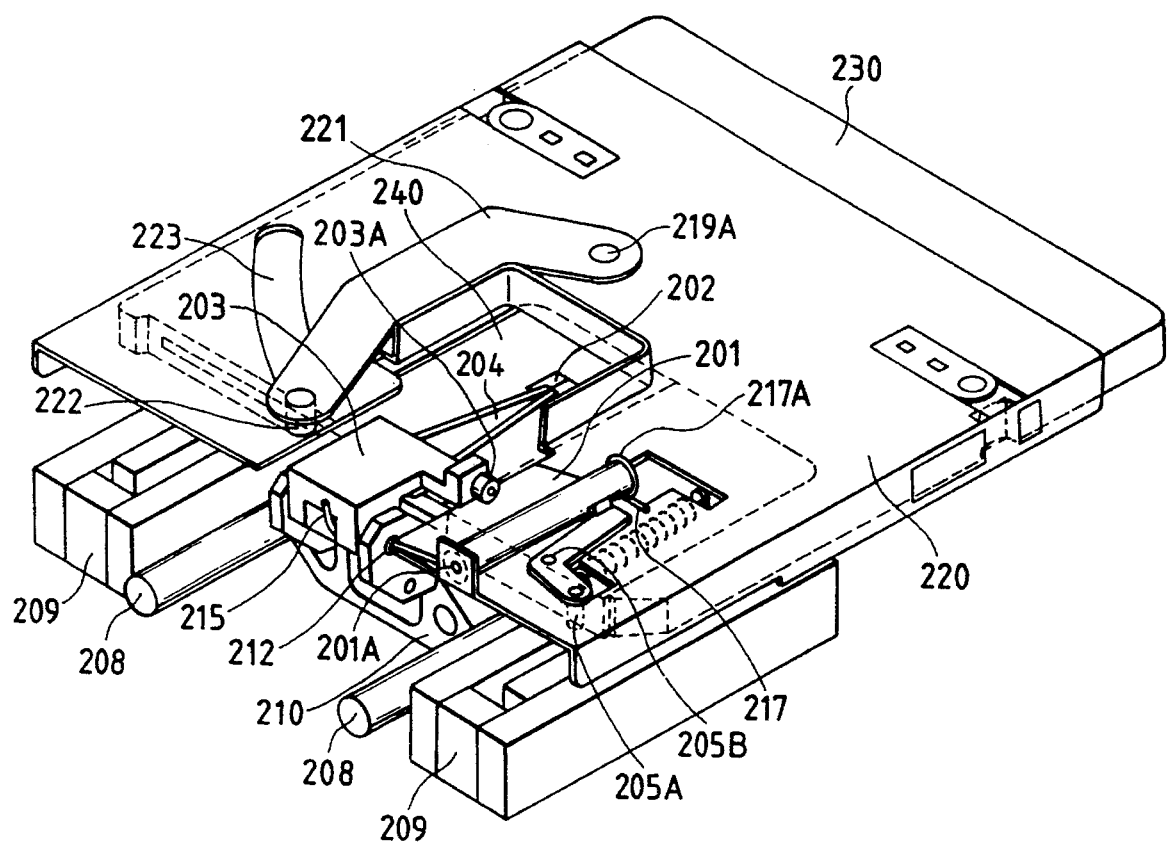
FIG. 32 is a perspective view of a magnetooptical disk apparatus matching the disk cartridge shown in FIG. 30.
Figure 33:
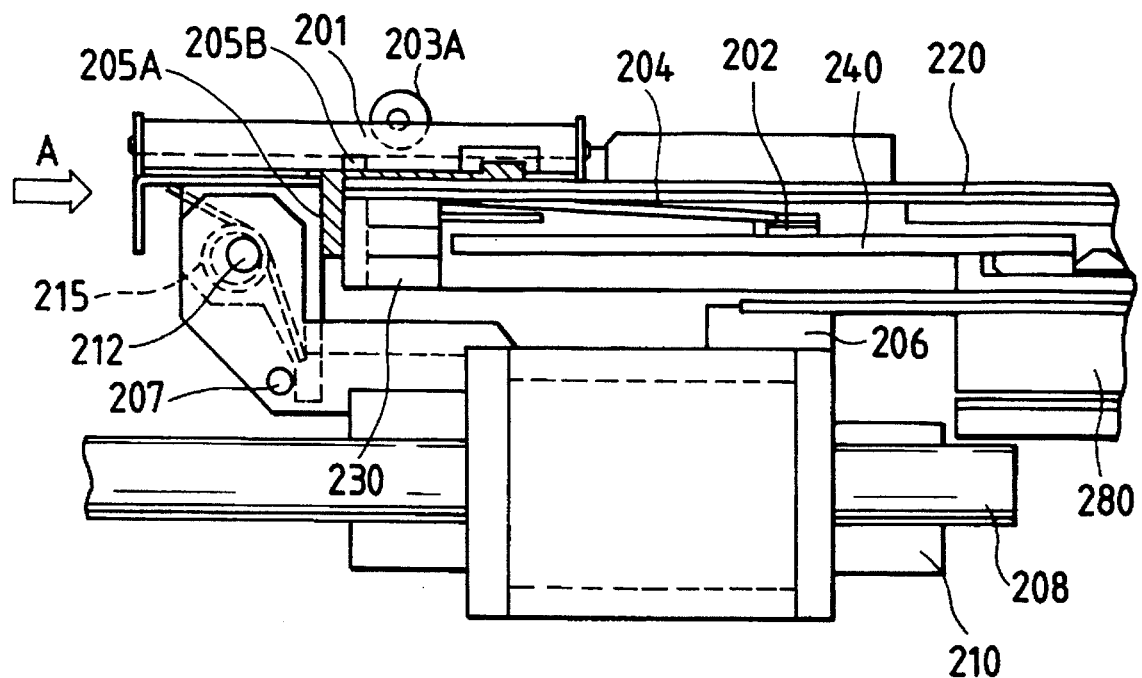
FIG. 33 is a view showing a state in which a recording medium for magnetic field modulation is loaded in the apparatus shown in FIG. 32.
Figure 34:
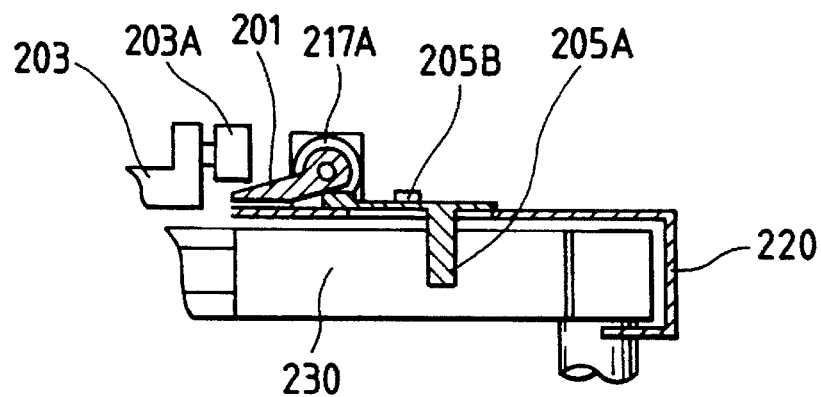
FIG. 34 is a partial magnified view of a feature part of the apparatus shown in FIG. 33.

FIG. 29 illustrates a configuration utilizing the form of the shutter slide 232 as the detection part for identifying the kind of the disk. In this case said shutter slide has a larger height $t+\Delta t$ in comparison with the normal height t, in the inserting direction of the disk cassette, and the difference in said height is detected by a mechanical contact sensor.

FIG. 30 illustrates a configuration utilizing the form of the shutter 231 as the detection part for identifying the kind of the disk. In this case said shutter is made higher by $\Delta t$ than the normal height, in the inserting direction of the disk cassette, and the difference in said height is detected by a mechanical contact sensor.

FIGS. $31A_1$, and $31A_2$ illustrate a configuration utilizing the presence or absence of a bevel part 234', conventionally known for identifying the inverted state of the disk cassette, also for identifying the kind of the magnetooptical disk. There may also be provided, as shown in FIG. 31B, a recess 234" inversely tapered in comparison with said bevel part.

The disk cassette without the bevel part may be so constructed that the engaging member of the mechanical contact sensor is inserted into a recess 236, positioned laterally to said bevel part, at the cassette loading. The absence of such a bevel part does not cause any inconvenience because the pin for opening and closing the shutter can engage with said recess.

The characteristic part of the disk cassette can thus be comprised of the shape of the cassette surface, and the kind of the magnetooptical disk can be identified by detecting such a surface shape with a mechanical contact sensor. The characteristic parts shown in FIGS. 30, $31A_1$, $31A_2$ and 31B can be detected even from a side opposite to the shutter opening mechanism, so that no limitation is imposed on the configuration of said shutter opening mechanism.

In the following there will be explained the configuration of a magnetooptical disk apparatus, matching the configuration of the disk cassette shown in FIG. 30, with reference to FIGS. 32 to 36. Different from the third embodiment, the mechanical contact sensor 205 for identifying the kind of the magnetooptical disk is provided with an engaging member 205A at an end, also is laterally positioned at the other end so as to be detachably insertable to the lower side of the oscillating member 201, and is supported at the middle by a shaft 205B on the disk cassette holder 220, wherein said engaging member 205A is longitudinally biased by a tension spring 217. Said engaging member 205A faces the front edge of the disk cassette 230 at the position of the shutter 231 in the opened state. In the present embodiment, the oscillating member 201 is rotationally biased by a torsion spring 217A in a direction for separating the engaging part away from the engaging member 203A.

In the characteristic part of the disk cassette 230 for magnetic field modulation, to be employed in the present magnetooptical disk apparatus, a particularly protruding portion is formed on the front edge of the shutter 231, as shown in FIG. 30. On the other hand, in the disk cassette 230' for light modulation, the front edge of the shutter 231' has the ordinary shape as shown in FIG. 23.

In such a configuration, when a disk cassette 230 for magnetic field modulation is loaded in the disk cassette holder 220, the engaging member 205A is pushed by the front end of said shutter 231 after the opening thereof and extracts the other end 205C from the lower side of the oscillating member 201 against the function of the tension spring 217 (see FIGS. 33 and 34), whereby the sensor 205 is disengaged from the oscillating member 201. Consequently, at the setting of the disk on the spindle motor 280 by the descent of the disk cassette holder 220, the engaging member 203A is not pushed up by the aforementioned engaging part, so that the magnetic head 202 and the load beam 204 are inserted into the head window of the disk cassette 230 and said magnetic head 202 is brought close to the disk surface, with a predetermined gap therebetween.

Also, when the disk is released from the spindle motor 280 by the ascent of the disk cassette holder 220, the engaging member 203A impinges on the oscillating member 201 and is pushed up by the ascent of said disk cassette holder 220 to rotate the magnetic head support member 203, whereby said magnetic head 203 is retracted upwards from the head window of the disk cassette 230.

Figure 35:
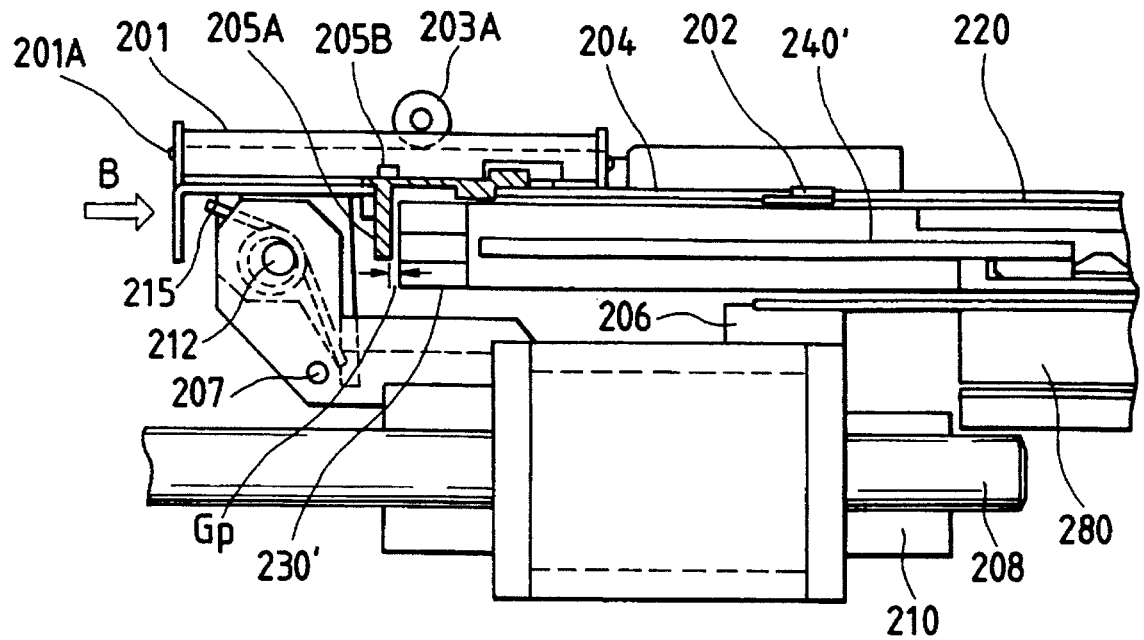
FIG. 35 is a view showing a state in which a recording medium for light modulation is loaded in the apparatus shown in FIG. 32.
Figure 36:
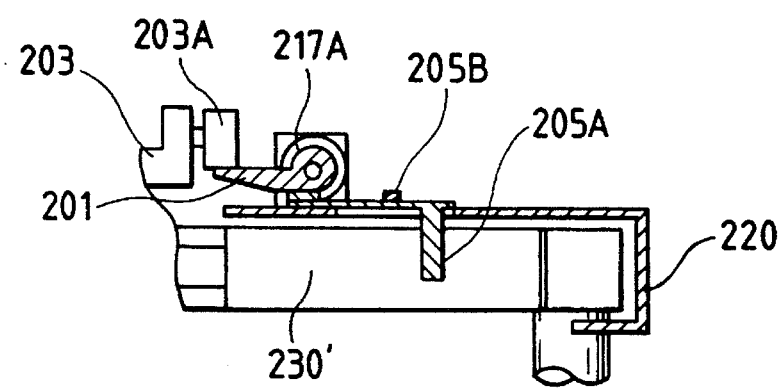
FIG. 36 is a partial magnified view of a feature part of the apparatus shown in FIG. 35.
Figure 37:
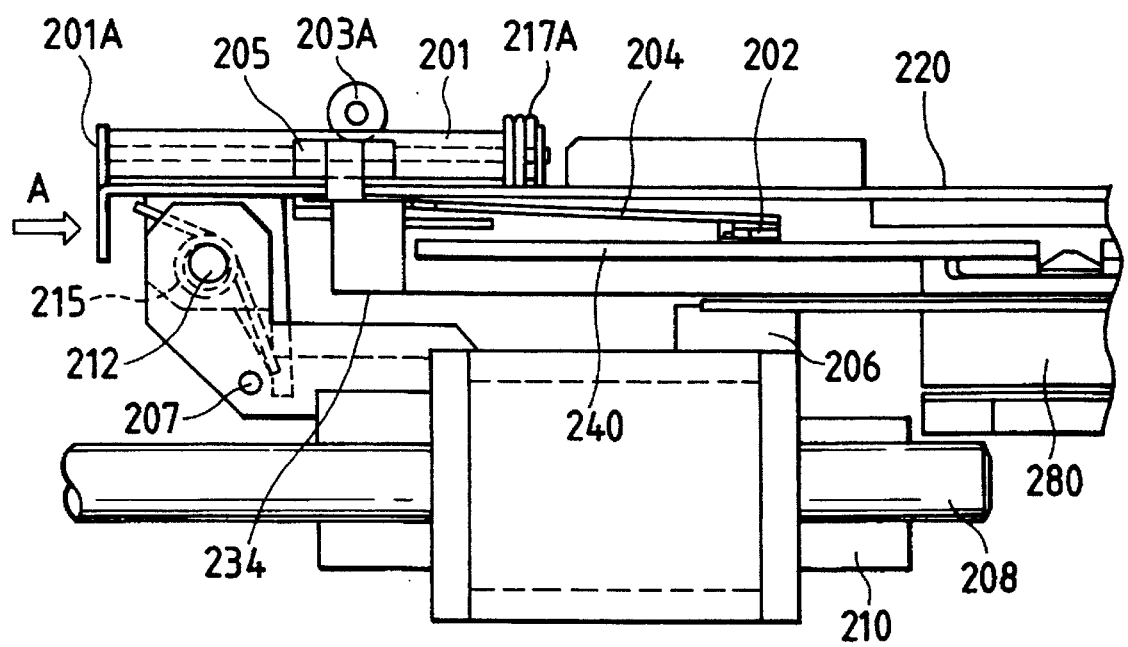
FIG. 37 is a view showing an apparatus of a 6th embodiment of the present invention, loaded with a recording medium for magnetic field modulation.

On the other hand, when a disk cassette 230' for light modulation is loaded in the disk cassette holder 220, the front edge of the shutter 231 is separated from the engaging member 205A for example by a gap Gp even after the opening of said shutter, whereby said sensor 205 remains engaged with the oscillating member 201 (see FIGS. 35 and 36). Thus, after the disk is set on the spindle motor 280 by the descent of said disk cassette holder 220, the engaging member 203A is pushed up by said engaging part whereby the magnetic head 202 and the load beam 204 are retracted from the head window of the disk cassette 230'.

[6th embodiment]

In the following there will be explained the configuration of a magnetooptical disk apparatus, matching the configuration of the disk cassette shown in FIG. $31A_1$, $31A_2$ and 31B with reference to FIGS. 37 to 40. Different from the 4th embodiment, the mechanical contact sensor 205 for identifying the kind of the magnetooptical disk protrudes downwards at the end of an extension 201C of said oscillating member 201, and faces the disk cassette 230 or 230' across an aperture formed in the cassette holder 220. The force for biasing the engaging member 205A toward the disk cassette is obtained by a torsion spring 217A provided for biasing said oscillating member 201.

Figure 39:
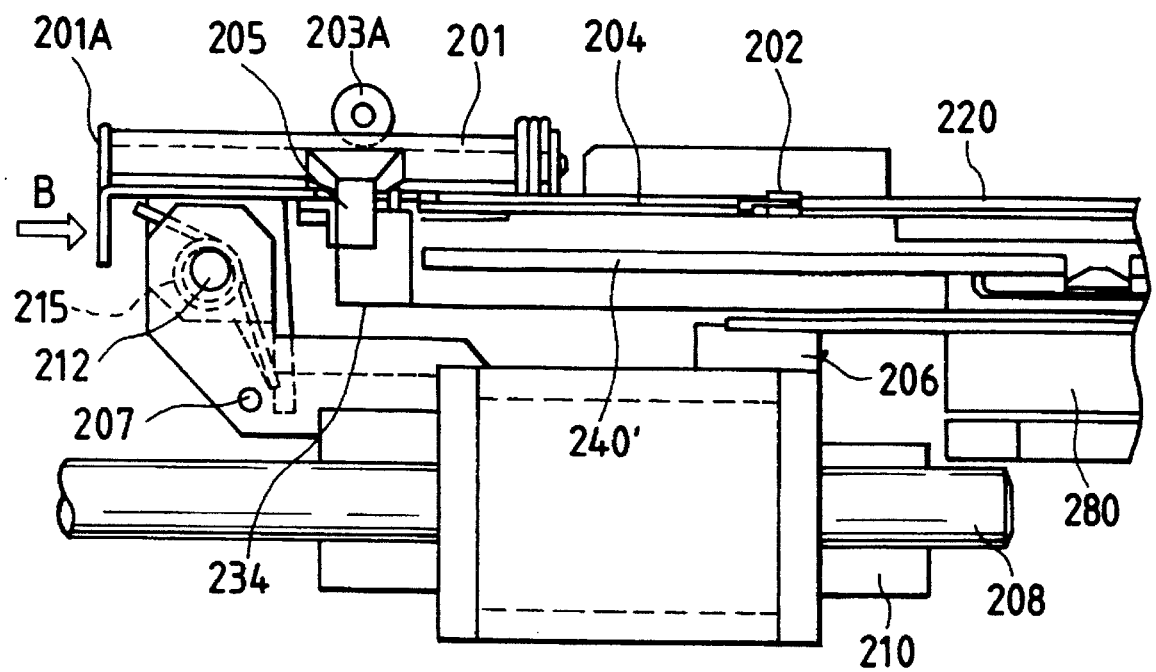
FIG. 39 is a view showing the apparatus of the 6th embodiment, loaded with a recording medium for light modulation.
Figure 40:
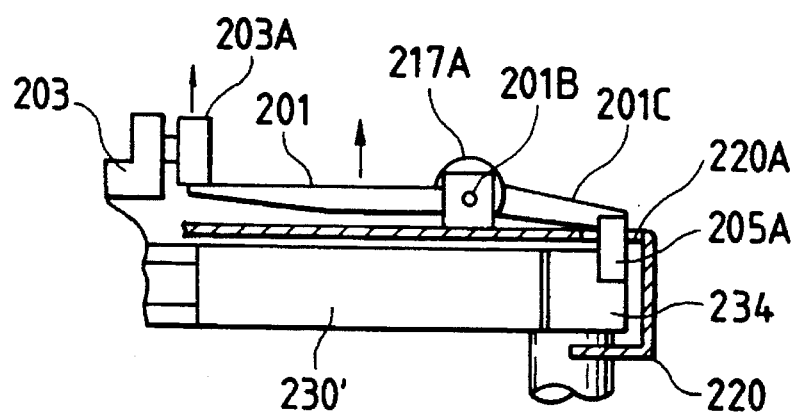
FIG. 40 is a magnified view of a feature part of the apparatus shown in FIG. 39.

In such a configuration, when a disk cassette 230' for light modulation is loaded in the cassette holder 220, the engaging member 205A fits into a bevel portion 234' provided at a corner of the shutter 231 as shown in FIGS. 39 and 40, whereby the oscillating member 201 presses, by the engaging part thereof, the engaging member 203A upward, as indicated by an arrow in FIG. 40. Consequently, even after the loading of the disk cassette 230', the magnetic head 202 for a magnetic field modulation method and the load beam 204 supporting said magnetic head are maintained in the retracted state (cf. FIG. 39).

Figure 38:
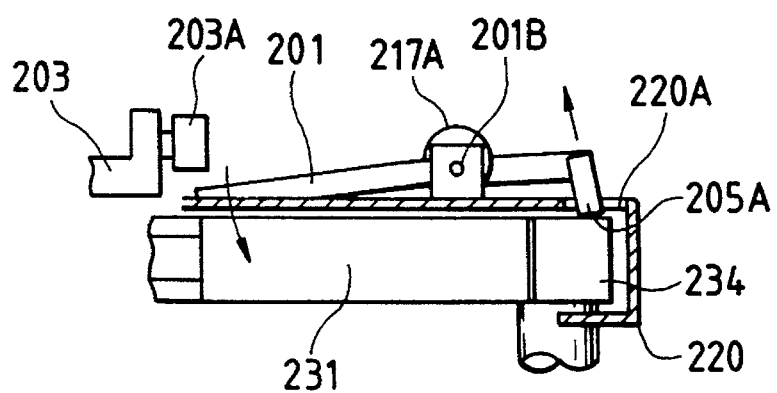
FIG. 38 is a magnified view of a feature part of the apparatus shown in FIG. 37.

Also, when a disk cassette 230 for magnetic field modulation is loaded in the cassette holder 220, the corner 234 (without bevel part) of the disk cassette 230 pushes up said engaging member 205A, whereby the engaging part of the oscillating member 201 becomes separated from the engaging member 203A (cf. FIG. 38). Consequently, at the completion of loading of said disk cassette 230, the magnetic head support member 203 rotates until it impinges on the stopper 207, whereby the magnetic head 202 and the load beam 204 are brought close to the surface of the magnetooptical disk 240 (cf. FIG. 37).

[7th embodiment]

Figure 41:
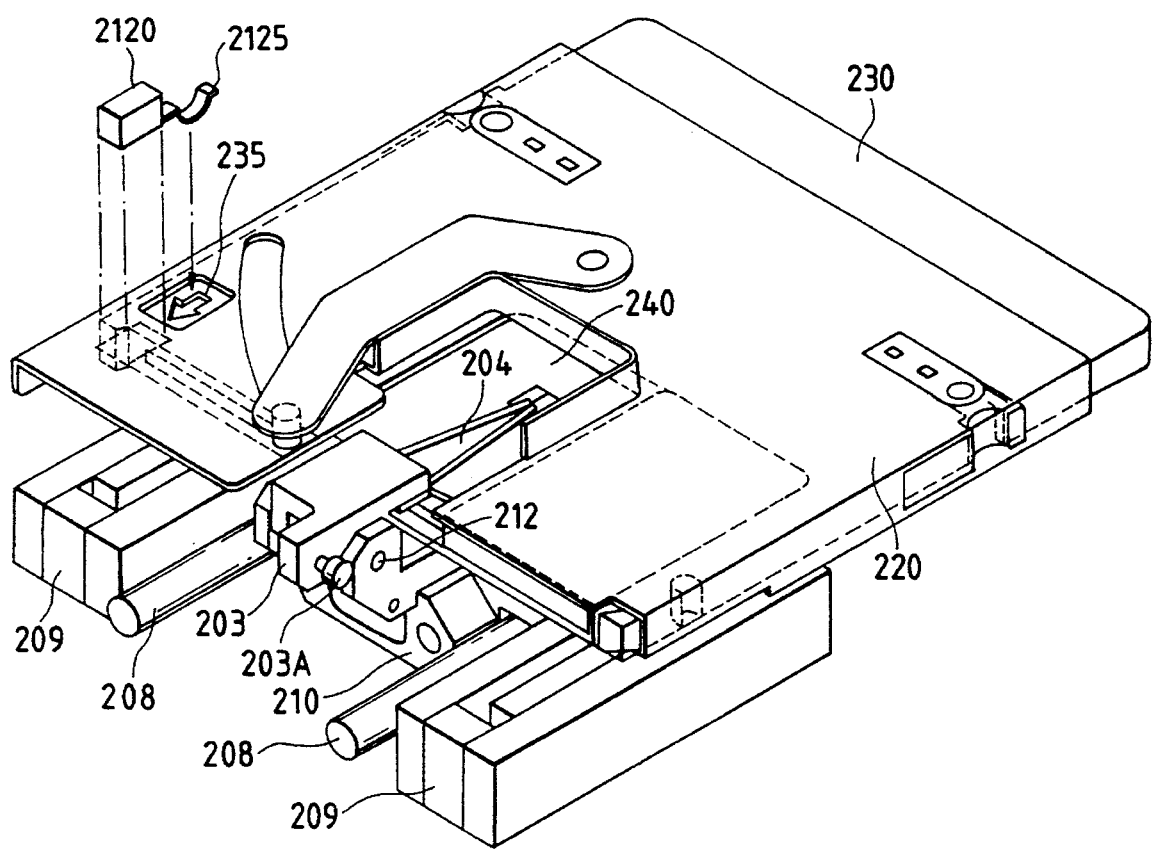
FIG. 41 is a perspective view of a 7th embodiment of the present invention.

Now reference is made to FIG. 41 for explaining a mechanical contact sensor, matching the characteristic part of the disk cassette shown in FIG. 28. A microswitch 2120 is provided as said sensor on the cassette holder 220, and is provided with a contactor serving as an engaging member 2125 which consists of a plate spring and matches an arrow-shaped hole 235 provided in the disk cassette 230. In the present magnetooptical disk apparatus, the on-off operation of said microswitch 2120 is detected in the form of an electrical signal in the control system, and there is provided a pressing member 2107 for pressing the engaging member 203A (2106) provided on the magnetic head support member 203 (2111).

Figure 42B:
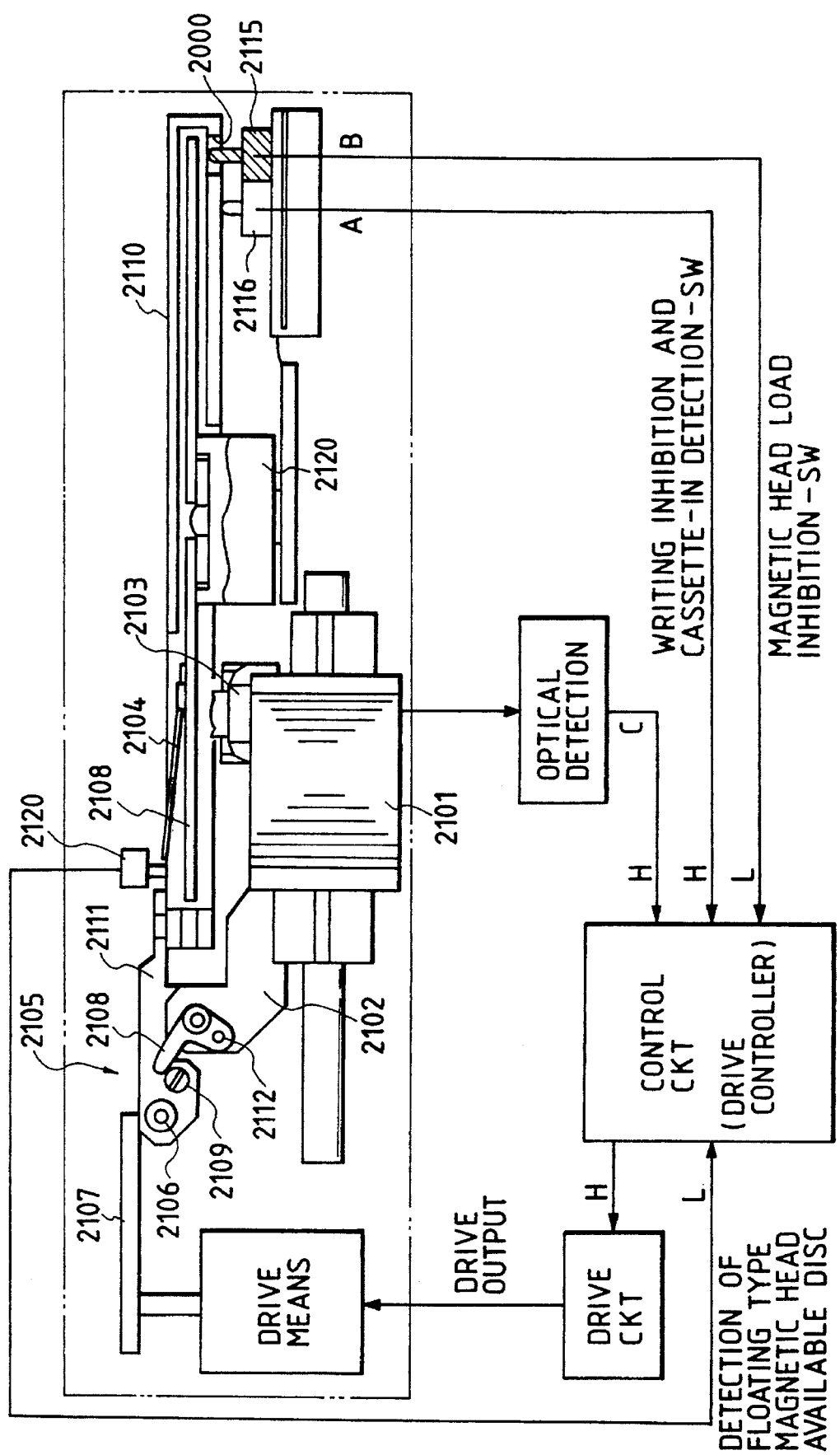
Figure 42C:
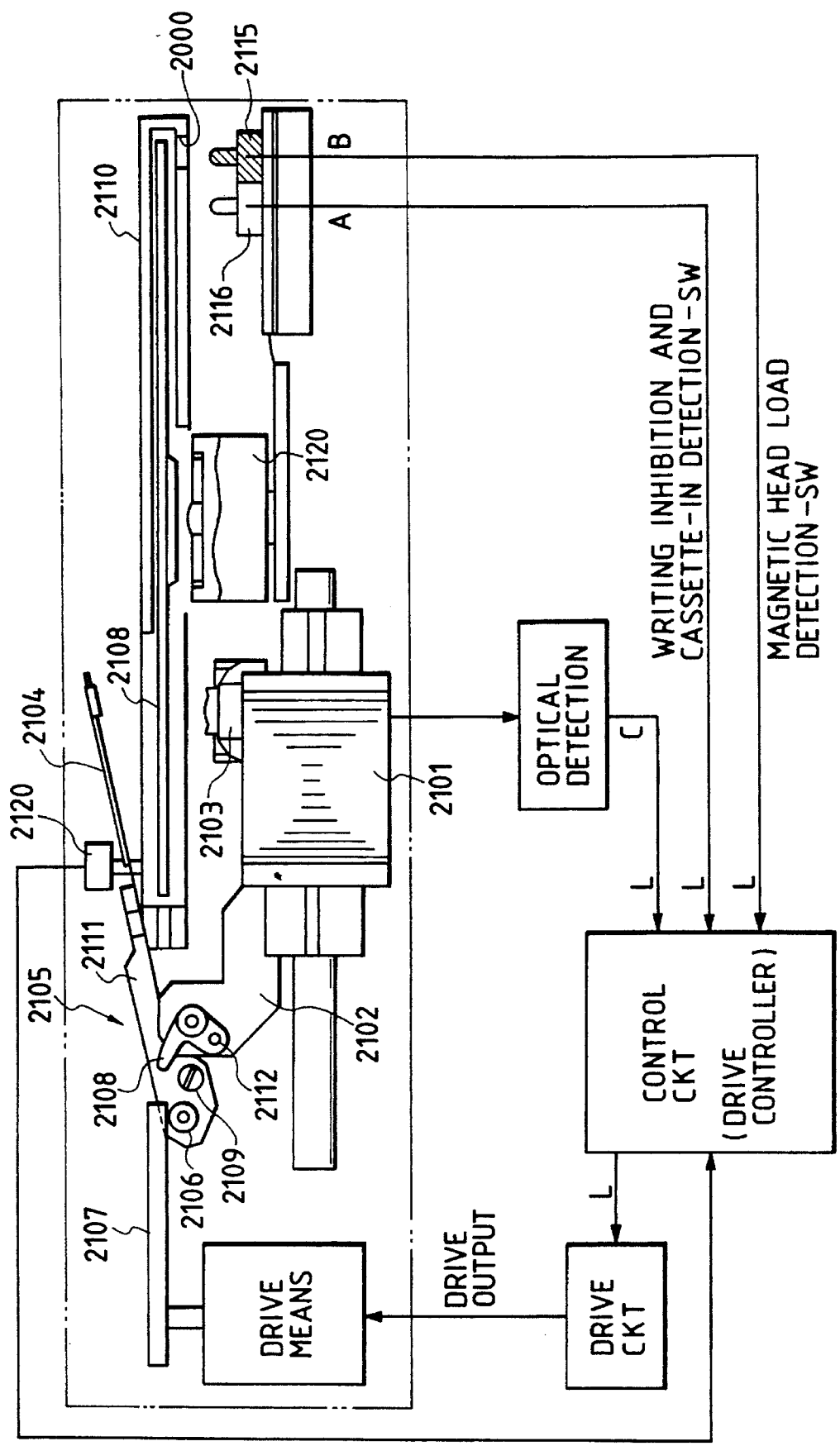

Other parts will not be explained as they are the same as in the conventional configuration. In a case of such electrical configuration, the control system of the magnetooptical disk apparatus explained in the example 1 can be employed without modification, as shown in FIGS. 42A to 42C. FIG. 42A shows a state in which a disk cassette for light modulation is loaded, while FIG. 42B shows a state in which a disk cassette for magnetic field modulation is loaded, and FIG. 42C shows unloading of either disk cassette.

[8th embodiment]

Figure 43:
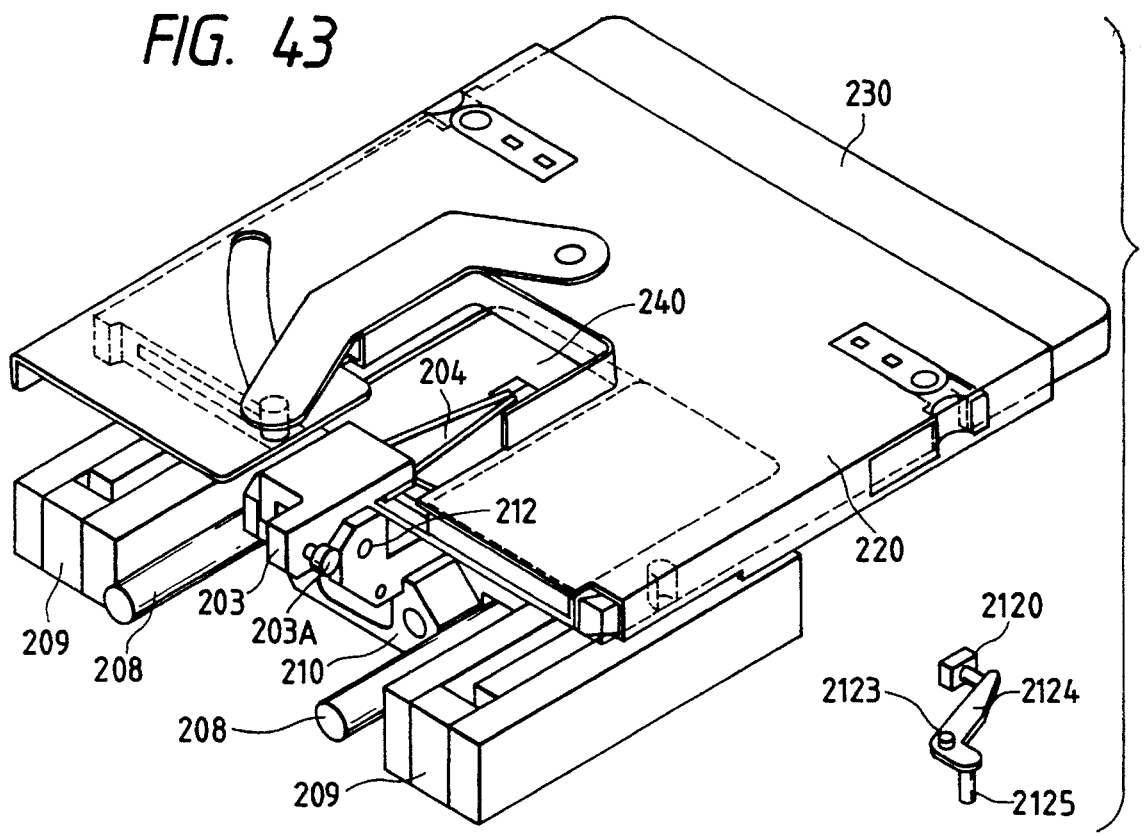
FIG. 43 is a perspective view of an 8th embodiment of the present invention.

Reference is made to FIG. 43 for explaining a sensor structure of a magnetooptical disk apparatus, matching the disk cassette with the characteristic part shown in FIG. $31A_1$, $31A_2$ and 31B. The sensor is comprised of a microswitch as explained above, with a crank-shaped member 2124 as the mechanical engaging member. Said member 2124 is articulated by a pin 2123 on the cassette holder 220, is provided at an end with an engaging part 2125 adapted for fitting with the detection part 234 and faces the push button of said microswitch at the other end.

Figure 44:
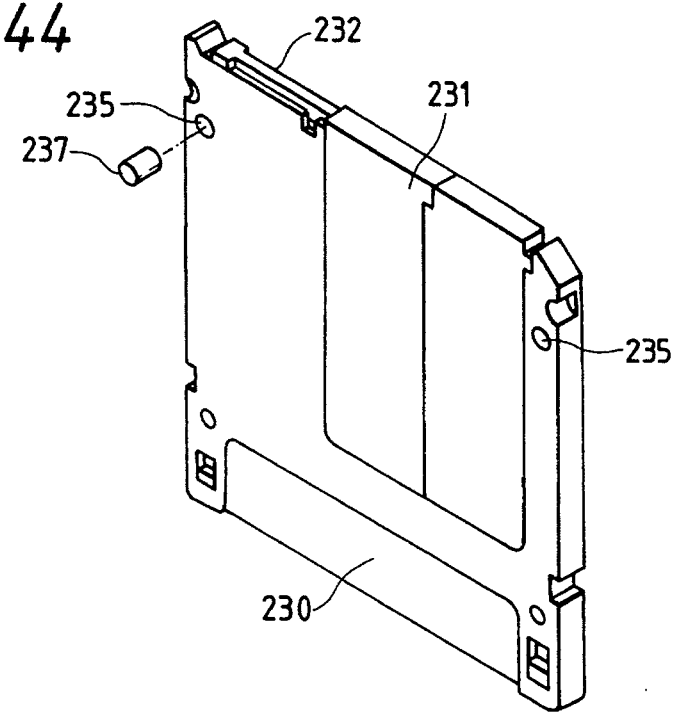
FIG. 44 is a perspective view of an example of the disk cartridge to be employed in the 8th embodiment.

The microswitch shown in FIG. 41 or 43 may be replaced by a photointerruptor. Also FIG. 44 shows a modification of the configuration of the characteristic part of the disk cassette, in consideration the of manufacture of each. In this modification, the kind of disk is identified by the presence or absence of a hole 235, constituting the detection part, in the cassette shell. Said identification can be made by a plug, which is adapted to fit in said hole 235, as the engaging member of the mechanical contact sensor.

[9th to 17th embodiments]

In the following 9th to 17th embodiments of the present invention, there is provided a bias magnet for light modulation recording, in addition to the magnetic head with the floating slider, thereby providing an information recording/reproducing apparatus capable of matching the magnetooptical disks of both the light modulation system and magnetic field modulation system.

[9th embodiment]

Figure 45:
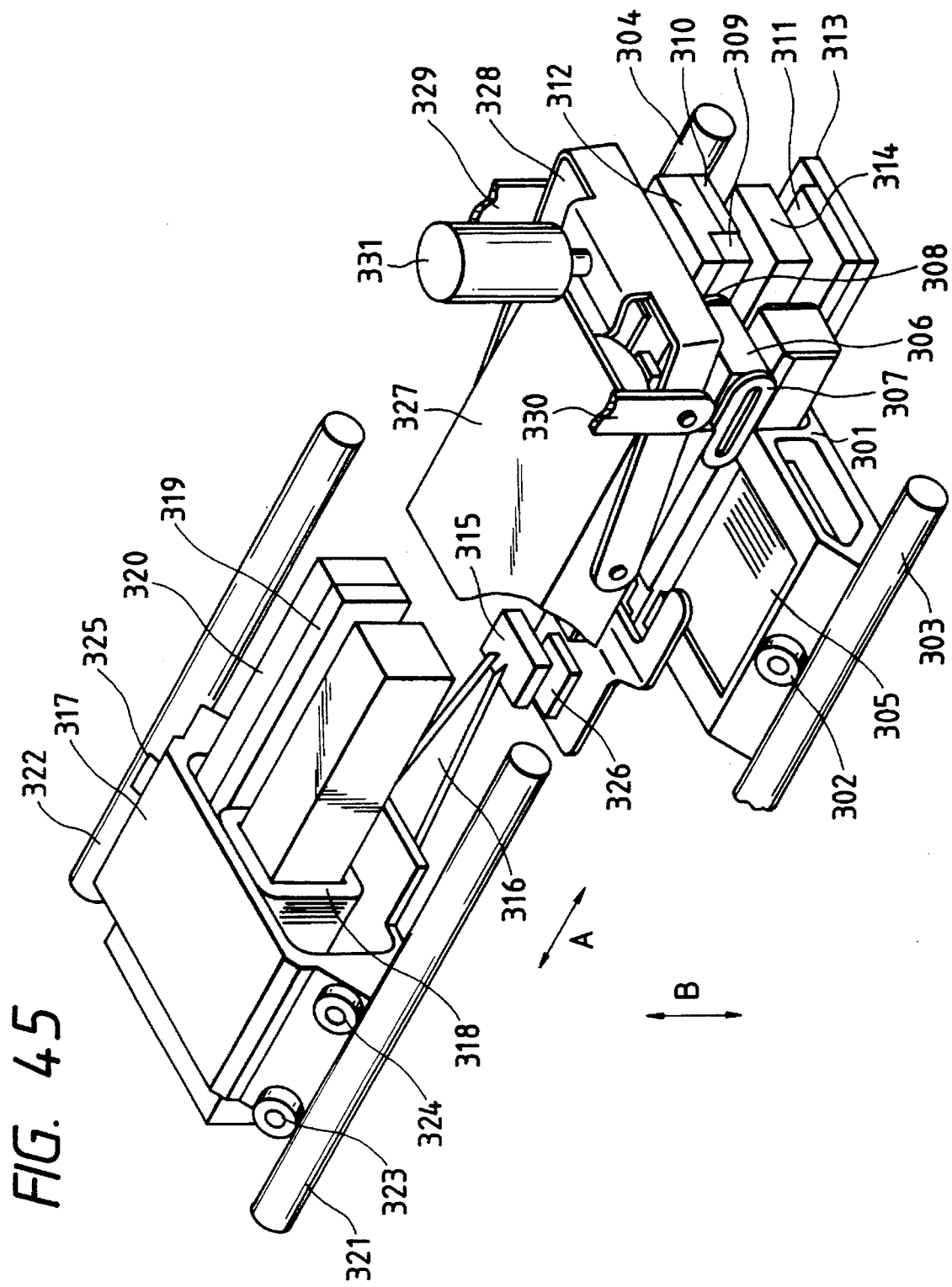
FIG. 45 is a perspective view of a 9th embodiment of the present invention.

FIG. 45 is partially cut-off perspective view of a 9th embodiment of the present invention.

A carriage 301 is supported by a bearing 302 and other unrepresented bearings on guide rails 303, 304, and is rendered movable along said guide rails, in a direction A (radial direction of the magnetooptical disk). A coil 305 for tracking and access (tracking coil) is fixed on the carriage 301. A lens holder 306 is supported on the carriage 301 by two unrepresented plate springs, which are mutually parallel and are capable of displacing an unrepresented objective lens in a focusing direction B. There are also provided focusing coils 307, 308. An optical head is constituted, including said objective lens and the lens holder 306.

There are also provided a focusing magnet 309, tracking magnets 310, 311, rear yokes 312, 313, and a center yoke 314. Said magnets, yokes and tracking coil are provided in two sets, symmetrically with respect to a plane including the directions A and B, but one set is omitted from the illustration.

A first voice coil motor for driving the optical head in the tracking direction is comprised of the tracking coil 305, tracking magnets 310, 311, rear yokes 312, 313, center yoke 314 and an unrepresented intermediate yoke. Also a second voice coil motor for driving the optical head in the focusing direction is comprised of the focusing coils 307, 308, focusing magnet 309 and rear yoke 312.

A floating slider 315, equipped with a small magnetic head for applying a magnetic field to the irradiated area, by the light spot, of the magnetooptical disk, is fixed by a support member 316 on a second carriage 317. There are also provided a second tracking coil 318, a second tracking magnet 319, and a second rear yoke 320. Said second tracking magnet and the second rear yoke are provided in two sets symmetrically with respect to the above-mentioned A-B plane, but one set is omitted from the illustration.

Second guide rails 321, 322 support the second carriage 317 by means of bearings 323, 324, 325 and limit the movement of said second carriage 317 in the direction A. A third voice coil motor for driving the floating slider 316 in the tracking direction is comprised, including said second tracking coil 318, second tracking magnet 319 and second rear yoke 320.

A light-emitting element 326, fixed to the carriage 301 constitutes, in cooperation with an unrepresented light-receiving element fixed in the lower part of the second carriage 317, detection means for detecting the relative position of the objective lens and the floating slider 315.

There are also provided a bias magnet 327 covering the movable range of the light spot in the direction A; a support part 328 supporting said bias magnet 327; fixed members 329, 330 fixed to an unrepresented substrate; and a solenoid 331. The bias magnet 327 is rendered movable in the vertical direction (direction B) by the on-off operation of said solenoid, through the lever action of the support part 328.

Figure 46:
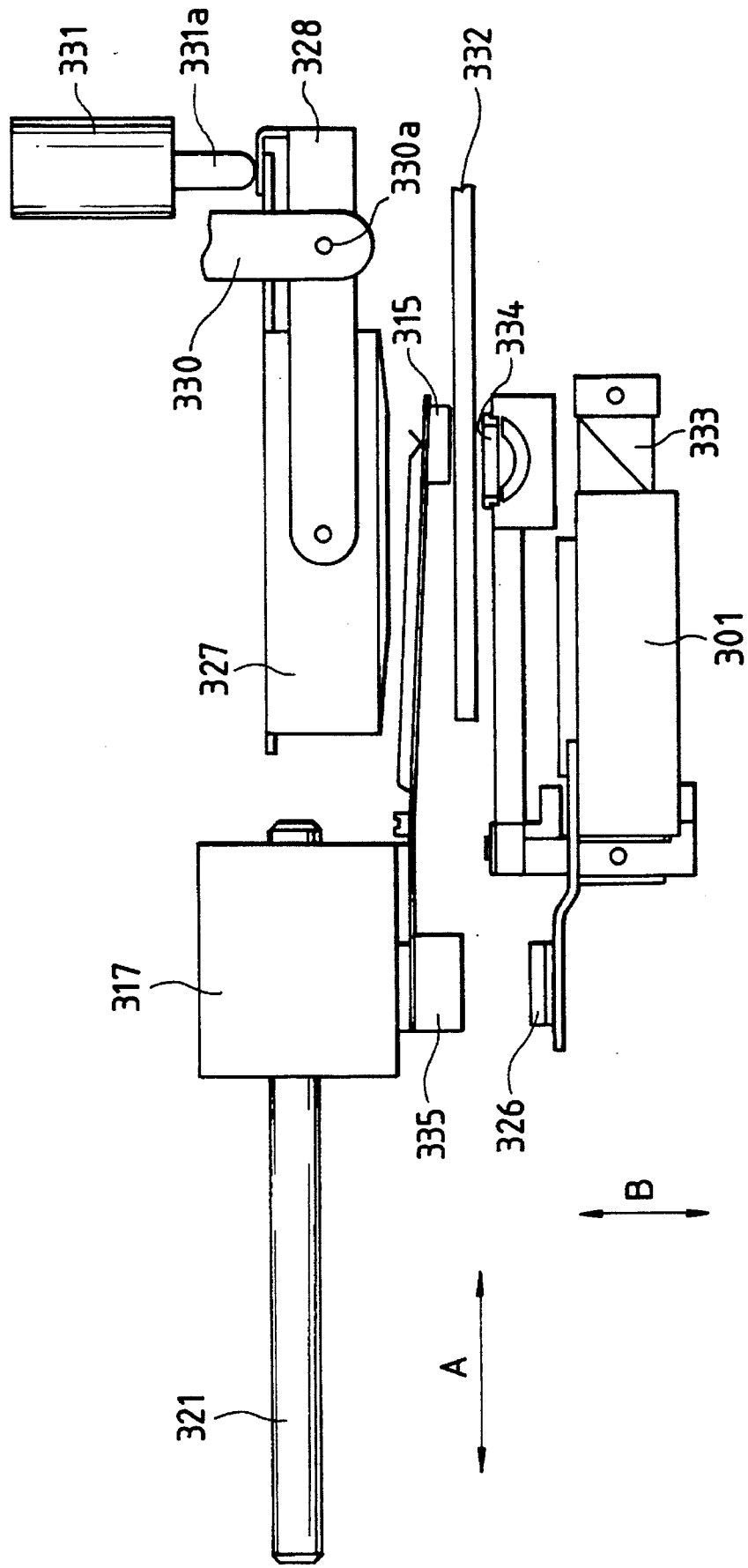
FIG. 46 is a view showing a state in which a recording medium for magnetic field modulation is loaded in the apparatus shown in FIG. 45.
Figure 47:
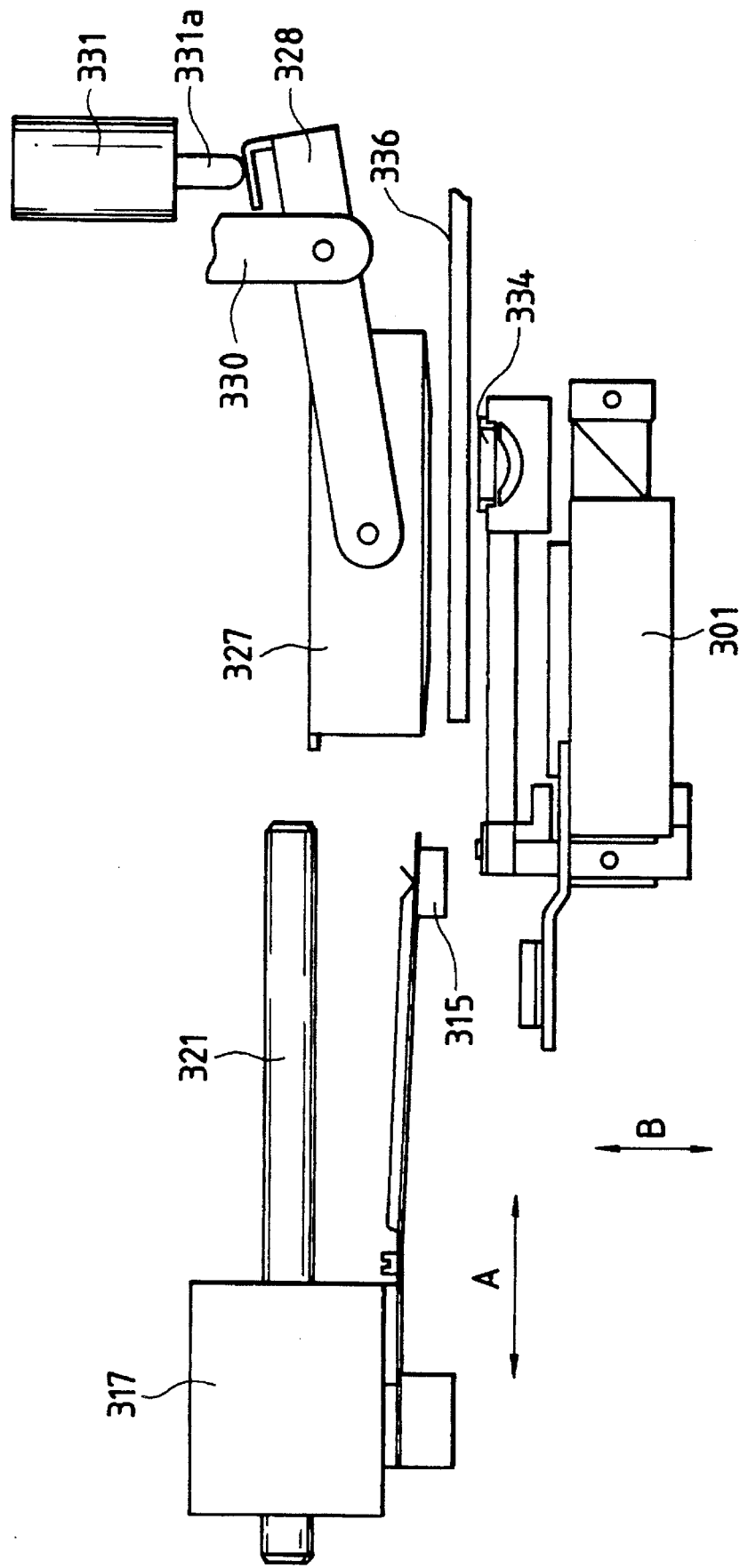
FIG. 47 is a view showing a state in which a recording medium for light modulation is loaded in the apparatus shown in FIG. 45.

In the following there will be explained the function of the present embodiment. FIG. 46 shows the state of information recording on a magnetooptical disk of a magnetic field modulation method, while FIG. 47 shows that of a light modulation method.

In FIG. 46 there is illustrated a magnetooptical disk 332 for magnetic field modulation recording. A laser beam from an unrepresented light source is reflected by a deflecting mirror 333 and is condensed by an objective lens 334 to form a light spot on the recording film of the disk 332. Around said light spot there is applied a magnetic field by an unrepresented magnetic head of the floating slider 315, and the information is recorded on the magnetooptical disk 332 corresponding to the polarity of said magnetic field. The objective lens 334 and the floating slider 315 are controlled in mutually correlated positions. More specifically, with the movement of the carriage 301 in the direction A, the second carriage 317 is also moved in the direction A, and the first and third voice coil motors are controlled in such a manner that the positions of the objective lens 334 and the floating slider 315 in the direction A, detected by the light-emitting element 326 and the light-receiving element 335, are not mutually aberrated.

A bar 331a of the solenoid 331 is maintained in a state pressing down the support part 328, and the bias magnet 327 is maintained at an upper position by a lever action, having the fulcrum at a pin 330a of the fixed part 330. In said position the bias magnet is inactive.

Consequently the floating slider 315 can move, between the disk 322 and the bias magnet 327, in a range in the direction A (operating range of the magnetic head) corresponding to the entire recording area of the magnetooptical disk 332, and the magnetic field modulation recording can be achieved by generating a modulated magnetic field from the magnetic head while emitting the laser beam of a constant intensity from the objective lens 334.

In FIG. 47 there is shown a magnetooptical disk 336 for light modulation recording. The bar 331a of the solenoid 331 is moved upwards to maintain the support part 328 at a predetermined position, thereby maintaining the bias magnet 327 at an operating position of a predetermined distance from the magnetooptical disk 336.

The floating slider 315 is moved, in the radial direction A of the disk 336, to a position outside the disk (inactive position of the magnetic head). The magnetic head is naturally rendered inactive, and the matching control for the floating slider 315 and the objective lens 334 in the direction A is interrupted.

The light modulation recording can be achieved by moving the objective lens 334 in a range in the direction A corresponding to the entire recording area of the magnetooptical disk 332 and emitting the modulated laser beam from said objective lens while applying the bias magnetic field of a constant intensity to the magnetooptical disk 336 from the bias magnet.

In the apparatus of the present embodiment, though not illustrated, there is provided means for identifying the kind of the loaded magnetooptical disk (whether for magnetic field modulation or for light modulation) as in the example 1. More specifically, the cassette of the disk for magnetic field modulation and that of the disk for light modulation are provided with mutually different indexes, and the apparatus of the present embodiment is provided with means for detecting said index and means for sending instructions to the third voice coil motor including said solenoid 331 and said second tracking coil 318, in response to a disk kind detection signal from the above-mentioned detection means, in such a manner as to attain the state shown in FIG. 46 (either by shifting from the state in FIG. 47 to that in FIG. 46 or by retaining the state in FIG. 46), or to attain the state shown in FIG. 47 (either by shifting from the state in FIG. 46 to that in FIG. 47 or by retaining the state in FIG. 47), according to the detected kind of the disk. At the start of loading of the magnetooptical disk, the loading operation is once interrupted, then there are conducted detection of the kind of disk and realization of the state of the floating slider 315 and the bias magnet 327 shown in FIG. 46 or 47 based on the result of said detection, and then the loading operation is re-started and continued to the final loading position.

When case the magnetooptical disk apparatus is utilized as a memory unit of a computer or the like, the recording method, either the magnetic field modulation or the light modulation, can be selected by the host computer and instructed to the disk apparatus, which can accordingly select the state shown in FIGS. 46 or 47.

[10th embodiment]

A 10th embodiment explained in the following dispenses with the retracting mechanism for the bias magnet, so that the retracting space for the bias magnet can be eliminated and the apparatus can thus be compactized.

Figure 48:
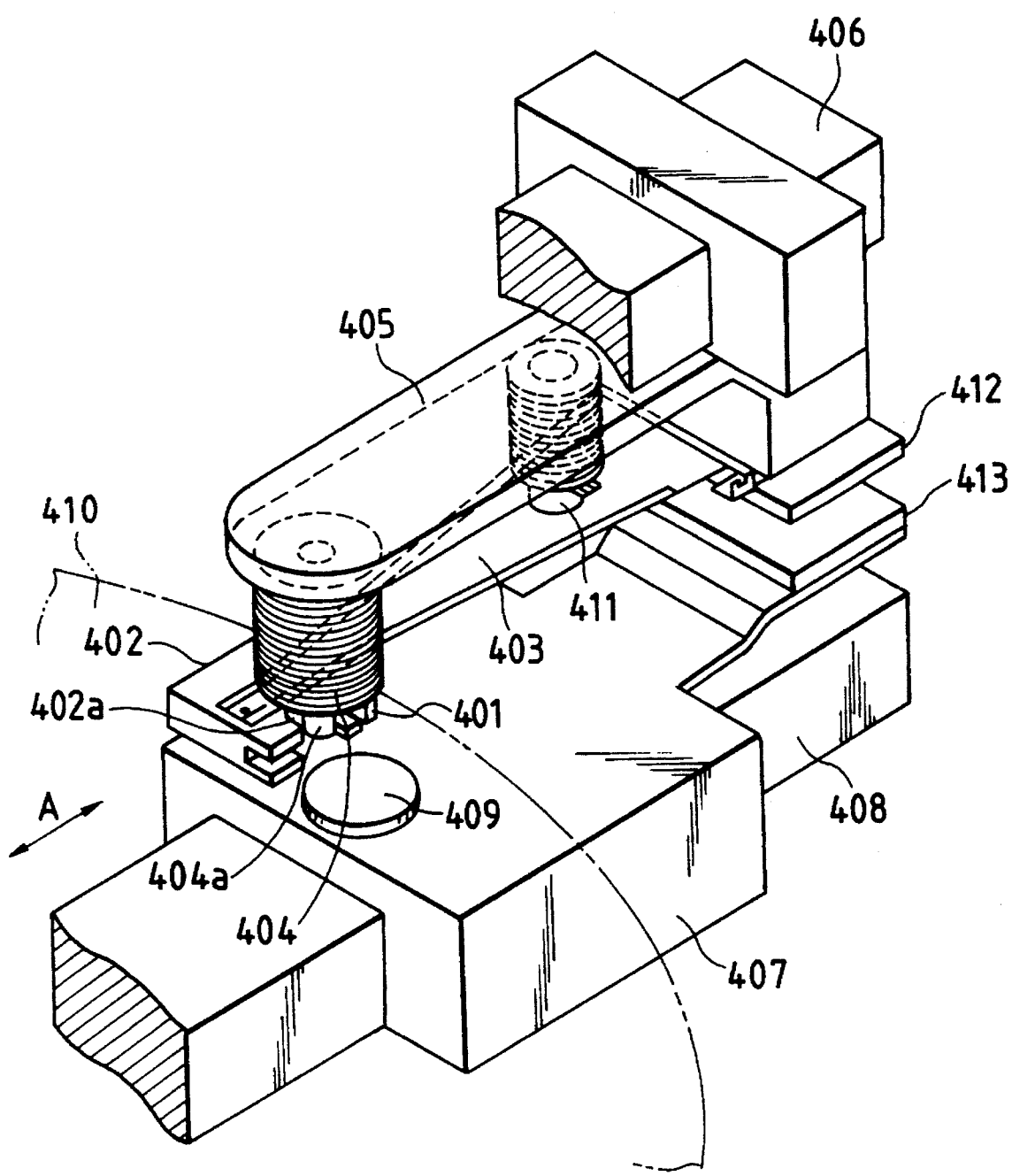
FIG. 48 is a perspective view of a 10th embodiment of the present invention.
Figure 49:
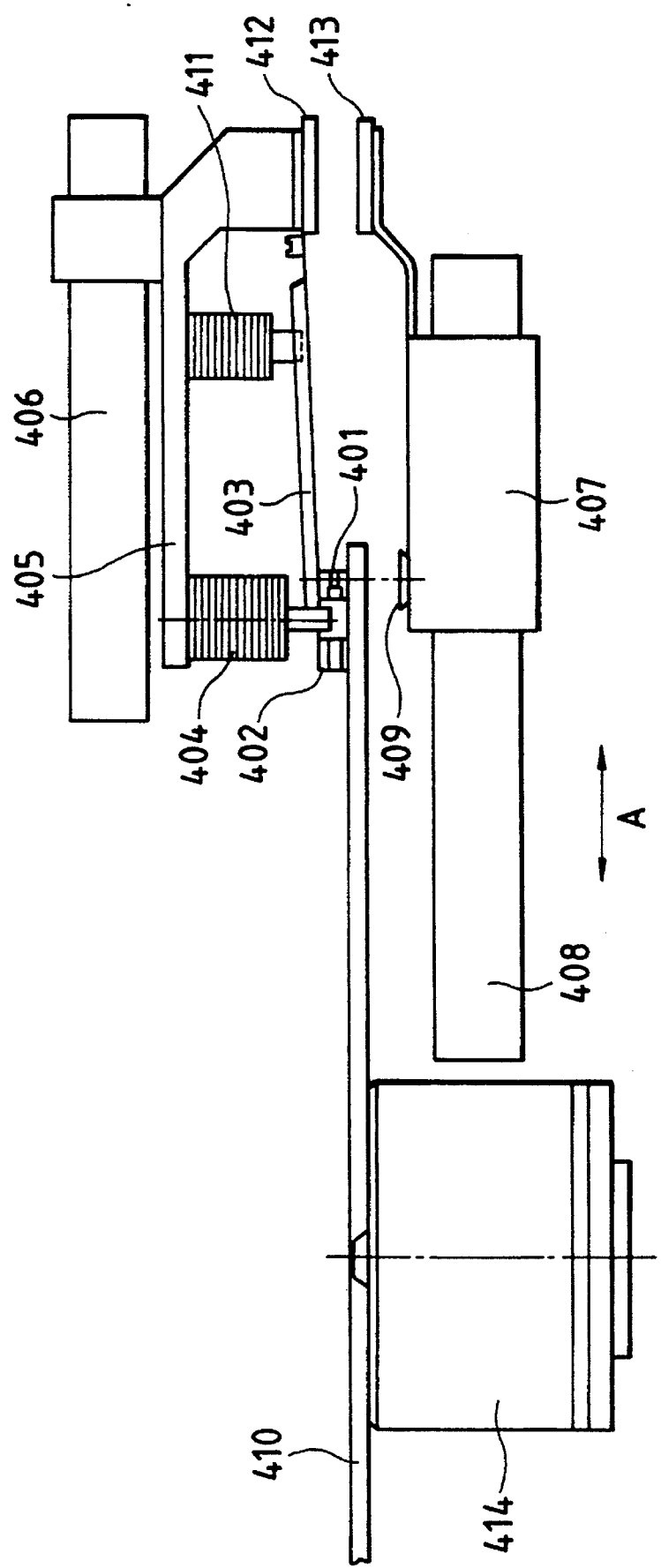
FIG. 49 is a view showing a state in which a recording medium for magnetic field modulation is loaded in the apparatus shown in FIG. 48.
Figure 50:
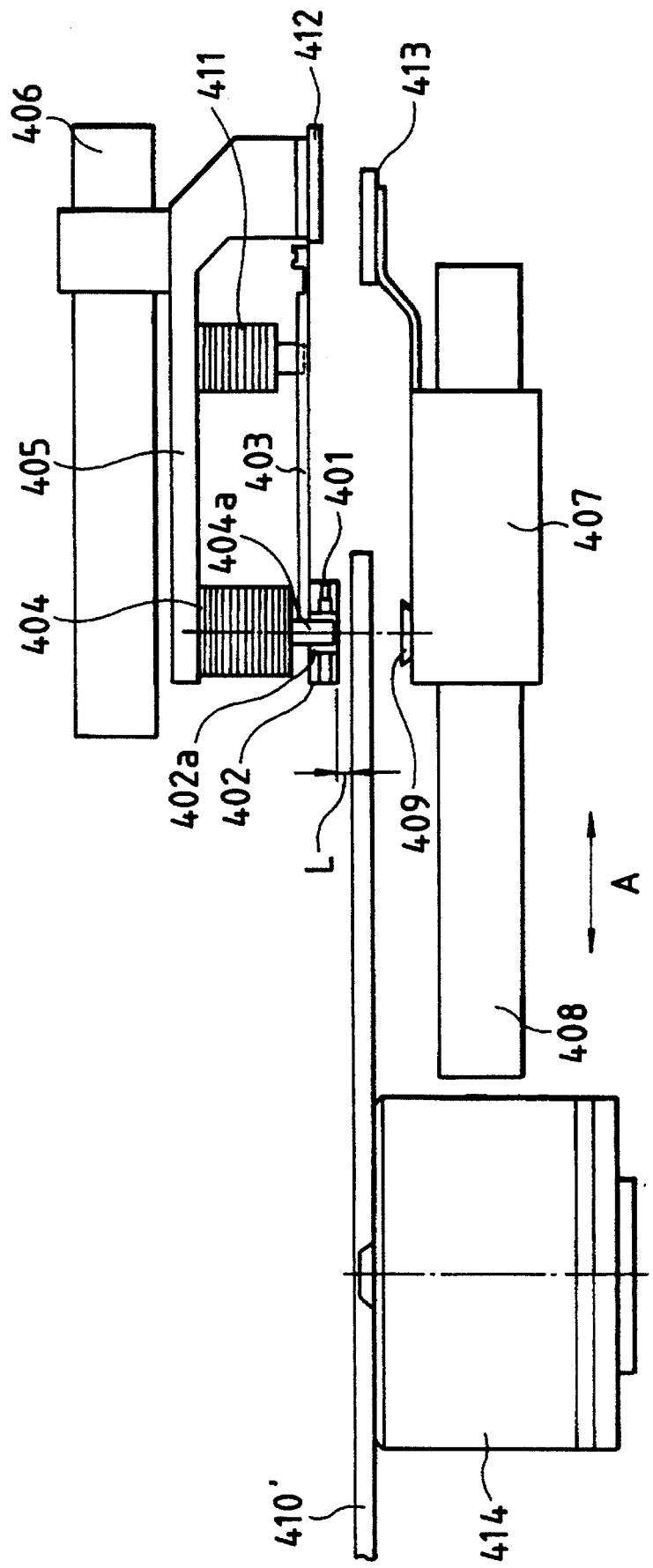
FIG. 50 is a view showing a state in which a recording medium for light modulation is loaded in the apparatus shown in FIG. 48.

FIG. 48 is a partially cut-off perspective view of the 10th embodiment, and FIGS. 49 and 50 are views showing the functions thereof.

A first carriage 407 supports an optical head including an objective lens 409, which condenses a laser beam to form a light spot on a magnetooptical disk 410 or 410'. Said carriage 407 is supported by a first linear motor 408, movably in the tracking direction indicated by an arrow A.

A small magnetic head 401 is supported by a floating slider 402, which can slide on the surface of the magnetooptical disk 410, 410' with a small gap to said surface. A metal load beam 403 supports said floating slider 402 at an end, and is fixed, at the other end, on a second carriage 405, which is supported by a second linear motor 406, movably in the tracking direction. A small bias magnet 404 is fixed on said second carriage 405 and is comprised of an electromagnet, of which a center yoke 404a extends vertically (perpendicularly to the disk surface) through a notch 402a formed in said floating slider 402. The lower end of the center yoke 404a of said bias magnet 404 and said magnetic head 401 are arranged along the tracking direction. An electromagnet 411 mounted on said second carriage 405 can exert an attracting force to the middle portion of said load beam 403.

Relative position sensors 412, 413 respectively mounted on the second carriage 405 and the first carriage 407 can detect the mutual positional aberration therebetween in the tracking direction. A spindle motor 414 is provided for rotating the magneooptical disk 410, 410'.

The apparatus of the present embodiment functions in the following manner.

FIG. 49 illustrates a state of information recording on a magnetooptical disk 410 for magnetic field modulation. In this case the electromagnet 411 is not energized to leave the load beam 403 in a lower position, whereby the floating slider 402 is placed in an operating position close to the surface of the magnetooptical disk 410. The position of the second carriage 405 in the tracking direction is controlled in such a manner that the magnetic head 401 of the floating slider 402 is positioned in the tracking direction, corresponding to the light spot formed on the disk 410 by the laser beam coming from the objective lens 409. Said control can be achieved by the relative positions in the tracking direction, detected by the sensors 412, 413. Thus the magnetic field modulation recording can be achieved by the magnetic head 401, while emitting the light beam of a constant intensity from the objective lens 409. In said recording the bias magnetic 404 is naturally not energized.

FIG. 50 illustrates a case of information recording on a magnetooptical disk 410' for light modulation. In this case the electromagnet 411 is energized to attract the load beam upwards, whereby the floating slider 402 is retracted to an inactive position separated by a distance L from the surface of the disk 410'. The position of the second carriage 405 in the tracking direction is controlled in such a manner that the center yoke 404a of the bias member 404 is placed at a position in the tracking direction, corresponding to the light spot formed on the disk 410' by the laser beam coming from the objective lens 409. Said control can be achieved by the relative positions in the tracking direction, detected by the sensors 412, 413. Thus the light modulation recording is executed by the optical head, while applying the magnetic field of a constant intensity to the magnetooptical disk 410' by the bias magnet 404. In said recording, the magnetic head 401 of the floating slider 402 is naturally not energized.

In the apparatus of the present embodiment, though not illustrated, there is provided means for identifying the kind of the loaded magnetooptical disk (whether for magnetic field modulation or for light modulation) as in the example 1. More specifically, the cassette of the disk for magnetic field modulation and that of the disk for light modulation are provided with mutually different indexes, and the apparatus of the present embodiment is provided with means for detecting said index and means for sending instructions to said electromagnet 411 and said second linear motor 406, in response to a disk kind detection signal from the above-mentioned detection means, in such a manner as to attain the state shown in FIG. 49 (either by shifting from the state in FIG. 50 to that in FIG. 49 or by retaining the state in FIG. 49), or to attain the state shown in FIG. 50 (either by shifting from the state in FIG. 49 to that in FIG. 50 or by retaining the state in FIG. 50), according to the detected kind of the disk. At the start of loading of the magnetooptical disk, the loading operation is once interrupted, then there are conducted detection of the kind of disk and realization of the vertical position of the floating slider 402 and the tracking position of the second carriage 405 shown in FIG. 49 or 50 according to the result of said detection, and then the loading operation is restarted and continued to the final loading position.

In the above-explained configuration, the notch 402a of the floating slider 402 is positioned along the tracking direction of the magnetic head 401, but said notch may be somewhat aberrated from the tracking direction of the magnetic head 401 as long as the bias magnetic field from the center yoke 404a can be formed in a predetermined position of the magnetooptical disk. Also said notch, formed on the external periphery of the slider, may be replaced by a penetrating hole formed at the center of the slider or a recess formed on the upper face of the slider.

[11th embodiment]

In an 11th embodiment to be explained in the following, the retracting mechanism for the floating slider supporting the magnetic head is not provided on the carriage and the magnetic head is not provided on the carriage which supports the floating slider and the bias magnet, so that there can be achieved weight reduction of said carriage and reduction in the seek time, in comparison with those in the foregoing 10th embodiment.

Figure 51:
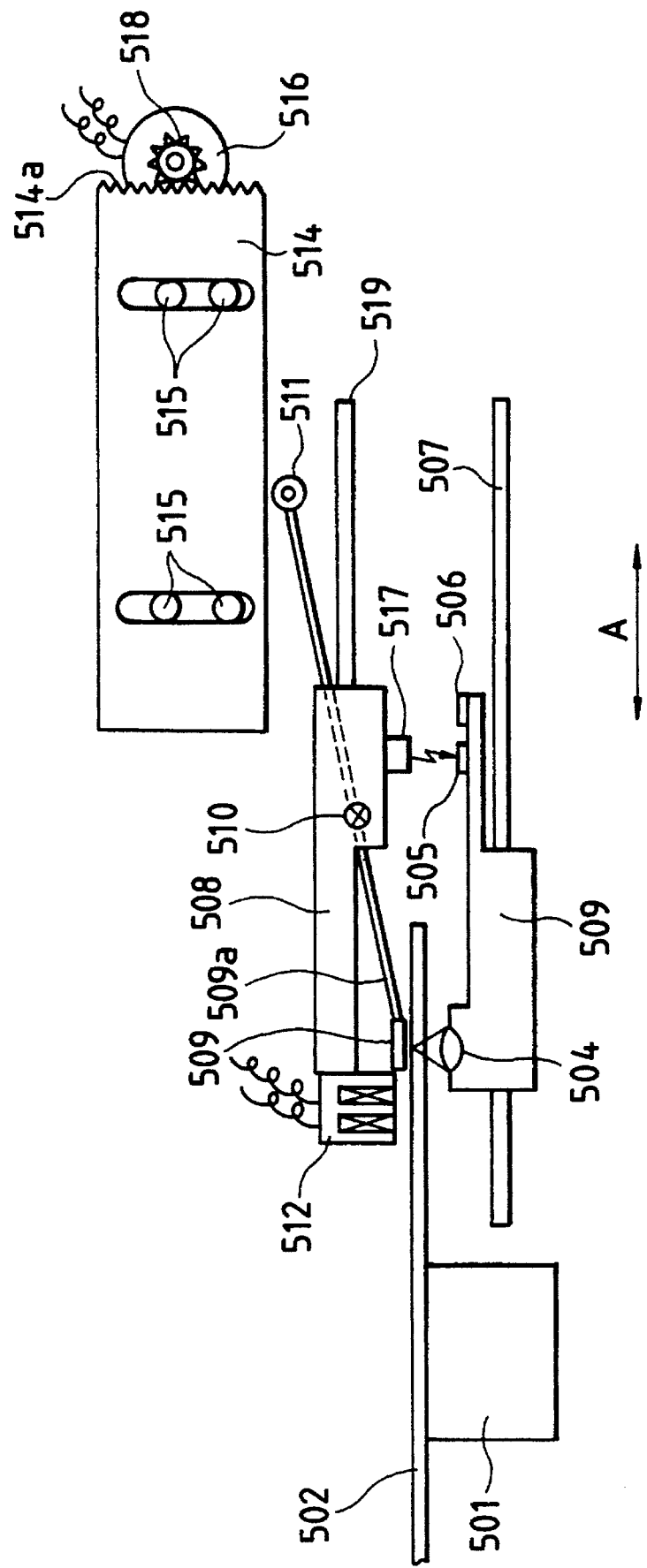
FIG. 51 is a view of an apparatus of an 11th embodiment of the present invention, loaded with a recording medium for magnetic field modulation.
Figure 52:
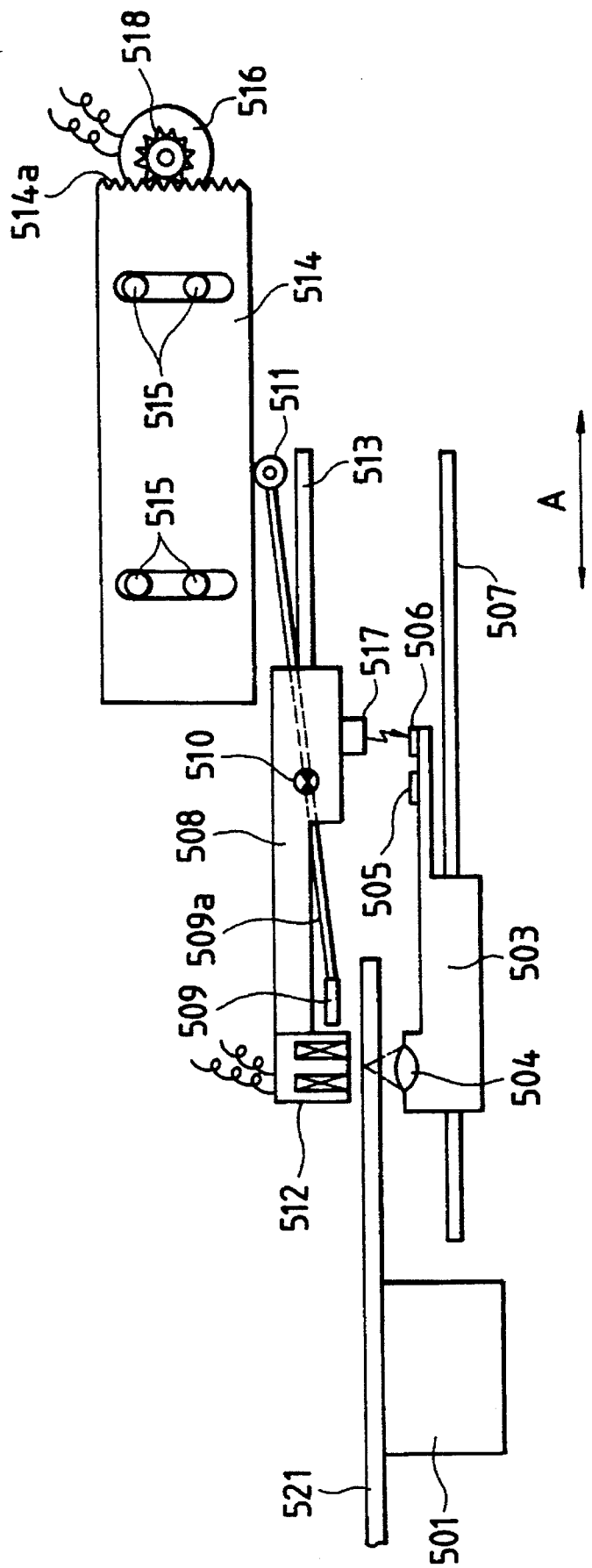
FIG. 52 is a view of the apparatus of the 11th embodiment, loaded with a recording medium for light modulation.

FIGS. 51 and 52 are schematic views of the 11th embodiment, with the function thereof, respectively showing the states of information recording on a magnetooptical disk for magnetic field modulation and for light modulation.

Referring to FIGS. 51 and 52, there are shown a spindle motor 501 for rotating a magnetooptical disk 501 or 502; a first carriage 503 supporting an optical head; an objective lens 504 of said optical head; first and second light-receiving elements 505, 506 fixed on the first carriage 503; a guide shaft 507 for moving the first carriage 503 in the tracking direction (indicated by an arrow A); a second carriage 508 supporting a floating slider 509, provided with a small magnetic head, and a small bias magnet 512 arranged in the tracking direction, said floating slider 509 being mounted on an end of a rod-shaped support member 509a which is rotatably supported at the center thereof by a horizontal shaft 510 on the second carriage 508; a guide shaft 513 for moving the second carriage 508 in the tracking direction; and a light-emitting element 517 constituting, in combination with said light-receiving elements 505, 506, means for detecting the relative position of the first carriage 503 and the second carriage 508 in the tracking direction.

On the other end of said floating slider 509a there is mounted the inner tube of a ball bearing 511, of which outer tube can be in contact with the lower face of a movable member 514, positioned above said ball bearing and having a lower face parallel to the tracking direction. Said movable member is provided with two vertically oblong holes in which engaged are guide shafts 515, whereby the movable member 514 can effect parallel displacement in the vertical direction. Said movable member 514 is further provided with a vertically extending rack 514a, which meshes with a pinion gear 518 fixed on the output shaft of a stepping motor 516, whereby the movable member 514 can be vertically displaced by said stepping motor.

The apparatus of the present embodiment functions in the following manner.

In case of information recording on the magnetooptical disk 502 for magnetic field modulation, as shown in FIG. 51, the stepping motor 516 is activated to move the movable member 514 to an upper position, whereby the outer tube of the ball bearing 511 mounted on the front end of the floating slider support member 509a is separated from the lower face of the movable member 514 and the floating slider 509 is therefore brought to an operating position close to the surface of the magnetooptical disk 502. The position of the second carriage 508 in the tracking direction is controlled in such a manner that the magnetic head of the floating slider 509 is placed at a position, in the tracking direction, corresponding to the light spot formed on the magnetooptical disk 502 by the laser beam from the objective lens 504. Said control can be achieved by receiving the light from the light-emitting element 517 by the first light-receiving element 505, and moving the second carriage 508 in the direction A so as not to generate a relative positional aberration in the tracking direction. Thus the magnetic field modulation recording can be achieved by the magnetic head, while emitting the light beam of a constant intensity from the objective lens 504. In said recording operation, the bias magnet is naturally not energized.

In a case of information recording on the magnetooptical disk 521 for light modulation, the stepping motor 516 is activated to move the movable member 514 to a lower position, whereby the outer tube of the ball bearing 511, mounted on the front end of the floating slider support member 509a is in contact with and is pushed downwards by the lower face of the movable member 514, and the floating slider 509 is placed in an inactive position separate from the surface of the magnetooptical disk 521. The position of the second carriage 508 in the tracking direction is controlled in such a manner that the bias magnet is placed in a position in the tracking direction corresponding to the light spot formed on the disk 502 by the laser beam emitted from the objective lens 504. Said control can be achieved by receiving the light from the light-emitting element 517 by the second light-receiving element 506 and moving the second carriage 508 in the direction A so as not to generate a relative positional aberration in the tracking direction. Thus the light modulation recording can be achieved by the optical head, while applying the magnetic field of a constant intensity by the bias magnet 512 to the magnetooptical disk 521. In this state the magnetic head of the floating slider is naturally not energized.

In the apparatus of the present embodiment, though not illustrated, there is provided means for identifying the kind of the loaded magnetooptical disk (whether for magnetic field modulation or for light modulation) as in the example 1. More specifically, the cassette of the disk for magnetic field modulation and that of the disk for light modulation are provided with mutually different indexes, and the apparatus of the present embodiment is provided with means for detecting said index and means for sending instructions to said stepping motor 516 and drive means for said second carriage 508 in response to a disk kind detection signal from the above-mentioned detection means, in such a manner as to attain the state shown in FIG. 51 (either by shifting from the state in FIG. 52 to that in FIG. 51 or by retaining the state in FIG. 51), or to attain the state shown in FIG. 52 (either by shifting from the state in FIG. 51 to that in FIG. 52 or by retaining the state in FIG. 52), according to the detected kind of the disk. Then, at the start of loading of the magnetooptical disk, the loading operation is once interrupted, then there are conducted detection of the kind of disk and the vertical positioning of the floating slider 509 and positioning of the second carriage 508 shown in FIG. 51 or 52 according to the result of said detection, and then the loading operation is re-started and continued to the final loading position.

[12th embodiment]

In a 12th embodiment to be explained in the following, the control of the movement between the operating position and the inactive position of the bias magnet and the magnetic head provided on the floating slider and the control of retraction of said floating slider are executed by the same mechanism.

Figure 53:
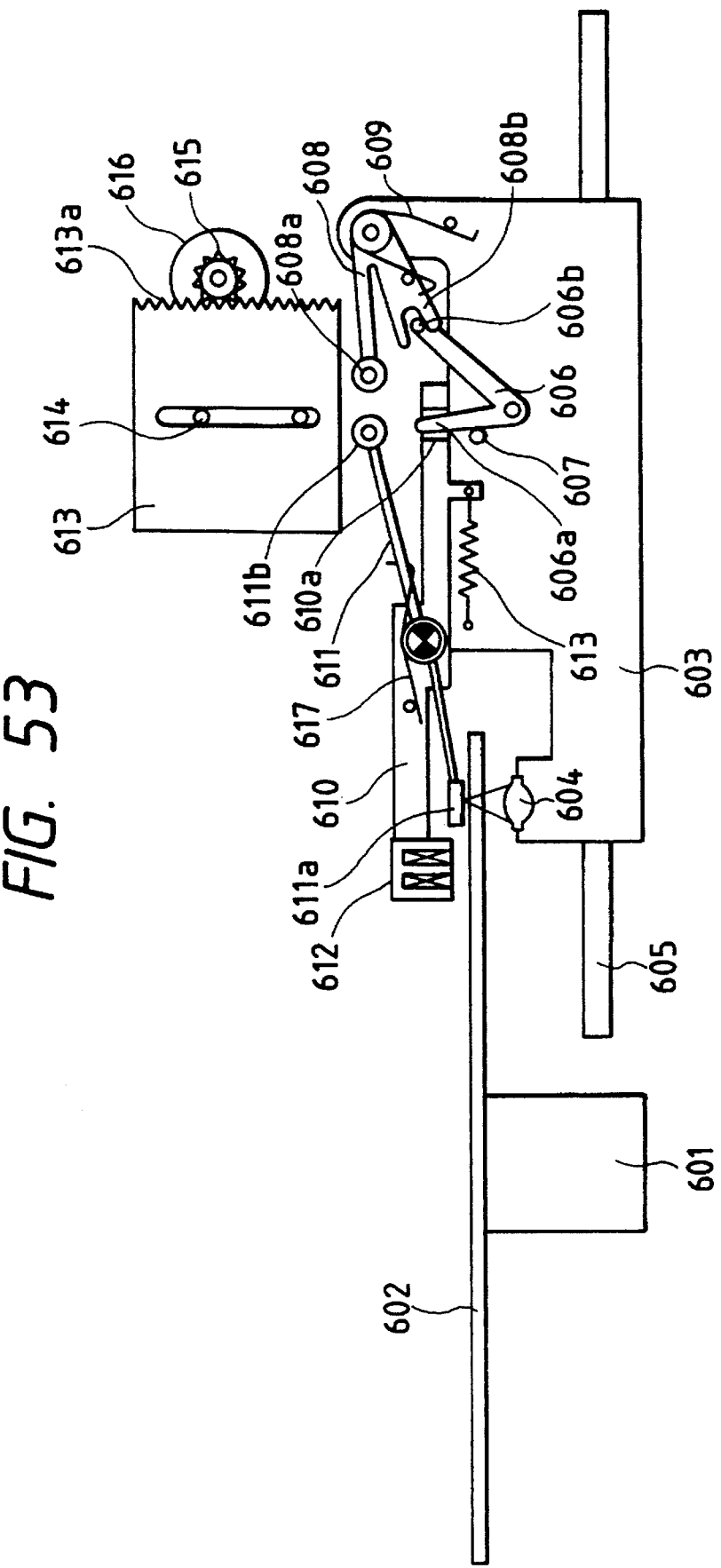
FIG. 53 is a cross-sectional view of a 12th embodiment of the present invention.

In the following the 12th embodiment will be explained in detail with reference to FIGS. 53 and 54. Referring to FIG. 53, a spindle motor 601 is provided in a loading part of the main body (not shown) of the apparatus for rotating a magnetooptical disk 602. In said main body, there is provided a guide rail 605 extending in the radial direction of the said magnetooptical disk 601. An optical head (carriage) 603 movable along said guide rail 605 is provided with an objective lens 604, movably controlled in the focusing direction by an actuator (not shown), for condensing a light beam from a laser source (not shown) onto the surface of the magnetooptical disk 601.

Said optical head 603 is moved along said guide rail by a linear motor (not shown) comprised of a magnet and a back yoke provided along said guide rail and a magnetic coil provided on said optical head. Also on said optical head 603 there is provided a magnetic head support member 610 so as to be movable in the seeking direction and in the tracking direction (above-mentioned radial direction), and said support member 610 supports a bias magnet 612 for use in the light modulation method and a magnetic head 611 for use in the magnetic field modulation method.

Said bias magnet 612 is comprised of an electromagnet fixed on the front end, closer to the center of said disk, of said magnetic head support member 610. Said magnetic head 611 is mounted on a floating slider 611a, in a state aligned with said magnet in the radial direction of said disk, and said floating slider 611a is mounted on an end of a load beam 611c, which is rotatably supported at the middle thereof by a shaft on said support member 610 and biases said slider 611a toward the disk surface by a torsion spring 617. In the present embodiment, said torsion spring 617 is provided around said shaft, with an end fixed to the support member 610 and the other end fixed to said load beam 611c. Said magnetic head support member 610 is also provided with a stopper (not shown) for limiting the rotation of said load beam 611c, in order that said magnetic head is maintained at a predetermined distance (several microns) from the disk surface.

Selective movement means for moving the magnetic head support member 610 on the optical head 603 for varying the relative position thereto according to the modulation method selected for information recording is comprised, in the present embodiment, of a first crank-shaped member 606, a second crank-shaped member 608 of which a fork-shaped end 608b engages with an end 606b of said first crank-shaped member 606, an engaging hole 610a formed in said magnetic head support member 610 so as to engage with the other end 606a of said first crank-shaped member 606, and a retraction cam 613 vertically moved by a motor 616 by means of a rack 613a and a pinion 615. The lower end of said retraction cam faces the other end 611b of said load beam 611 and the other end 608a of said second crank-shaped member 608, and presses said ends downwards in the descending movement. Said crank-shaped members 606, 608 are rotatably supported in the middle parts thereof on the optical head 603, and are biased by a torsion spring 609 provided between said member 608 and the optical head 603. For controlling such selective movement means there is provided unrepresented selection means, consisting, in this embodiment, of a controller capable of providing a selection signal for controlling the forward or reverse rotation of said motor 616.

In the present embodiment, said magnetic head support member 610 is pulled by a tensile coil spring 613 toward the center of the disk 602, and the optical head 603 is provided with a stopper 607 for limiting the rotation of the crank-shaped member 606 against the force of the torsion spring 609. Guide pins 604 are slidably fitted in a slit formed in the retraction cam 613. Said motor 616 is preferably comprised of a stepping motor, suitable for numerical control by the above-mentioned controller.

In the above-explained configuration, when a magnetooptical disk 602 for magnetic field modulation is loaded in the main body, the motor 616 is driven clockwise in FIG. 53 and the magnetic head support member 610 moves to the left by the force of the spring 610a, whereby the magnetic head of the floating slider 611a is maintained close to the disk surface, with a predetermined gap therebetween, in opposed relationship to the objective lens 604 across the disk 602. In this state the optical head 603 effects the seeking operation and is subjected to tracking control for access to a desired track, and the objective lens 604 is controlled for focusing. In this operation the electromagnet 612 is not energized.

Figure 54:
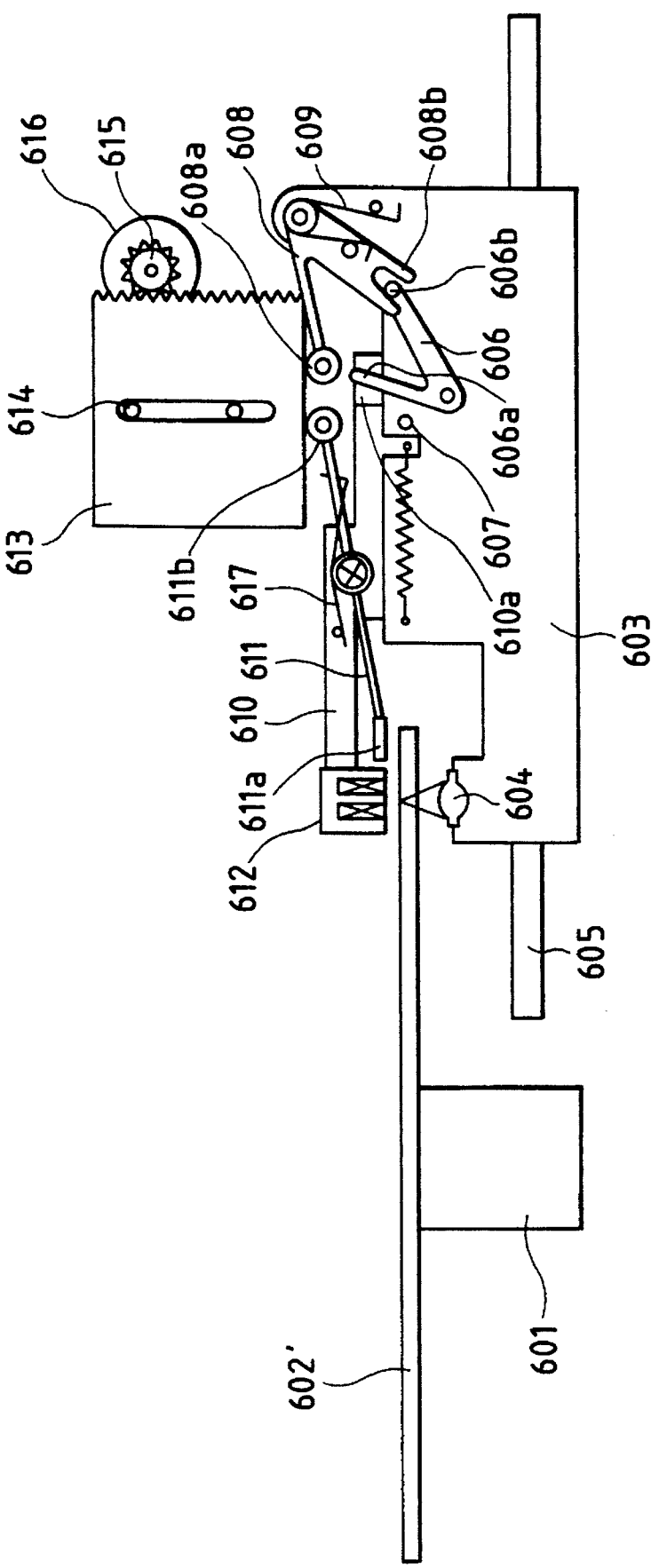
FIG. 54 is a view showing a state in which a recording medium for light modulation is loaded in the apparatus shown in FIG. 53.

Also, when a magnetooptical disk 602' for light modulation (ISO standard disk) is loaded, the motor 616 rotates counterclockwise as shown in FIG. 54 to effect depression of the ends of the load beam 611c and the crank-shaped member 608, whereby the floating slider 611a is retracted upwards while the support member 610 is moved to the right until the electromagnet 612 is positioned opposed to the objective lens 604 across the disk 602. Thus the magnetooptical recording by light modulation method is rendered possible by energization of the electromagnet 612.

[13th embodiment]

In a 13th embodiment, the above-mentioned tensile coil spring 610a is replaced by a torsion spring 633. When the ISO standard magnetooptical disk 602' is loaded, said tensile coil spring 610a is apt to result in an error in the positioning of the electromagnet 612 because of the precision of the involved components such as the retraction cam 613, crank-shaped members 606, 608 and of the assembling thereof. On the other hand, a case of said torsion spring 633, there can be realized a configuration in which the spring force can be applied to both the rightward and leftward movements of the magnetic head support member 610 as shown in FIGS. 55 and 56, whereby the positioning at right and left can be realized between said support member 610 and the optical head 603.

Figure 55:
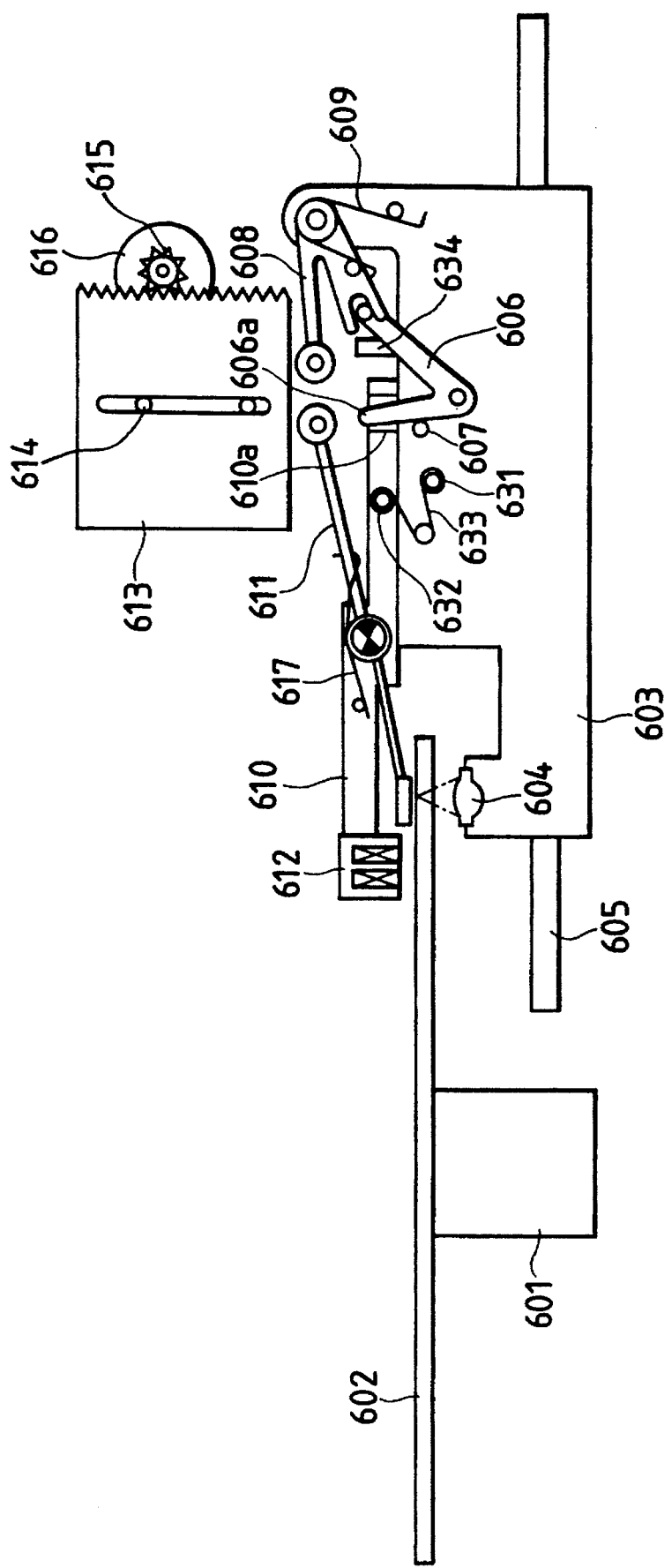
FIG. 55 is a cross-sectional view of a 13th embodiment of the present invention.
Figure 56:
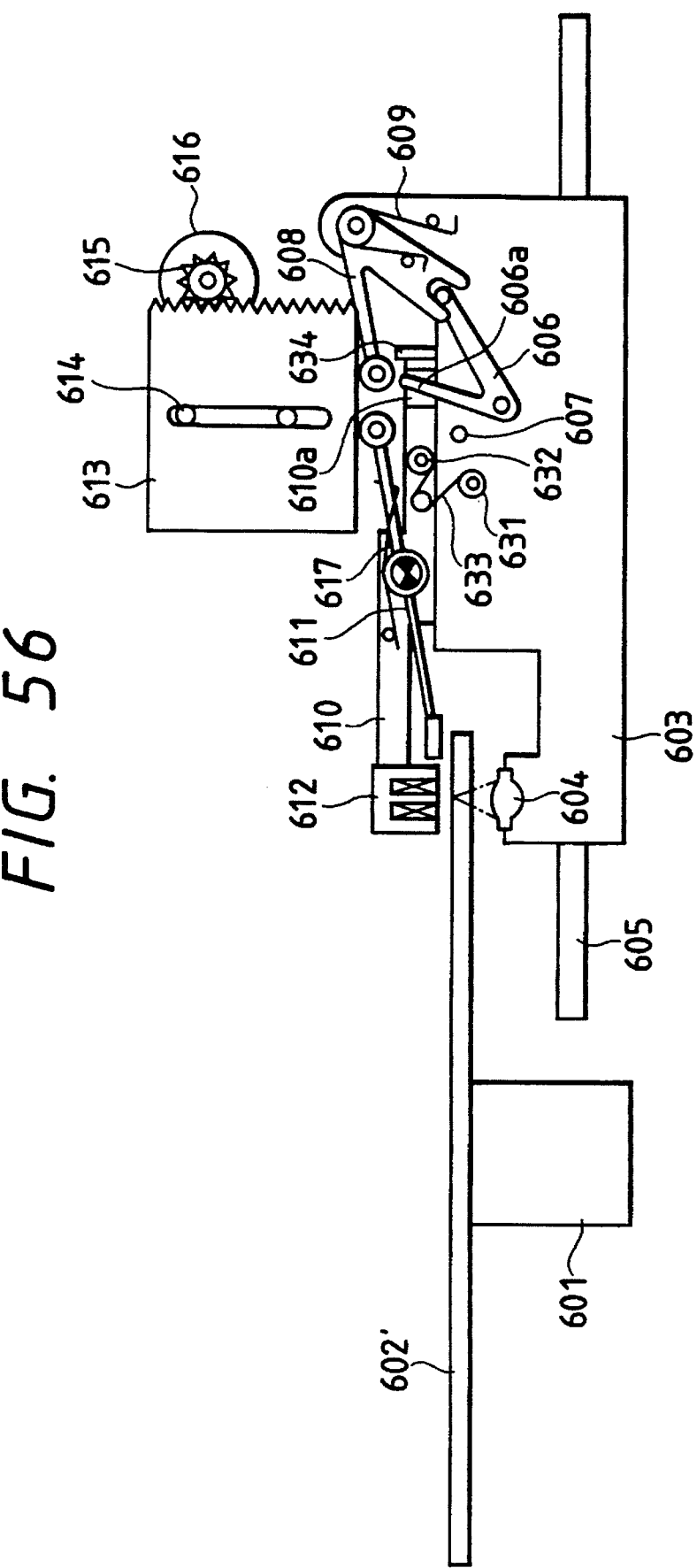
FIG. 56 is a view showing a state in which a recording medium for light modulation is loaded in the apparatus shown in FIG. 55.

More specifically, when a disk for magnetic field modulation is loaded as shown in FIG. 55, the crank-shaped member 606 rotates counterclockwise as in FIG. 53, and the magnetic head support member 610 slides to the left by the force of a torsion spring 633 functioning to mutually separate pins 631, 632, and is positioned by impingement on a stopper (not shown). On the other hand, when a disk 602' of the ISO standard is loaded as shown in FIG. 56, the function is similar to that shown in FIG. 54, but the magnetic head support member 610 moves to the right at the clockwise rotation of the crank-shaped member 606 by the force of the spring 633 functioning to mutually separate the pins 631, 632 and is positioned by impingement on the stopper 634. In this state, the end 606a of the crank-shaped member 606 does not touch the inner wall of the engaging hole 610A.

[14th embodiment]

In a 14th embodiment to be explained in the following, the bias magnet is retracted in a direction parallel to the recording surface of the magnetooptical disk. The present embodiment provides the ability to compactize the apparatus, since the retracting space in a direction perpendicular to the disk surface can be reduced, in comparison with that in the 9th embodiment.

Figure 57:
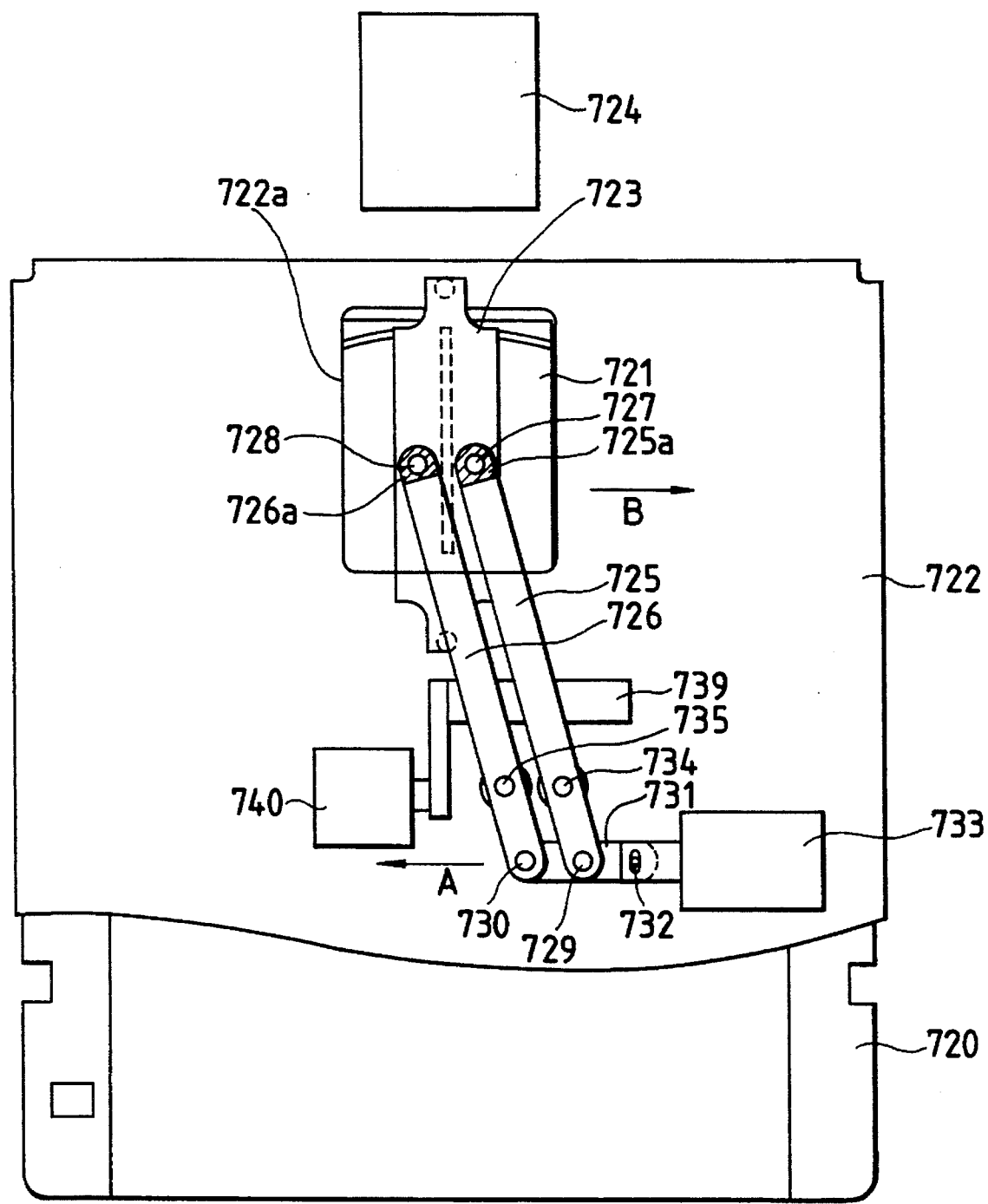
FIG. 57 is a plan view of a 14th embodiment of the present invention.
Figure 58:
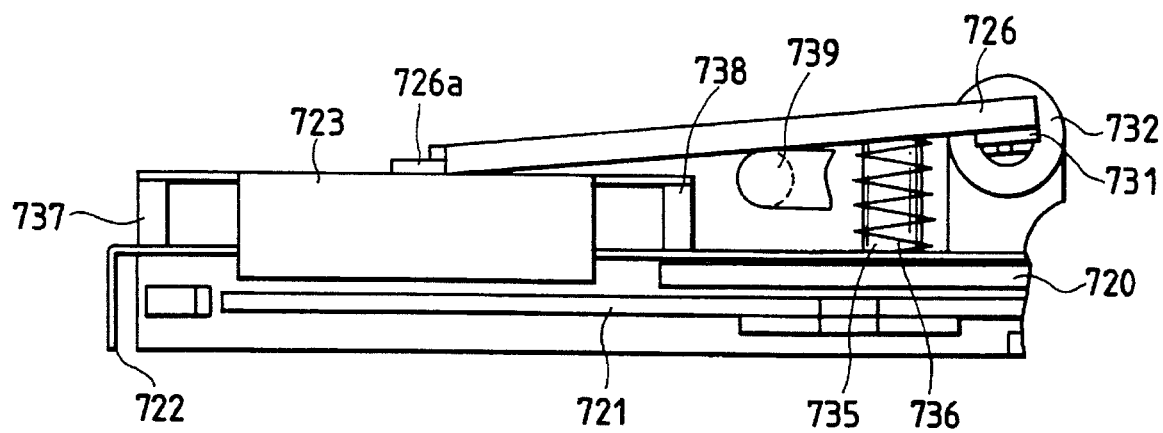
FIG. 58 is a cross-sectional view of the apparatus shown in FIG. 57.
Figure 59:
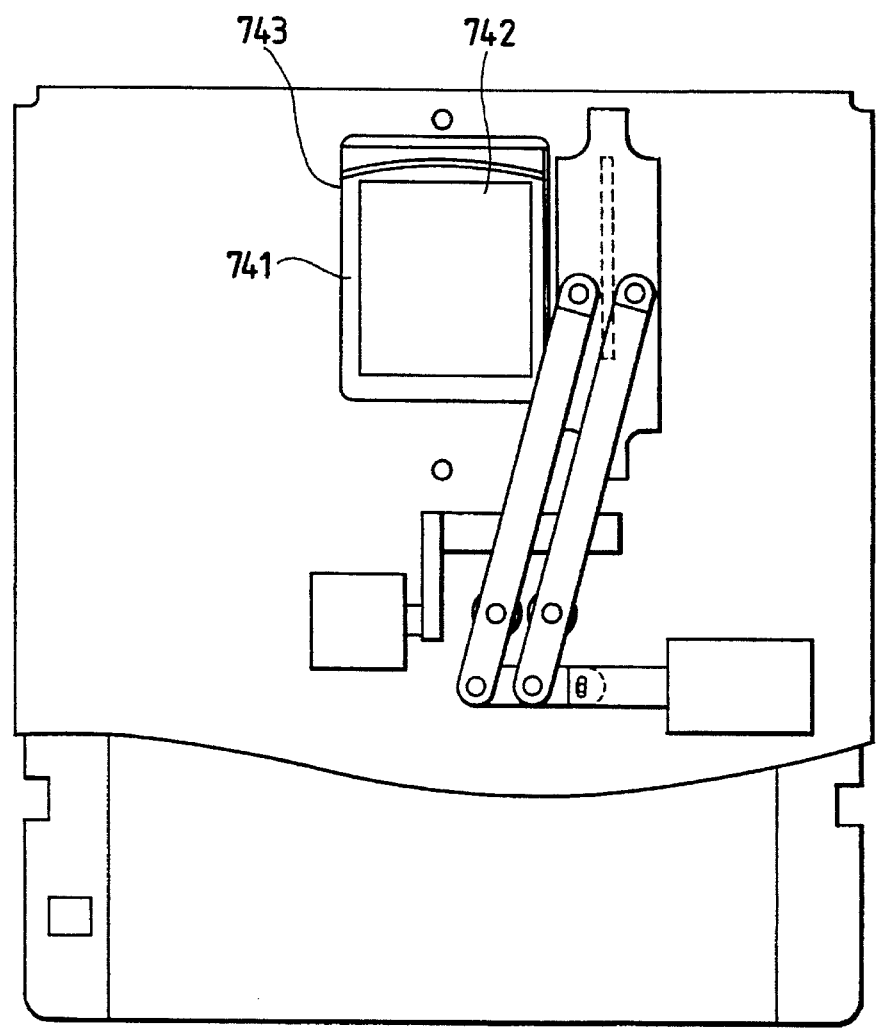
FIG. 59 is a view showing the function of the apparatus shown in FIG. 57.

In the following the 14th embodiment will be explained with reference to FIGS. 57 to 59. Referring to FIG. 57, a disk cassette 720 houses a magnetooptical disk 721 for the light modulation method, corresponding to the ISO standard, generation I. A loading part of the apparatus is provided with a holder 702 for supporting said disk cassette 720. Above said disk 721, there is selectively positioned a magnet 723 for generating a fixed bias field or a magnetic head 724 for magnetic field modulation recording. In a state shown in FIGS. 57 and 58, said fixed bias magnet 723 is lowered corresponding to an aperture 722a formed in the holder 722 and is inserted into said aperture 722a, thereby enabling information recording.

Support bars 725, 726 constituting a parallel link mechanism are connected by elastic members with hatched end portions 725a, 726a, and are linked, by the shafts 727, 728 to the fixed bias magnet 723. Said support bars 725, 726 are connected, by pins 729, 730 to a drive shaft 731 which is in turn connected, by a pin 732, to an operating rod of a solenoid 733. The support bars 725, 726 are also provided, at the middle parts thereof, with support shafts 734, 735 and can rotate about said shaft in the horizontal plane parallel to the disk surface.

Also said support bars 725, 726 are elastically supported upwards by coil springs 736 provided around said support shafts 734, 735, and said fixed bias magnet 723 impinges on reference pins 737, 738 thereby maintaining a constant gap to the upper surface of the magnetooptical disk 721.

A push-up bar 739 pushes up the support bars 725, 726 by the rotation of a rotary drive part 740 shown in FIG. 57, thereby retracting the fixed bias magnet 723 from said aperture 722a.

In the following there will be explained the function of the principal parts related to the present invention. In a state shown in FIG. 57, the fixed bias magnet 723 is inserted into the aperture 722a of the holder 702, and applies a DC bias magnetic field to the magnetooptical disk 721 of the light modulation method corresponding to the ISO standard, generation I, thereby effecting information recording in the small area of the light spot formed by the optical head.

Also in a case of ejecting the magnetooptical disk 721 for light modulation recording and loading a disk for magnetic field modulation recording to effect the recording operation, the rotary drive unit 740 is activated to push up the support bars 725, 726 by the push-up bar 739, thereby retracting the fixed bias magnet 723 from the aperture 722a. In this the solenoid 733 is then energized to move the drive shaft 731 in a direction A shown in FIG. 57. As a result, the support bars 725, 726 rotate horizontally about the support shafts 734, 735, thereby moving the fixed bias magnet 723 in a direction B, thus retracting from the aperture 743 (moving area of the objective lens). In this state (see FIG. 59) the magnetooptical disk 720 for light modulation recording is ejected as explained above, and the magnetooptical disk 741 for magnetic field modulation recording is loaded as shown in FIG. 59. In this state suitable detection means (not shown) is used for identifying whether the loaded magnetooptical disk corresponds to the ISO standard, generation I or to the magnetic field modulation recording, and, if the latter is identified, said bias magnet 742 is moved horizontally by suitable moving means and is inserted into the aperture 743 of the cassette.

In this manner information recording can be achieved on the magnetooptical disk 741 for the magnetic field modulation method, by means of the bias magnet 742, in a small area of the light spot formed by the optical head.

[15th embodiment]

In a 15th embodiment to be explained in the following, the bias magnet is retracted in a parallel direction to the recording surface of the disk as in the 14th embodiment, but the insertion of the bias magnet into the cassette aperture is dispensed with, in order to further simplify the retracting mechanism.

Figure 60:
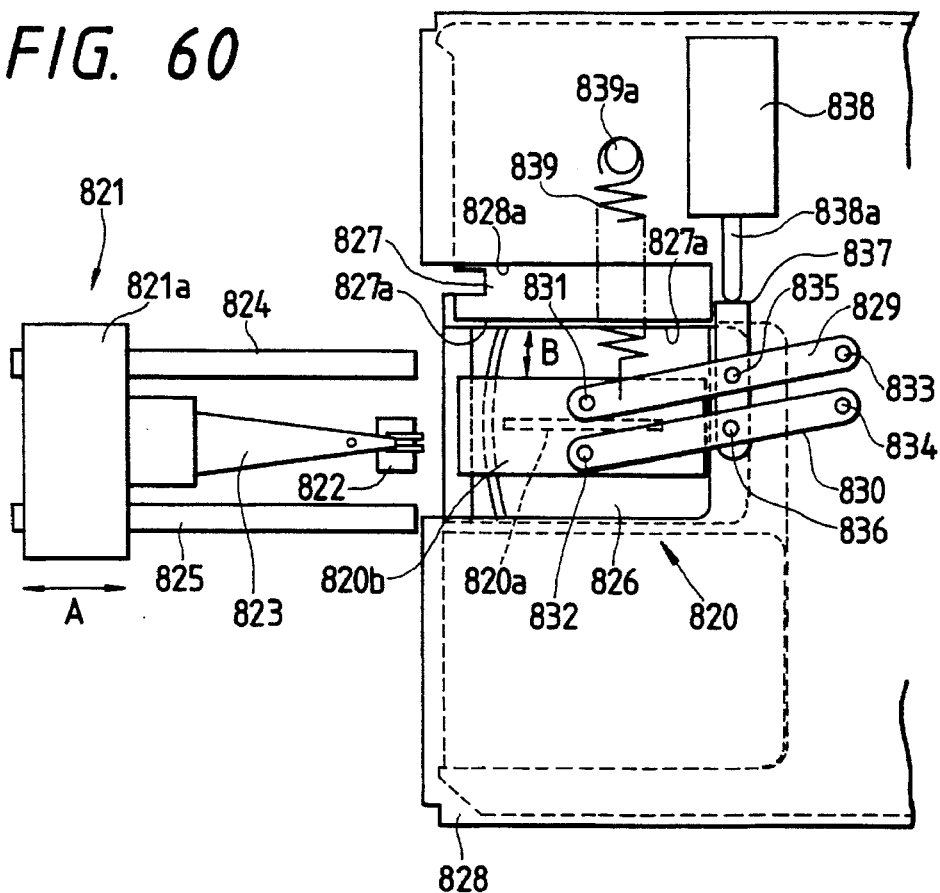
FIG. 60 is a view of a 15th embodiment of the present invention.

The 15th embodiment will be explained further with reference to FIGS. 60 to 65. FIG. 60 illustrates a state of information recording on a magnetooptical disk for the light modulation method. The apparatus is equipped with a bias magnet 820 for light modulation recording and a magnetic head 821 for magnetic field modulation recording.

Said magnetic head 821 is mounted on a floating slider 822 supported, across a support spring 823 serving as a load beam, by an optical head carriage 821a, which is rendered movable by a linear motor (not shown) in a direction A, along guide rails 824, 825 extended in the radial direction of said magnetooptical disk 826. At the front end side of said guide rails 824, 825, said magnetooptical disk 826, housed in a disk cassette 827, can be loaded in a holder 828 in a loading part of the apparatus.

Figure 61:
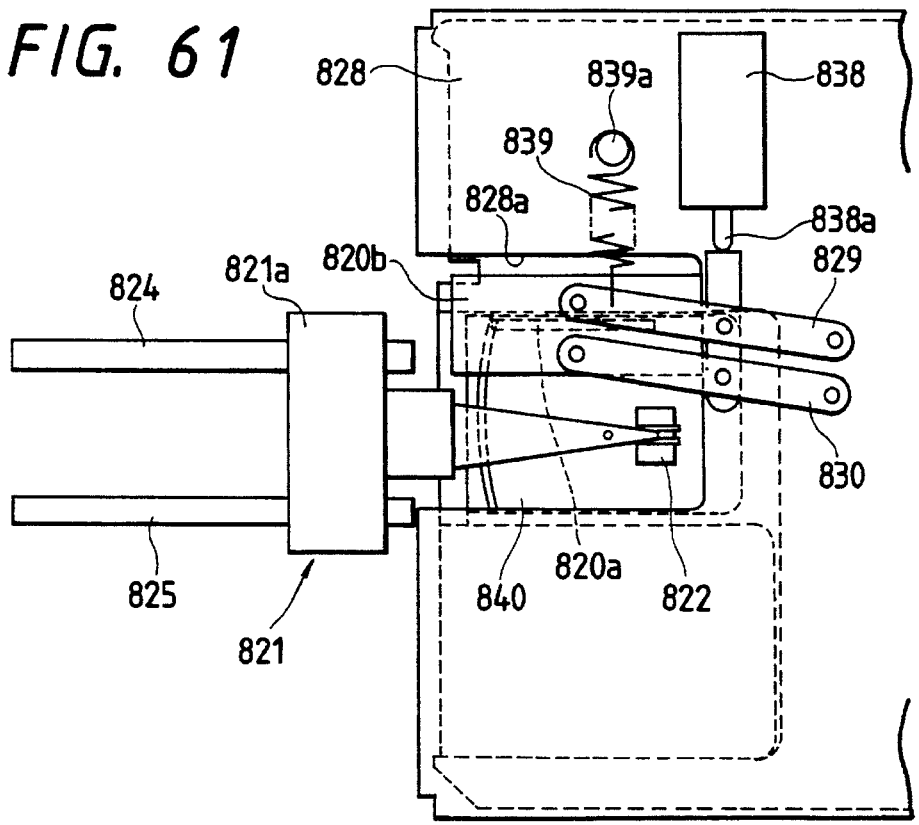
FIG. 61 is a view showing a state of magnetic field modulation recording in the apparatus shown in FIG. 60.

Said bias magnet 820 is provided with support bars 829, 830 positioned above said holder 828, constituting a parallel link mechanism. Said support bars 829, 830 are connected, at an end thereof, to a support member 820b supporting a bias magnetic field generating unit 820a, by means of rotary shafts 831, 832, and are connected, at the other end, to said holder 828 by shafts 833, 834. Also said support bars 829, 830 are connected, by shafts 835, 836 at the middle portion, to a drive shaft 837, which impinges on a rod 838a of a solenoid 838 fixed on said cassette holder 828. In order to maintain said drive shaft 837 and the rod 838a in contact, a tension coil spring 839 is provided between said support bar 829 and a support pin 839a fixed on said cassette holder 838, and elastically bias the drive shaft 837 toward the solenoid 838. Thus, by the energization of said solenoid 838, the bias magnetic field generating unit 820a can be moved in a direction B through said parallel link mechanism. In a case of information recording on a magnetooptical disk 840 for a magnetic field modulation as shown in FIG. 61, said bias magnetic field generating unit 820a is retracted to a side of a shutter aperture 827a of said disk cassette 827, in order not to interfere with said floating slider 822. In order to achieve such retraction of the bias magnetic field generating unit 820a in a displacement parallel to the disk surface, the aperture 828a formed in the present embodiment in said cassette holder 828 is made larger than the shutter aperture 827a.

Figure 62:
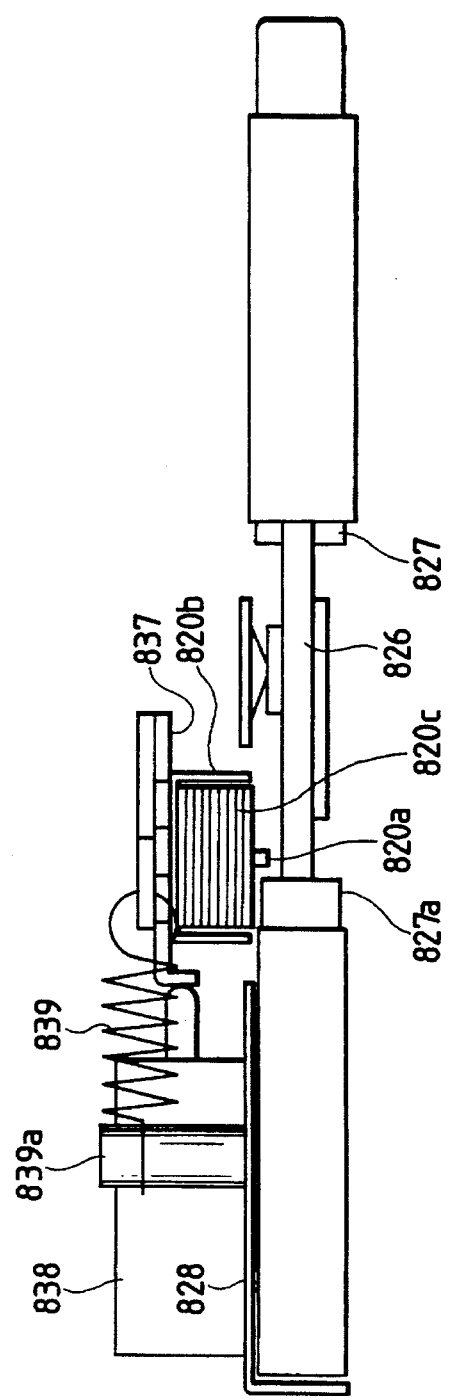
FIG. 62 is a cross-sectional view of the apparatus shown in FIG. 60.

In the following there will be explained the function of the parallel link mechanism, in the transition from the state shown in FIG. 60 to that in FIG. 62. At first, in a state shown in FIG. 60, said solenoid 838 is energized to retract the rod 838a, whereby the support bars 829, 830 are pulled in the tangential direction of the magnetooptical disk under the force of the coil spring 839, and the bias field generating unit 820a for light modulation recording is also pulled to a side of the shutter aperture 827a. Thereafter the carriage 821a of the magnetic head 821 for magnetic field modulation recording is moved along the guide rails 824, 825 from the retracted position shown in FIG. 60, whereby the floating slider 822 is brought close to the disk surface, with a predetermined gap thereof. Then said carriage 821 is moved in the seek and tracking directions in response to signals from control means (not shown), and the information recording on said magnetooptical disk 840 is executed by the modulated magnetic field generated by the magnetic head on the floating slider 822 and by the laser beam from an objective lens (not shown).

Figure 63:
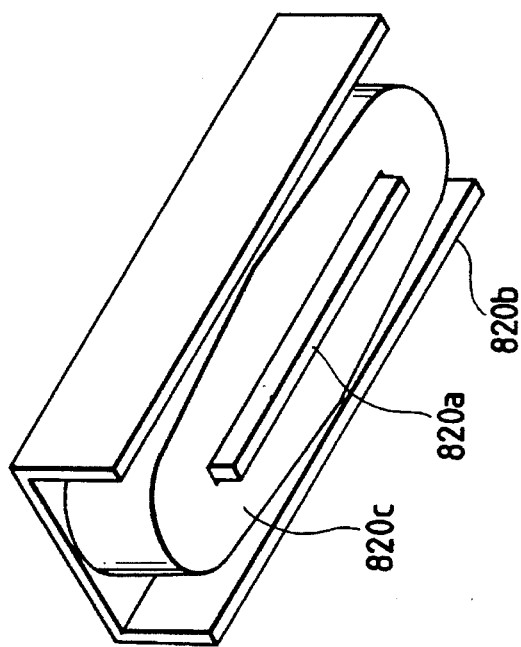
FIG. 63 is a perspective view showing the details of a bias magnet shown in FIG. 60.

As shown in FIG. 63, the bias magnet 820 for light modulation recording is principally comprised, for applying a constant magnetic field to the magnetooptical disk, of a center core 820a of a magnetic material, a coil 820c wound therearound, and a U-shaped support member (outer yoke) 820b covering the outside. In the present embodiment, in order that the bias field generating part 820a approaches the inside of the shutter aperture 827a as far as possible, there is employed a configuration in which said generating part 820a alone enters the shutter aperture 827a while the coil 820c and the outer yoke 820b remain inside the aperture 828a of the cassette holder 828. More specifically, in said bias magnet 820, the center core constituting the field generating part protrudes downwards from the coil 820c and the outer yoke 820b.

[16th embodiment]

Figure 64:
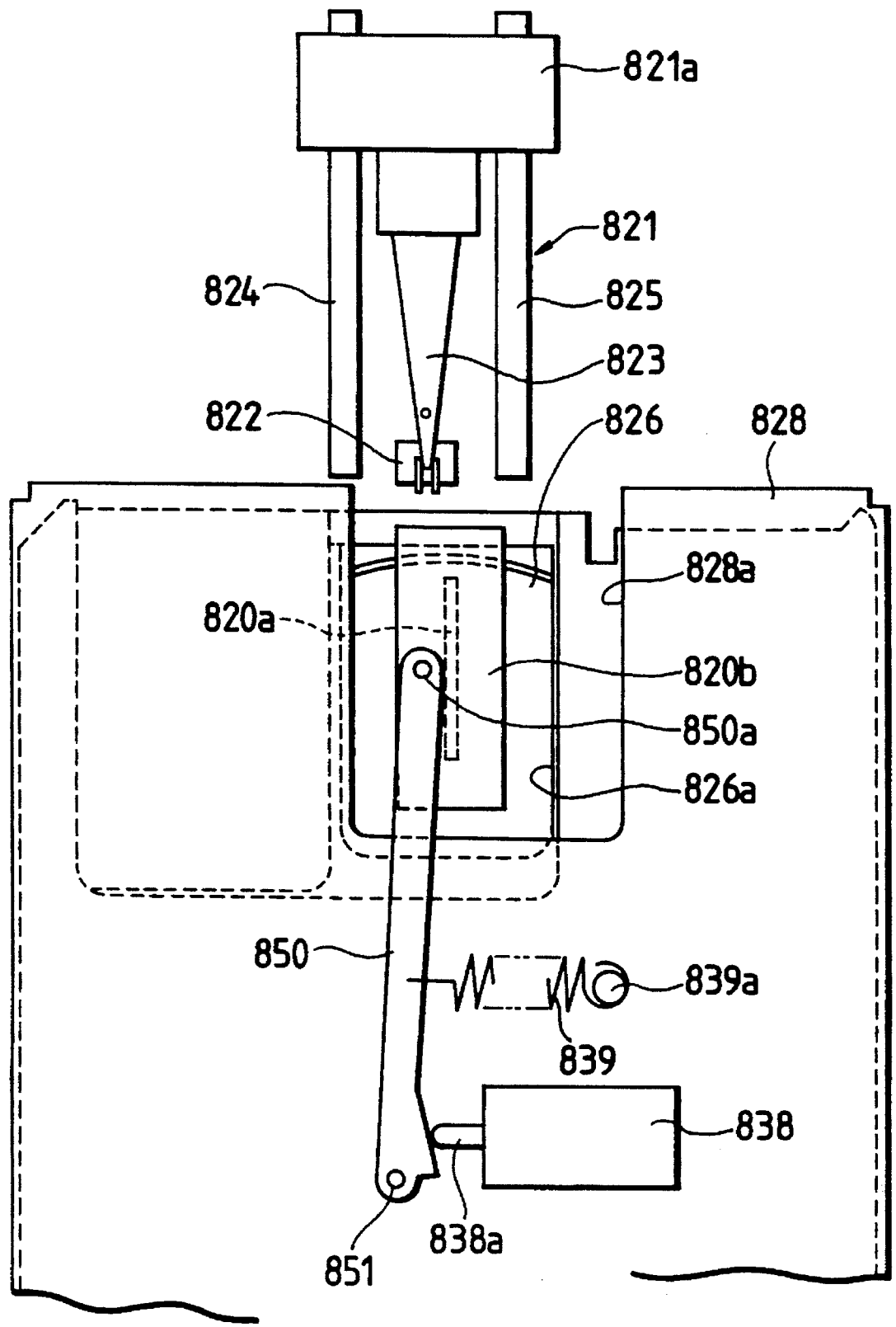
FIG. 64 is a plan view of a 16th embodiment of the present invention.
Figure 65:
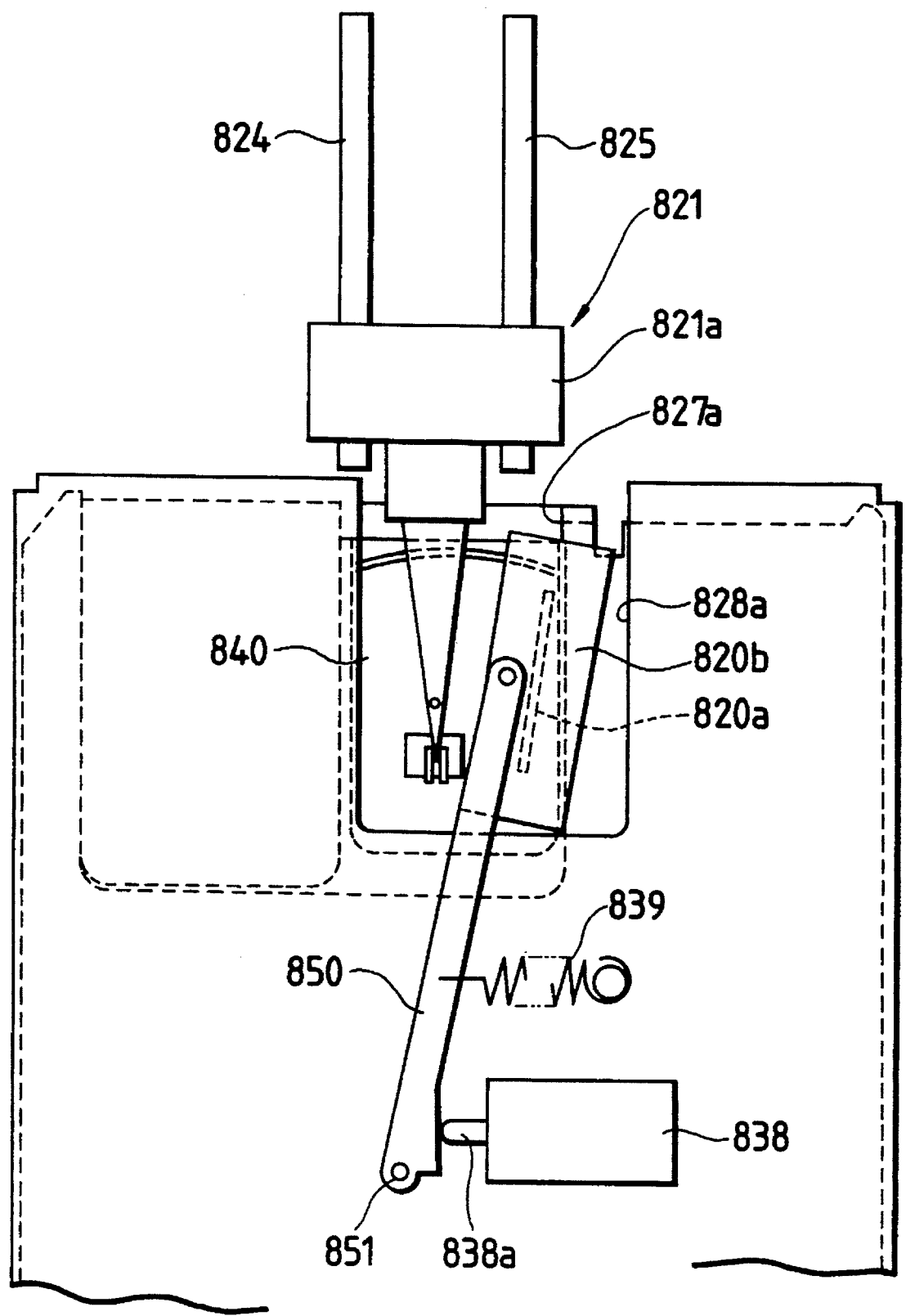
FIG. 65 is a view showing a state of magnetic field modulation recording in the apparatus shown in FIG. 64.

The foregoing embodiment employs the parallel link mechanism in order to retract the magnetic field generating part 820a in a substantially parallel direction to the lateral edge of the shutter aperture 827a, but the bias magnet 820 may be provided, as shown in FIGS. 64 and 65, with rotary displacing means for retracting the magnetic field generating put 820a in the tangential direction with respect to the surface of said magnetooptical disk. In such a case said rotary displacing means is comprised, for example, of a support bar 850 and a solenoid 838. Said support bar 850 is connected, at an end, to a support member (outer yoke) 820b by a shaft 850a, and, at the other end, to the cassette holder 828 by a shaft 851.

Therefore, in a case of information recording on a magnetooptical disk 826 for light modulation, the bias magnetic field generating part 820a is positioned, as shown in FIG. 64, at the center of the shutter aperture 827a, and the bias magnet 820 for light modulation recording is activated. On the other hand, in a case of information recording with the magnetic head 821 on a magnetooptical disk 840 for magnetic field modulation, the solenoid 838 is energized in the state shown in FIG. 64 to retract the rod 838a, whereby the support bar 850 is rotated about the shaft 851 by the force of a coil spring 839, thus pulling the magnetic field generating part 820a to the lateral edge in the shutter aperture 828a. Then the carriage 821a is moved, from the retracted position shown in FIG. 64, along the guide rails 824, 825 and the floating slider 832 is brought close to the surface of said disk 840. Thus the information recording is conducted, as in the foregoing embodiment, by moving the floating slider 822 together with the optical head to a desired position in the seeking and tracking directions. Prior to these operations, the magnetooptical disk 826 for light modulation recording shown in FIG. 64 is naturally replaced by that disk 840 for magnetic field modulation recording.

The above-mentioned mechanism for retracting the bias magnet 820 for light modulation recording proves the ability to further simplify the configuration, in comparison with that of the 15th embodiment.

[17th embodiment]

A 17th embodiment to be explained in the following is featured by the structure of the bias magnet. In the present embodiment there is not required the retracting space for the bias magnet in the vertical direction, and the direction of a magnetization vector of the DC bias magnetic field generated from the bias magnet is switched, when it is not used, in a direction parallel to the recording surface of the disk, so that, in the information recording on said disk by the magnetic head loaded on the floating slider, the DC bias magnetic field does not detrimentally influence the magnetooptical disk or the magnetic head.

Figure 66:
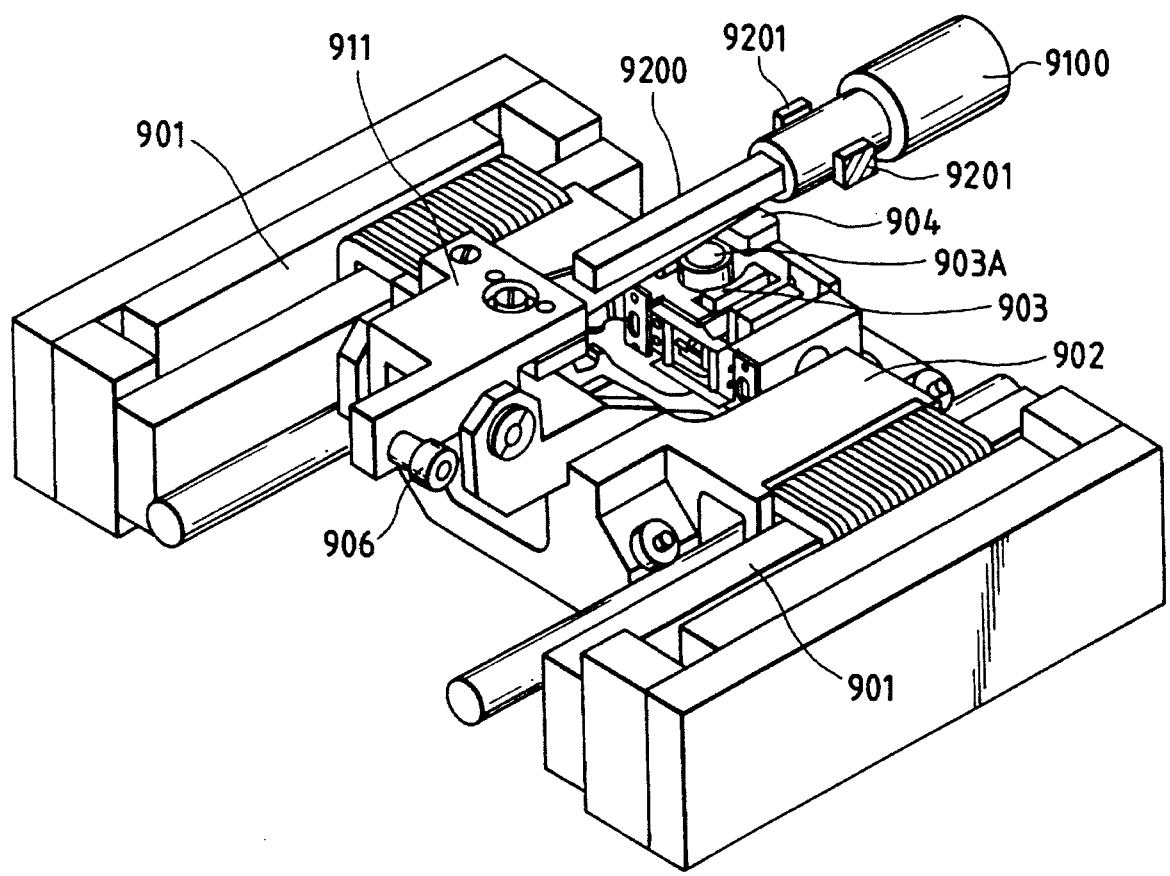
FIG. 66 is a perspective view of a 17th embodiment of the present invention.

This 17th embodiment will be explained in detail with reference to FIGS. 66 to 72. FIG. 66 schematically illustrates the drive unit of the magnetooptical disk apparatus of the present embodiment, whereby provided are first and second bias magnetic field generating devices for achieving information recording with different modulation methods. In this 17th embodiment, the first bias magnetic field generating device is a bias magnet consisting of a permanent magnet 9200 shaped as a square rod, so positioned as to cover the entire tracking range of an objective lens, while the second bias magnetic field generating device is a magnetic head 904 rendered movable together with said objective lens in the tracking direction. A seek motor 901 effects seek operations simultaneously for an optical head 903 mounted on a carriage 902 and said magnetic head 904. Said magnetic head 904 is mounted on said carriage 902 through a push-up mechanism 905, in which a rotary member 911 connected to the carriage 902 by a shaft 912 supports said magnetic head 904 at the front end through a beam (floating slider) consisting for example of a plate spring and is provided with an engaging part 906 at the rear end portion. Said engaging part 906 is depressed downwards by a pressing member 907 which is vertically moved by drive means such as a solenoid, thereby retracting the magnetic head 904 from the state shown in FIG. 68 or 69 to the state shown in FIG. 70 at the loading of the disk cassette into the apparatus.

The longer side of said permanent magnet 9200 is positioned along the radial direction of the magnetooptical disk 908 and above said magnetic head 904, thereby applying a constant DC magnetic field to said disk 908 in the light modulation recording. Said permanent magnet 9200 is magnetized in a direction perpendicular to said longer side and is mounted on the shaft of a motor 9100 through a coupling or a support member 9202, whereby a surface having the magnetic poles can be positioned perpendicular or parallel to the recording surface of the disk by suitable rotation of said motor 100. Such control means is comprised, in this 17th embodiment, of a DC bias magnetic field applying unit as shown in FIG. 17A. Said motor 9100 can be comprised of a stepping motor, a DC motor with an encoder or an ultrasonic motor.

On both sides of said permanent magnet 9200 there are provided magnetic sensors (Hall elements or magnetic resistance elements) 9201 in mutually opposed manner on a motor support frame 9203, in order to detect the state of a magnetization vector of the bias magnetic field generated by said magnet 9200 (whether said vector is perpendicular or parallel to the recording surface), and the output signals of said sensors are supplied to a control system for controlling the rotation angle of said motor 9100. Also there is provided, though not illustrated, drive means for integrally retracting said permanent magnet 9200, magnetic sensors 9201, motor 9100 and magnet support member 9202 from the movable range of said objective lens in the radial direction of the disk. Said drive means is adapted to retract the permanent magnet at the loading and unloading of the disk cassette 910, and places said permanent magnet 9200 in the movable range of the objective lens after the loading.

Now reference is made to FIGS. 67 to 70 for explaining the function of the first bias magnetic field generating device (permanent magnet 9200 serving as the bias magnet) and the retracting and operating mechanism for the floating magnetic head 904 for magnetic field modulation.

Figure 69:
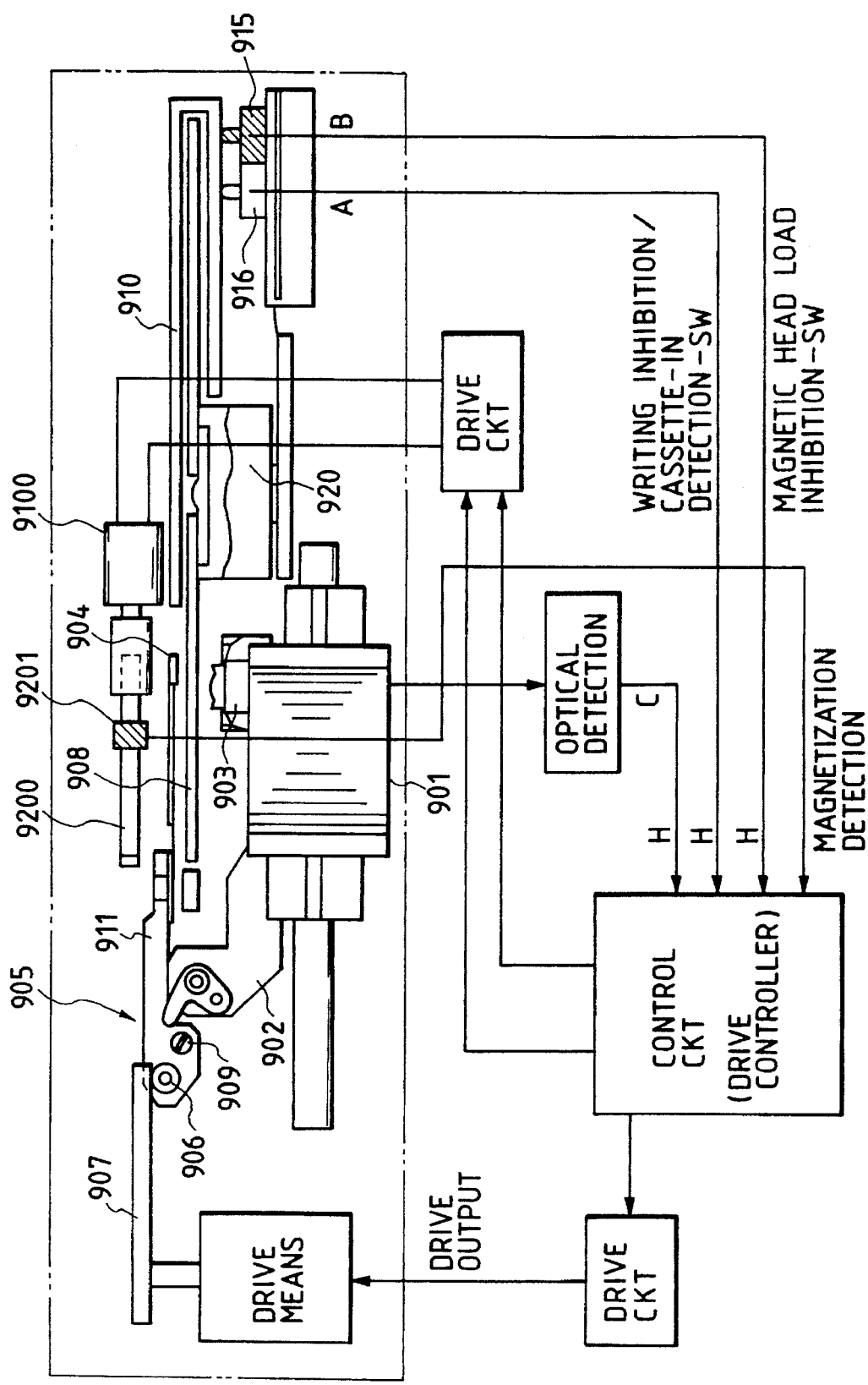
FIG. 69 is a view showing a state in which a recording medium for light modulation is loaded in the apparatus shown in FIG. 66.
Figure 71A:
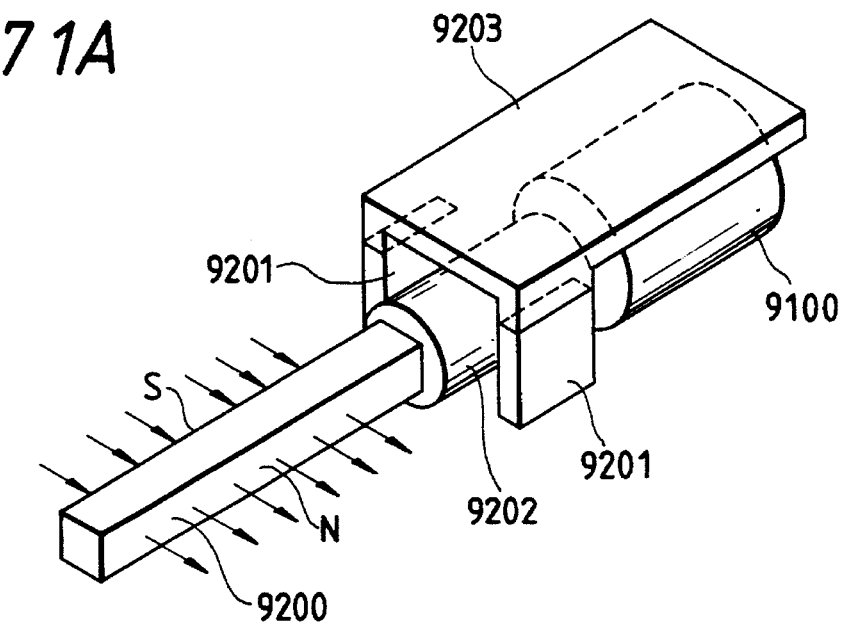
FIGS. 71A and 71B are views showing details of a bias magnet shown in FIG. 66.
Figure 71B:
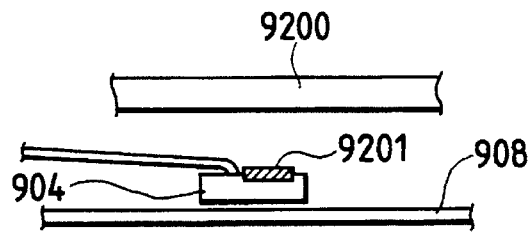
Figure 72:
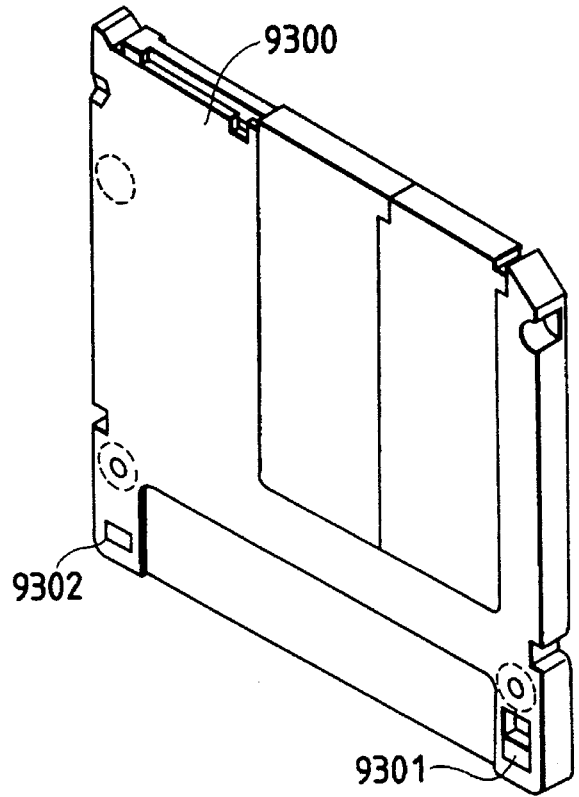
FIG. 72 is a perspective view showing an example of the disk cartridge to be employed in the 17th embodiment.

On an unrepresented frame of the magnetooptical disk apparatus, as shown in FIGS. 68 to 70, there are provided a disk kind sensor 915 and a sensor 916 for confirming the disk loading and detection of the write protection, in the disk loading part. In said loading part, a magnetooptical disk 908 housed in a disk cassette 910 is rotated by a spindle motor 920, and the recording and/or reproduction of information is executed by a light spot formed by a laser beam emitted from an optical head 903 through an objective lens 903A and/or the bias magnetic field generated by either bias magnetic field generating device.

The magnetic head 904 for magnetic field modulation is separated from the disk surface by the above-explained push-up mechanism, at the loading or unloading of the disk cassette 910 (cf. FIG. 70). More specifically, the aforementioned pressing member 907 depresses the engaging part 906 downwards, thereby rotating the rotary member 911 about the shaft 912 and separating the magnetic head 904 mounted on said rotary member from the disk 908. In this 17th embodiment, the first bias magnetic field generating device is retracted from the movable range of the objective lens in the radial direction of the disk in the state shown in FIG. 70, in order not to hinder the retraction of said magnetic head 904. After the loading of the disk cassette 910, the magnetic head 904 is positioned in the vicinity of the disk surface, namely in a position between the lower face of the permanent magnet 9200 and the disk surface and not incurring damage even when the loaded disk is not for magnetic field modulation recording. Said position control can be achieved by a control circuit which controls, through a drive circuit, the drive means for driving said pressing member.

FIG. 68 shows a state in which a disk capable of magnetic field modulation overwriting is loaded. In this case, the disk loading is detected by the sensor 916, and a disk kind detection part 9110 provided on said disk cassette 910 (cf. FIG. 72) is detected by said sensor 915. In the illustrated case, the loaded disk is identified as the one for magnetic field modulation, by a detection signal sent into a control such as a CPU. Consequently at the recording or reproducing operation for the disk 908, the pressing member 907 is elevated and disengaged from the engaging part 906 of the magnetic head push-up mechanism. The rotary member 911, being biased by a spring (not shown) in the loading direction of the magnetic head, rotates about the shaft 912. In the 17th embodiment, the rotary member 911 rotates until an engaging member 909 provided therein impinges on an engaging part provided on the carriage 902, whereby the magnetic head 904 is precisely stopped at the loaded position.

In a case of information recording by generating a modulated magnetic field by the magnetic head 904, the following state is realized by the aforementioned control circuit. In a case of recording with said magnetic head 904 on the disk 908 for magnetic field modulation, exact recording is difficult to achieve in the state shown in FIG. 67A or 67C, because the magnetization vector of the magnet 200 is superposed as a DC component to the modulated magnetic field. Therefore, in order to minimize the magnetization vector component of the permanent magnet 200, perpendicular to the disk surface, it is necessary to maintain the state shown in FIG. 67B or 67D in which said vector is parallel to the disk surface. Said control circuit realizes such a state by feedback control of the rotation angle of the motor 9100, so as to minimize the output of the magnetic sensors 9201.

Figure 67A:
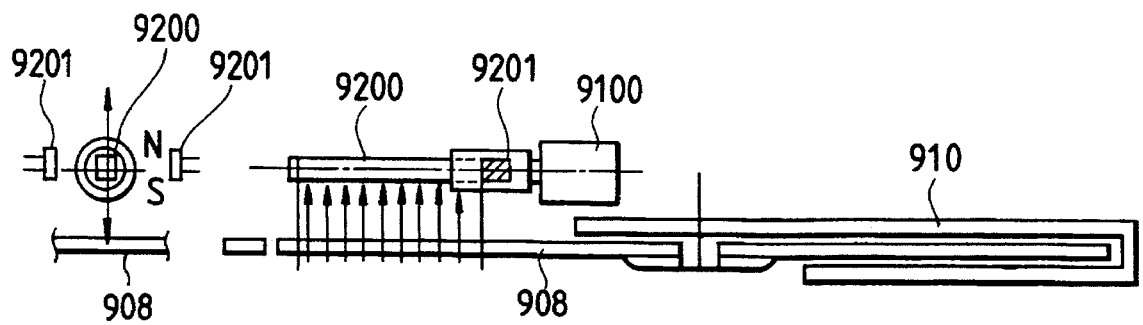
FIGS. 67A, 67B, 67C and 67D are views showing the function of a bias magnet in the apparatus shown in FIG. 66.
Figure 67B:
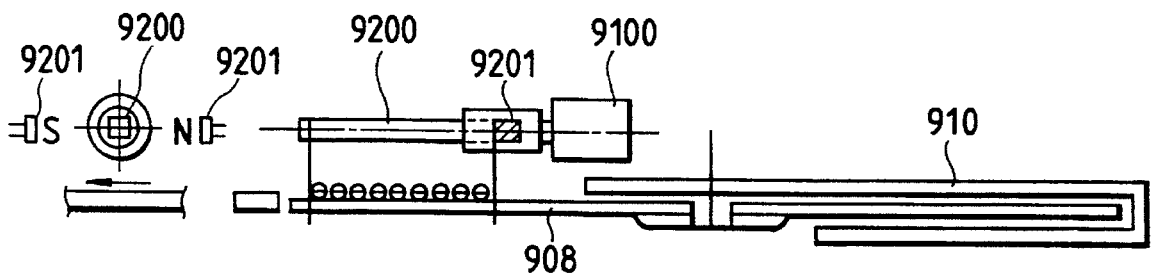
Figure 67C:
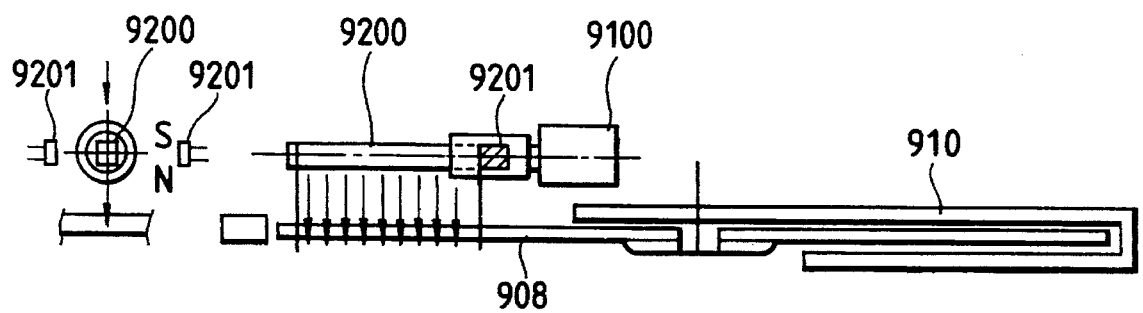
Figure 67D:
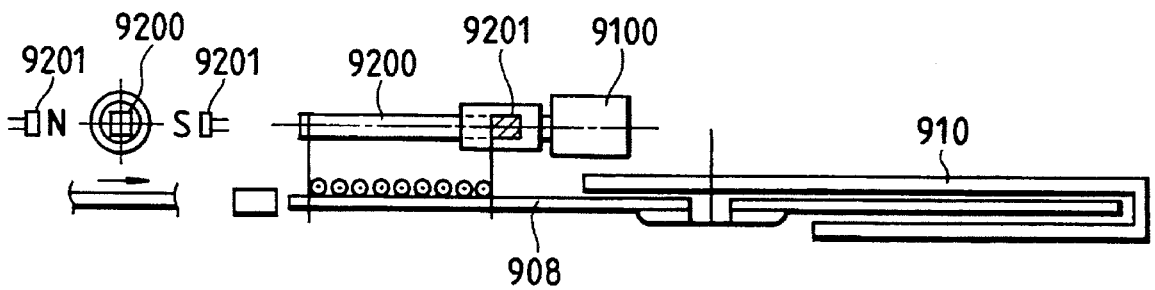

FIG. 69 shows a state in which a ROM disk or a magnetooptical disk 908 for light modulation, is incapable of magnetic field modulation overwriting. In this state the disk kind sensor 915 does not release the detection signal (H-level), so that the magnetic head 904 is not loaded. However the pressing member 907 is in contact with the contact part 906 whereby the rotary member 911 is positioned extending in the seeking direction of the carriage 902 and the magnetic head 904 is not retracted from the vicinity of the disk surface. Consequently, the seek operation of the optical head 903 in this state does not hinder the movement of the magnetic head 904. In this state the laser beam is focused onto the disk surface by the objective lens, and the control circuit rotates the motor 9100 by a predetermined angle, based on the detection signal of the magnetic sensors 9201 in such a manner that the magnetization vector becomes perpendicular to the disk surface, as shown in FIG. 67A or 67C. Thus the DC bias magnetic field is applied to the magnetooptical disk to achieve recording/erasure thereof.

When the disk cassette is not loaded as shown in FIG. 70, the sensors 915, 916 do not release the detection signals (L-level state). In this state the magnetic head 904 is not activated, and the pressing member 907 is maintained in a lower position to retract the magnetic head 904 upwards. Also the bias magnet is retracted from the disk cassette as explained before. In the 17th embodiment, the bias magnet is retracted to the insertion slot of the disk cassette, but it may also be retracted above the retracted position of the floating magnetic head 904, or in the lateral direction.

In said 17th embodiment, the direction of the magnetization vector of the permanent magnet is feedback controlled by the rotation angle of the motor, utilizing the detection signal of the magnetic sensors. Said sensors may also be positioned in such a manner that the output thereof becomes minimum when said direction is parallel to the disk surface.

In such a case the detecting surface of the magnetic sensors is placed parallel to the disk surface, thereby detecting the vector perpendicular thereto. This configuration is optimum practically, since a the maximum/minimum of the DC bias is directly detected by the magnetic sensors. This can be realized by directly mounting the magnetic sensor on the floating slider for magnetic field modulation (see FIG. 71B).

What is claimed is:

1. A magnetooptical information recording/reproducing apparatus for effecting at least one of recording of information on and reproducing of information from a magnetooptical recording medium by using a magnetic field modulation system that applies a magnetic field modulated corresponding to the information while a light beam is irradiated to the magnetooptical recording medium, said apparatus comprising:

a magnetic head for applying to the medium the magnetic field modulated corresponding to the information;

a floating slider for mounting said magnetic head thereon;

retracting means for retracting said floating slider from the medium, when (i) loading a medium utilized with the magnetic field modulation system and (ii) when a medium other than a medium utilized with the magnetic field modulation system is loaded onto said apparatus; and an optical head for irradiating the light beam to a portion of the medium to which the magnetic field is applied.

2. A magnetooptical information recording/reproducing apparatus according to claim 1, further comprising judging means for judging whether the medium loaded onto said apparatus is one that is utilized with the magnetic field modulation system, said retracting means causing said floating slider to retract according to the judgment by said judging means.

3. A magnetooptical information recording/reproducing apparatus according to claim 1, further comprising a spindle motor for rotating said medium, and wherein said floating slider is made to float from the surface of the medium due to a dynamic pressure generated between said floating slider and the medium surface, upon rotation of the medium by said spindle motor.

4. A magnetooptical information recording/reproducing apparatus according to claim 1, further comprising a bias magnet for applying a constant DC bias magnetic field to the medium.

5. A magnetooptical information recording/reproducing apparatus according to claim 4, further comprising bias magnet retracting means for causing said bias magnet to retract from the medium, when a medium loaded onto said apparatus is not utilized with the magnetic field modulation system.

6. A magnetooptical information recording/reproducing apparatus according to claim 5, wherein said bias magnet retracting means causes said bias magnet to retract in a direction perpendicular to the surface of the medium.

7. A magnetooptical information recording/reproducing apparatus according to claim 5, wherein said bias magnet retracting means causes said bias magnet to retract in a direction parallel to the surface of the medium.

8. A magnetooptical information recording/reproducing apparatus according to claim 1, further comprising a holder for conveying the medium in said apparatus, said retracting means causing said floating slider to retract, upon loading of the medium and subsequent to a shift of the medium to said holder.

9. A magnetooptical information recording/reproducing apparatus for effecting at least one of recording of information on and reproducing of information from a disc-like magnetooptical recording medium, said apparatus comprising:

a magnetic head for applying to the recording medium a magnetic field modulated corresponding to the information;

a floating slider for mounting said magnetic head thereon;

an optical head for irradiating a light beam to the medium;

shifting means for shifting said floating slider and said optical head in a radial direction of the medium; and a bias magnet, which does not shift in the radial direction of the medium, for applying a constant direct current bias magnetic field to the entire shift area of the light beam on the medium, at one time.

10. A magnetooptical information recording/reproducing apparatus according to claim 9, wherein said magnetic head applies a modulated magnetic field to the medium when the medium is one utilized for magnetic field modulation, while said bias magnet applies a constant DC bias magnetic field to the medium when the medium is one utilized for light modulation.

11. A magnetooptical information recording/reproducing apparatus according to claim 10, further comprising retracting means for retracting said bias magnet from the medium, when said magnetic head applies the modulated magnetic field to the medium.

12. A magnetooptical information recording/reproducing apparatus according to claim 9, wherein said bias magnet is a permanent magnet.

13. A magnetooptical information recording/reproducing apparatus according to claim 11, wherein said retracting means causes said bias magnet to retract in a direction orthogonal to a surface of the medium.

14. A magnetooptical information recording/reproducing apparatus according to claim 11, wherein said retracting means causes said bias magnet to retract in a plane parallel to a surface of the medium, in a direction intersecting the radial direction of the medium.

15. A magnetooptical information recording/reproducing method for effecting at least one of recording of information on and reproducing of information from a magnetooptical recording medium by using a magnetic field modulation system, said method comprising steps of:

loading the medium in the system;

applying a modulated magnetic field to the medium by a magnetic head mounted onto a floating slider;

retracting the floating slider from the medium, when (i) loading a medium utilized with the magnetic field modulation system, in said loading step and (ii) when a medium other than a medium utilized with the magnetic field modulation system is loaded in said loading step; and irradiating a light beam to a portion of the medium to which the magnetic field is applied.

16. A magnetooptical information recording/reproducing method according to claim 15, further comprising judging whether the medium loaded in the system is one that is utilized with the magnetic field modulation system, and retracting the floating slider in said retracting step according to the judgment in said judging step.

17. A magnetooptical information recording/reproducing apparatus according to claim 15, further comprising applying a constant DC bias magnetic field to the medium.

18. A magnetooptical information recording/reproducing apparatus for effecting at least one of recording of information on and reproducing of information from a disc-like magnetooptical recording medium, said apparatus comprising:

a magnetic head for applying to the medium a magnetic field modulated corresponding to the information;

a floating slider for mounting said magnetic head thereon;

a bias magnet for applying a constant direct current bias magnetic field to the medium;

first shifting means for shifting said floating slider in a radial direction of the medium and for mounting said bias magnet thereon and shifting said bias magnet in the radial direction of the medium;

an optical head for irradiating a light beam to the medium;

second shifting means for shifting said optical head in the radial direction of the medium;

detecting means for detecting a relative position between said first and second shifting means in the radial direction of the medium; and control means for controlling shifting of said first and second shifting means, according to a detection result obtained by said detecting means, so that the relative position between said first and second shifting means is switched between a first relative position where a light beam irradiation position and a modulated magnetic field application portion coincide with each other on the medium and a second relative position where the light beam irradiation position and a direct current bias magnetic field application position coincide with each other on the medium.

19. A magnetooptical information recording/reproducing apparatus for effecting at least one of recording of information on and reproducing of information from a disc-like opto-magnetic recording medium by using a magnetic modulation system, said apparatus comprising:

moving means movable in a radial direction of the medium;

a rotary member rotatably provided on said moving means, said rotary member having an axis of rotation extending in a direction perpendicular to the moving direction of said moving means;

a floating slider attached to said rotary member;

a magnetic head for applying to the medium a magnetic field modulated corresponding to the information, said magnetic head being fixed to a tip end of said floating slider;

a defining member provided on said moving means for defining a rotational position of said rotary member when said magnetic head approaches the medium;

an optical head provided on said moving means for irradiating a light beam onto the medium; and drive means for rotating said rotary member, when a medium other than one utilized with the magnetic modulation system is loaded on said apparatus, for causing said floating slider to retract from the medium.

20. A magnetooptical information recording/reproducing apparatus according to claim 19, further comprising a bias magnet for applying a constant direct current bias magnetic field to the medium, said apparatus also effecting at least one of recording of information on and reproducing of information from the medium by using an optical modulation system.

21. A magnetooptical information recording/reproducing apparatus according to claim 19, further comprising urging means for urging said rotary member to urge said magnetic head against the medium.

* * * * *

UNITED STATES PATENT AND TRADEMARK OFFICE
CERTIFICATE OF CORRECTION

PATENT NO. : 5,604,719
DATED : February 18, 1997
INVENTOR(S) : HIROAKI KAKIMOTO, ET AL.

It is certified that error appears in the above-indentified patent and that said Letters Patent is hereby corrected as shown below:

ON THE COVER PAGE

AT [56] "References Cited"

FOREIGN PATENT DOCUMENTS

"57110069  8/1990  Japan
 319160    1/1991  Japan
 536199    2/1993  Japan
 5128616   9/1993  Japan
 5128629   5/1993  Japan" should read --57-110069  8/1990  Japan
  3-19160    1/1991  Japan
  5-36199    2/1993  Japan
  5-128616   5/1993  Japan
  5-128629   5/1993  Japan--.

AT [57] "ABSTRACT"

Line 8, "damages on" should read --damage to-- and "in" should read --to--.

UNITED STATES PATENT AND TRADEMARK OFFICE
CERTIFICATE OF CORRECTION

PATENT NO. : 5,604,719

DATED : February 18, 1997

INVENTOR(S) : HIROAKI KAKIMOTO, ET AL.

It is certified that error appears in the above-indentified patent and that said Letters Patent is hereby corrected as shown below:

COLUMN 1

Line 8, "07/914,465" should read --07/914,564--.
Line 31, "a" should read --an--.

COLUMN 4

Line 10, "comprises" should read --comprise--.

COLUMN 6

Line 24, "9" should read --a--.

COLUMN 7

Line 19, "response" should read --response,--.

COLUMN 10

Line 9, "manner." should read --manners.--.

UNITED STATES PATENT AND TRADEMARK OFFICE
CERTIFICATE OF CORRECTION

PATENT NO. : 5,604,719

DATED : February 18, 1997

INVENTOR(S) : HIROAKI KAKIMOTO, ET AL.

It is certified that error appears in the above-indentified patent and that said Letters Patent is hereby corrected as shown below:

COLUMN 11

Line 21, "case" should be deleted.
Line 60, "the" should be deleted.
Line 66, "the" should be deleted.

Signed and Sealed this

Fifth Day of August, 1997

Attest:

BRUCE LEHMAN

Attesting Officer

Commissioner of Patents and Trademarks